(12) United States Patent
Bradford et al.

(10) Patent No.: US 10,604,333 B2
(45) Date of Patent: Mar. 31, 2020

(54) CONTAINER HAVING AT LEAST ONE LOCKABLE CROSSBAR ASSEMBLY MOVABLE ALONG TRACKS

(71) Applicant: Bradford Company, Holland, MI (US)

(72) Inventors: Judson A. Bradford, Holland, MI (US); Allen L. Burns, Holland, MI (US); Matthew S. Sanger, West Olive, MI (US)

(73) Assignee: Bradford Company, Holland, MI (US)

( * ) Notice: Subject to any disclaimer, the term of this patent is extended or adjusted under 35 U.S.C. 154(b) by 454 days.

(21) Appl. No.: 15/464,678

(22) Filed: Mar. 21, 2017

(65) Prior Publication Data

US 2017/0313500 A1 Nov. 2, 2017

Related U.S. Application Data

(60) Provisional application No. 62/407,086, filed on Oct. 12, 2016, provisional application No. 62/364,057, (Continued)

(51) Int. Cl.
*B65D 85/68* (2006.01)
*B65D 19/44* (2006.01)
(Continued)

(52) U.S. Cl.
CPC ............. *B65D 85/68* (2013.01); *B65D 19/06* (2013.01); *B65D 19/18* (2013.01); *B65D 19/44* (2013.01); *B65D 2519/00024* (2013.01); *B65D 2519/00034* (2013.01); *B65D 2519/00059* (2013.01); *B65D 2519/00069* (2013.01); *B65D 2519/0081* (2013.01); *B65D 2519/0082* (2013.01); *B65D 2519/00094* (2013.01); *B65D 2519/0097* (2013.01); *B65D 2519/00174* (2013.01); *B65D 2519/00233* (2013.01);
(Continued)

(58) Field of Classification Search
CPC ........ B65D 19/06; B65D 85/68; B65D 19/44; B65D 2519/0081; B65D 2519/00805; B65D 2519/00701; B65D 2519/00666; B65D 2519/00621; B65D 2519/00532; B65D 2585/6887
See application file for complete search history.

(56) References Cited

U.S. PATENT DOCUMENTS 4,067,630 A 1/1978 Stark et al.
4,091,745 A 5/1978 Patch
(Continued)

FOREIGN PATENT DOCUMENTS

DE 4336623 5/1995
DE 102012017295 3/2014

*Primary Examiner* — Andrew T Kirsch
*Assistant Examiner* — Don M Anderson
(74) *Attorney, Agent, or Firm* — Wood Herron & Evans, LLP

(57) ABSTRACT

A container for holding product therein during shipment and being returned for reuse has at least one track supported by each side of the container. The container has dunnage supports extending between corresponding tracks at the same level. At least one lockable crossbar assembly has one or more locking assemblies to fix the position of the lockable crossbar assembly relative to the tracks. Dunnage may hang from the dunnage supports for supporting products during storage or shipment.

20 Claims, 48 Drawing Sheets

Related U.S. Application Data filed on Jul. 19, 2016, provisional application No. 62/328,683, filed on Apr. 28, 2016.

(51) Int. Cl.
*B65D 19/06* (2006.01)
*B65D 19/18* (2006.01)

(52) U.S. Cl.
CPC .............. *B65D 2519/00273* (2013.01); *B65D 2519/00293* (2013.01); *B65D 2519/00323* (2013.01); *B65D 2519/00333* (2013.01); *B65D 2519/00338* (2013.01); *B65D 2519/00373* (2013.01); *B65D 2519/00422* (2013.01); *B65D 2519/00532* (2013.01); *B65D 2519/00562* (2013.01); *B65D 2519/00621* (2013.01); *B65D 2519/00666* (2013.01); *B65D 2519/00701* (2013.01); *B65D 2519/00805* (2013.01); *B65D 2585/6887* (2013.01)

(56) References Cited

U.S. PATENT DOCUMENTS

| | | |
|---|---|---|
| 4,256,425 A | 3/1981 | Burgess et al. |
| 4,492,263 A | 1/1985 | Gebhard |
| 4,494,896 A | 1/1985 | DiFranco |
| 4,553,888 A | 11/1985 | Crissy et al. |
| 4,688,976 A | 8/1987 | Rowley et al. |
| 4,911,312 A | 3/1990 | Jeruzal |
| 4,921,100 A | 5/1990 | Krause |
| 5,005,712 A | 4/1991 | Niederprum |
| 5,037,256 A | 8/1991 | Schroeder |
| 5,328,259 A * | 7/1994 | Meriaux ............ B42F 15/0035 206/425 |
| 5,378,093 A | 1/1995 | Schroeder |
| 5,472,301 A | 12/1995 | Wallen |
| 5,582,495 A | 12/1996 | Schroeder |
| 5,785,475 A | 7/1998 | Winstel et al. |
| 6,039,522 A | 3/2000 | Cardona |
| 6,164,440 A | 12/2000 | Van Bree |
| 6,224,307 B1 | 5/2001 | Johnson et al. |
| 6,540,096 B1 | 4/2003 | Bazany et al. |
| 6,786,687 B1 | 9/2004 | Schroeder |
| 7,293,946 B1 | 11/2007 | Fuller |
| 7,380,558 B2 | 6/2008 | Krause et al. |
| 7,410,335 B2 | 8/2008 | Scott |
| 8,388,285 B2 | 3/2013 | Langh |
| 8,616,370 B2 | 12/2013 | Allegretti et al. |
| 2015/0069053 A1* | 3/2015 | Bradford ................ B65D 19/06 220/1.5 |
| 2015/0090722 A1* | 4/2015 | Sanger ................. B65D 88/546 220/544 |
| 2016/0039355 A1 | 2/2016 | Settelmayer |

* cited by examiner

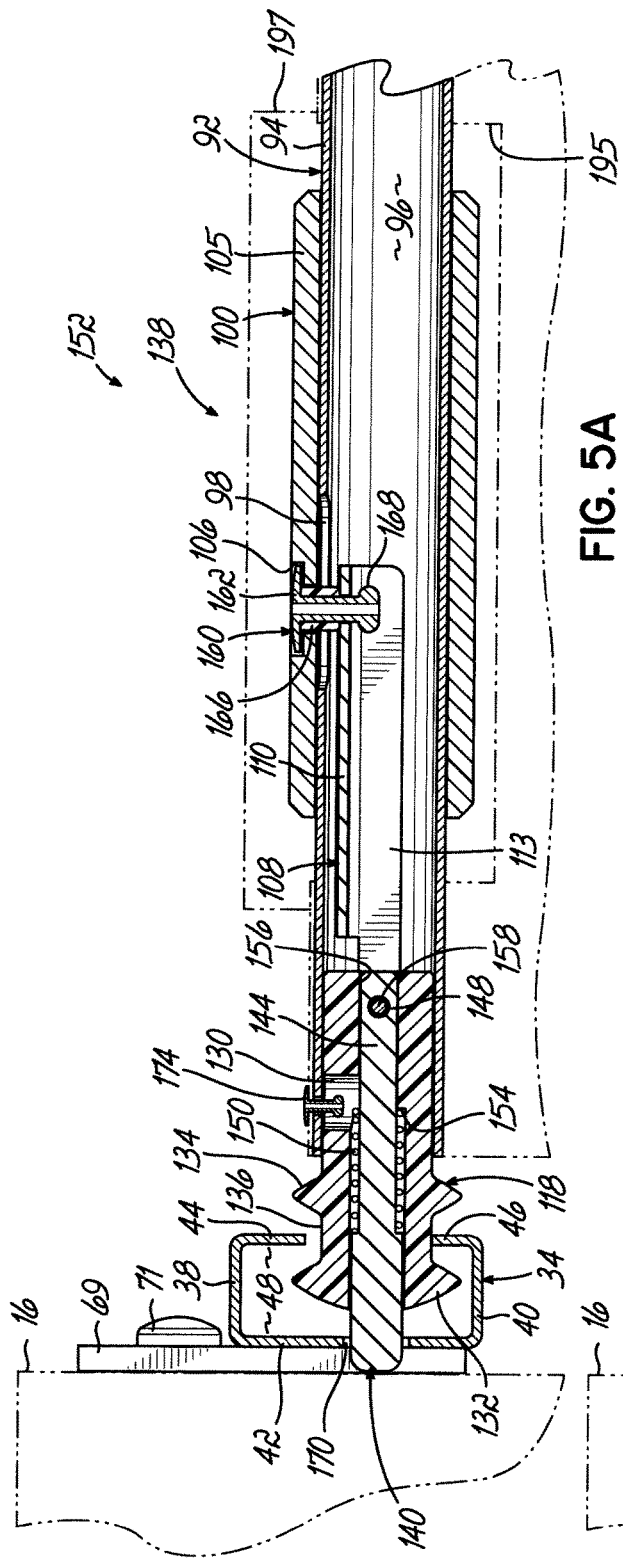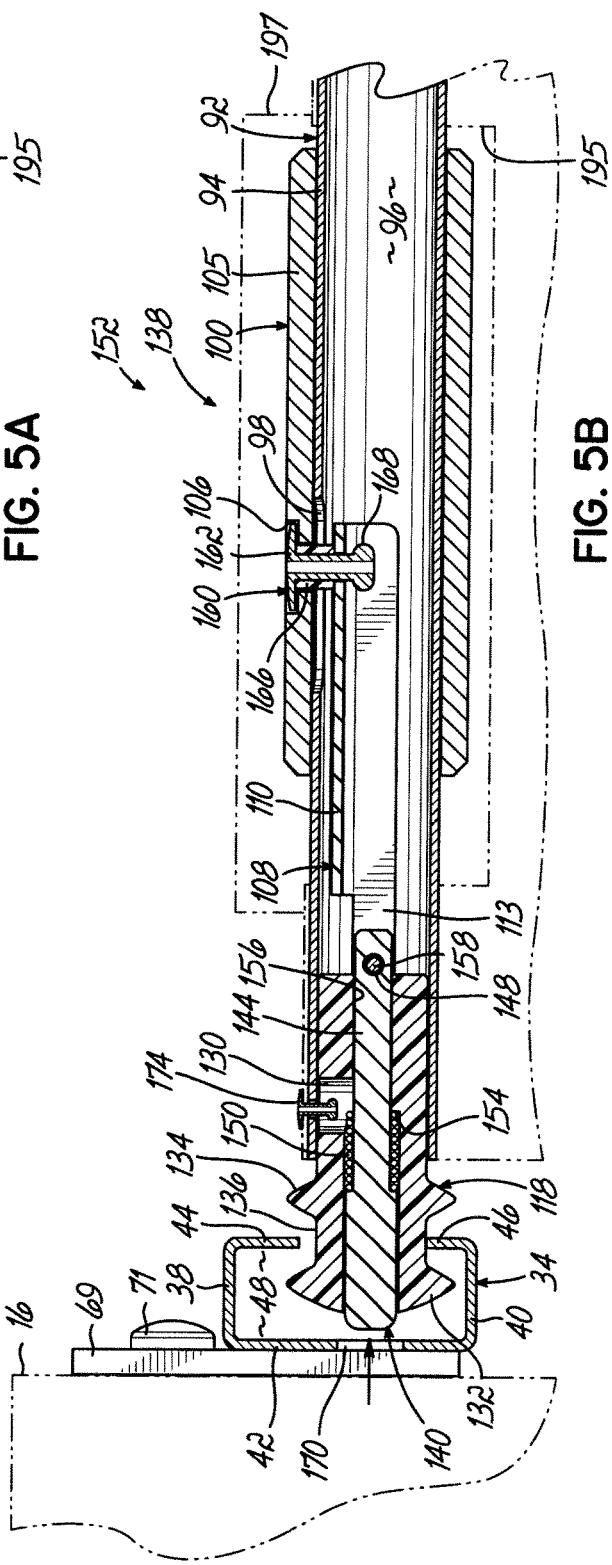

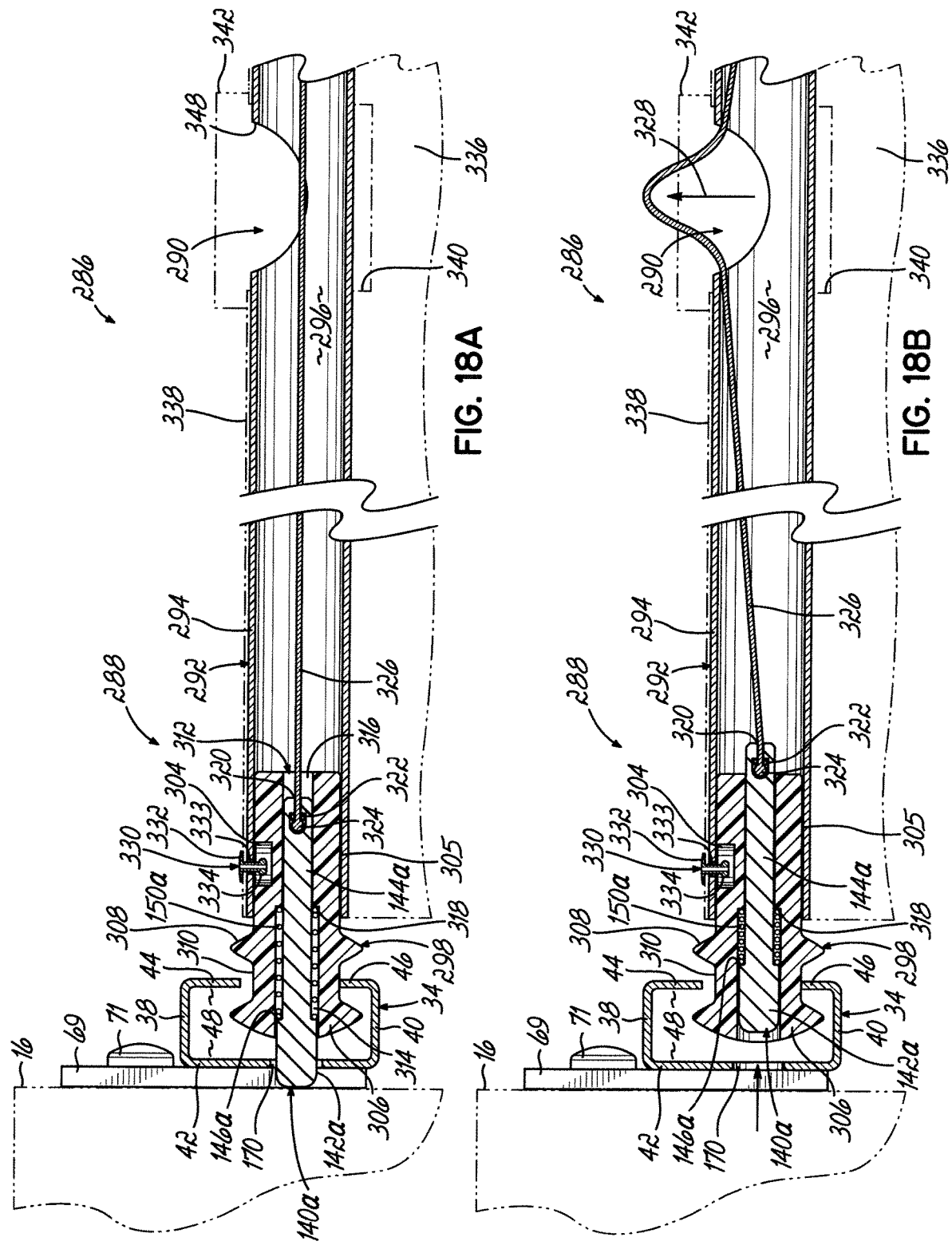

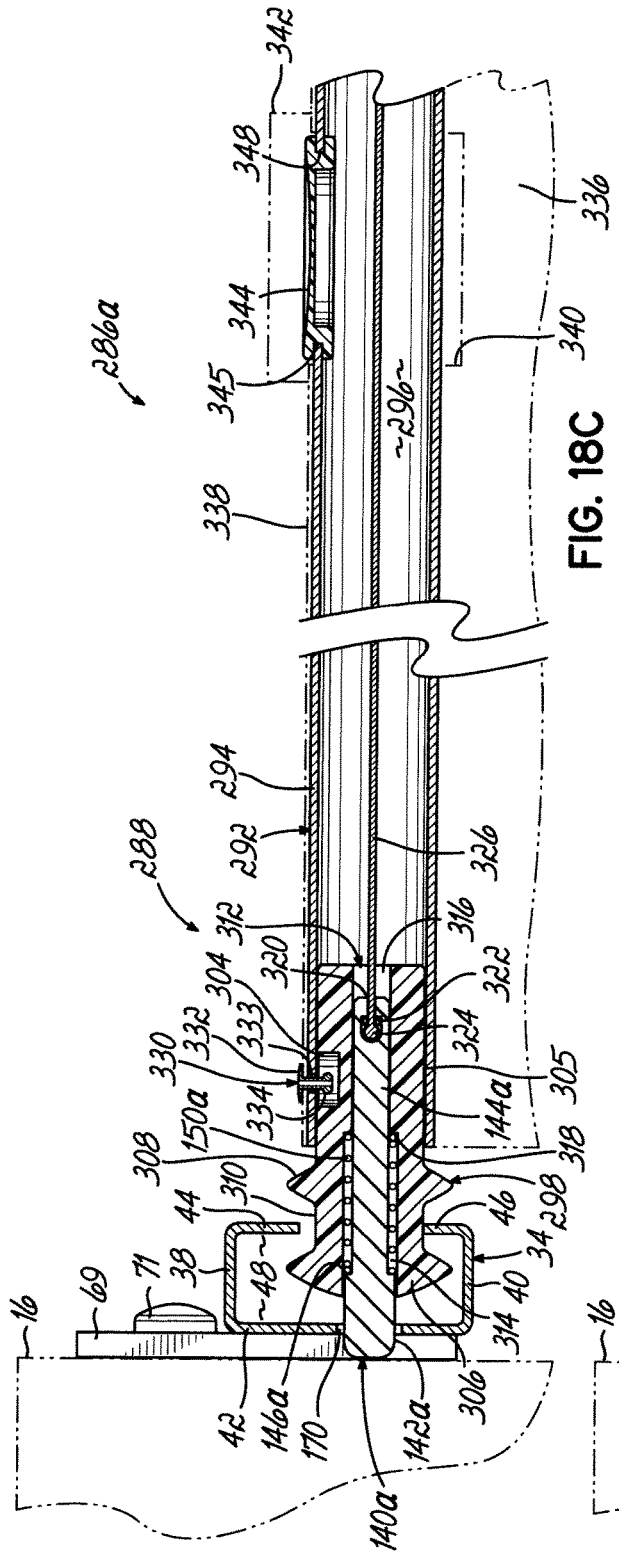
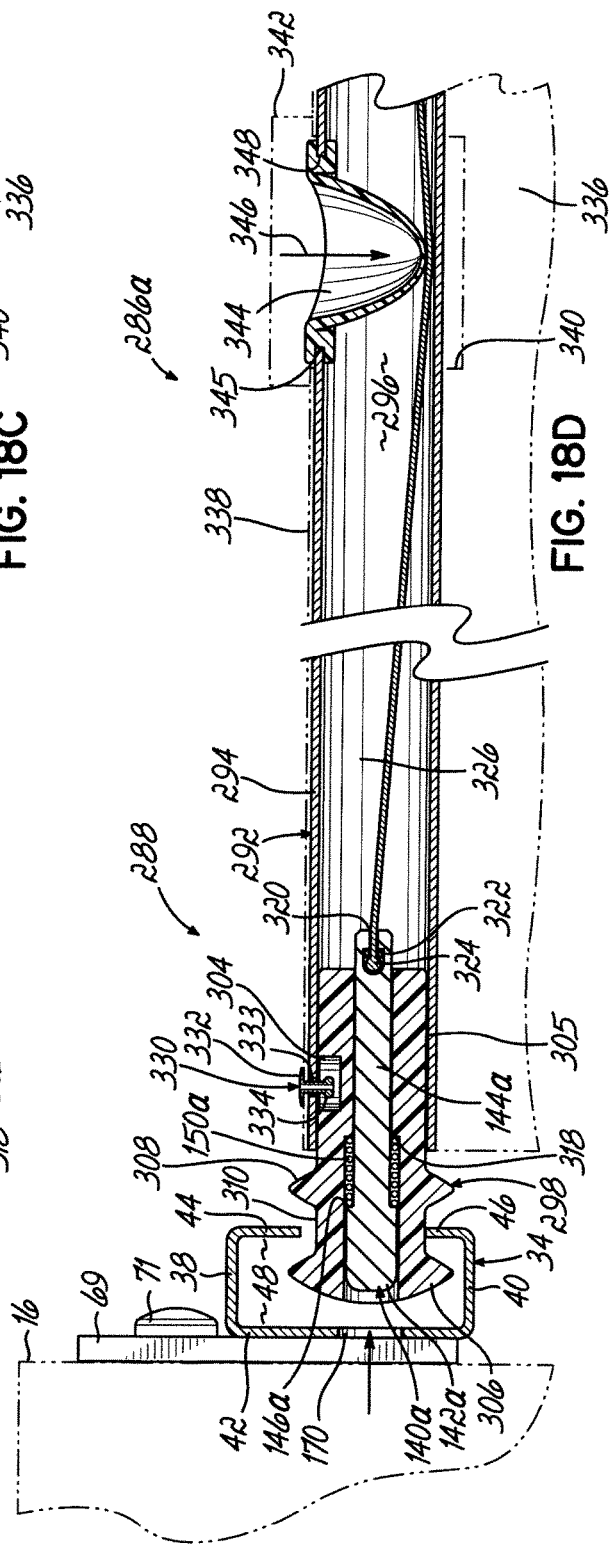
FIG. 18C
FIG. 18D

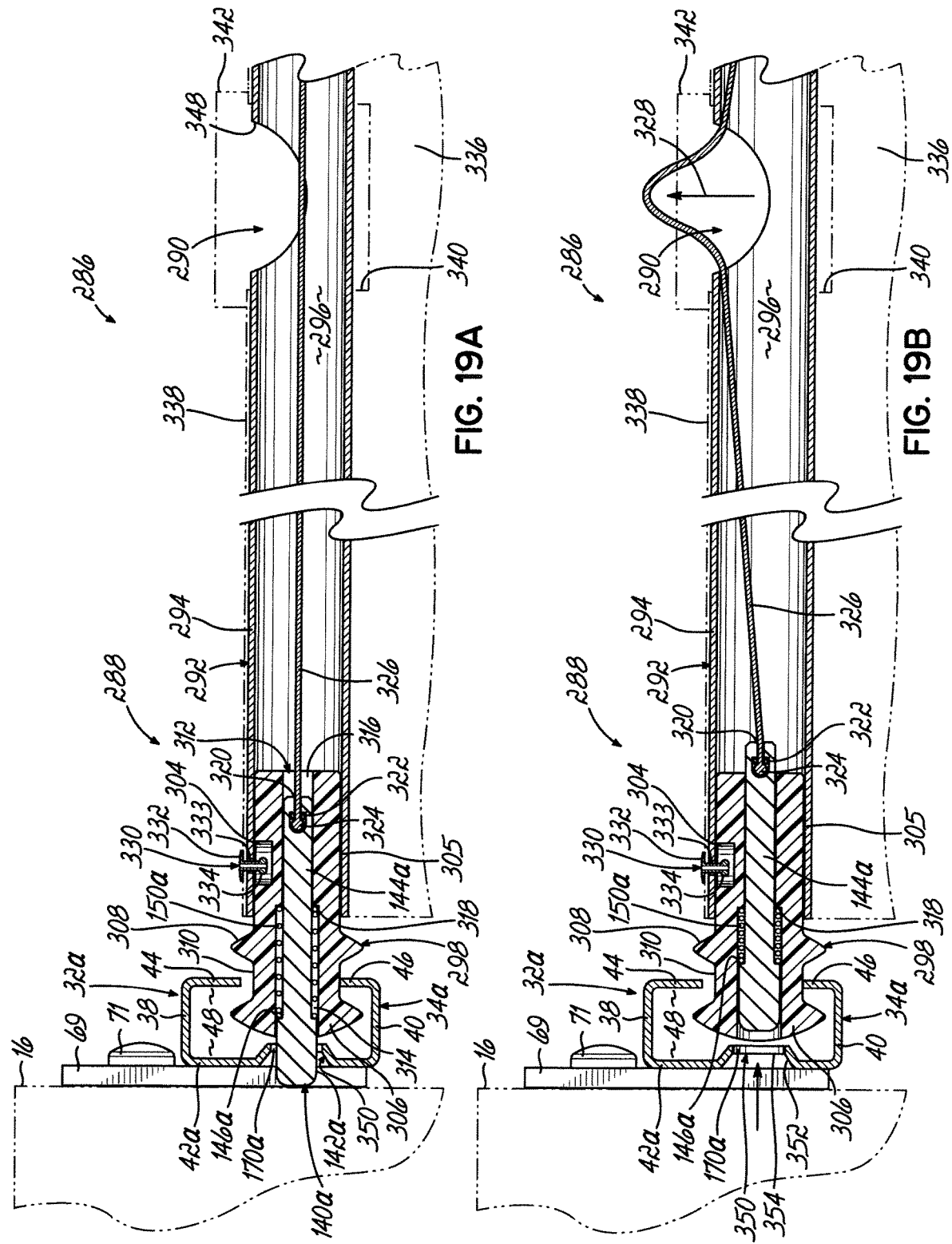

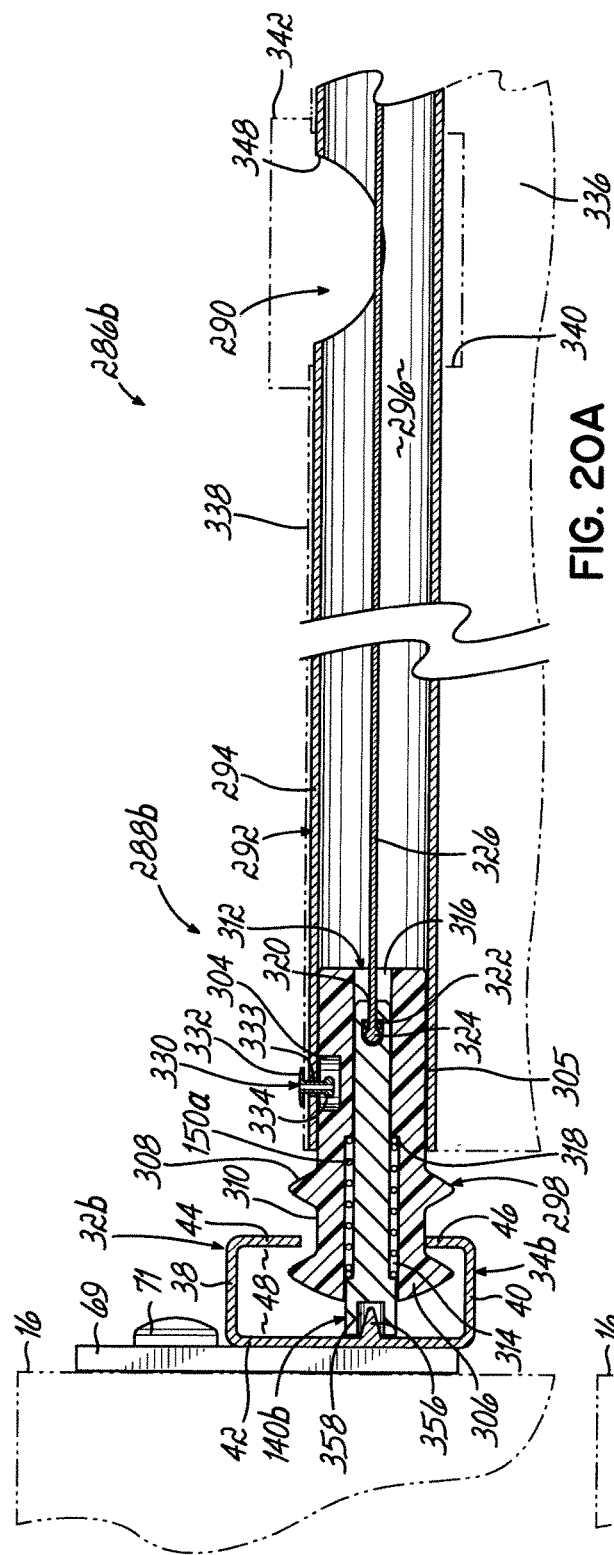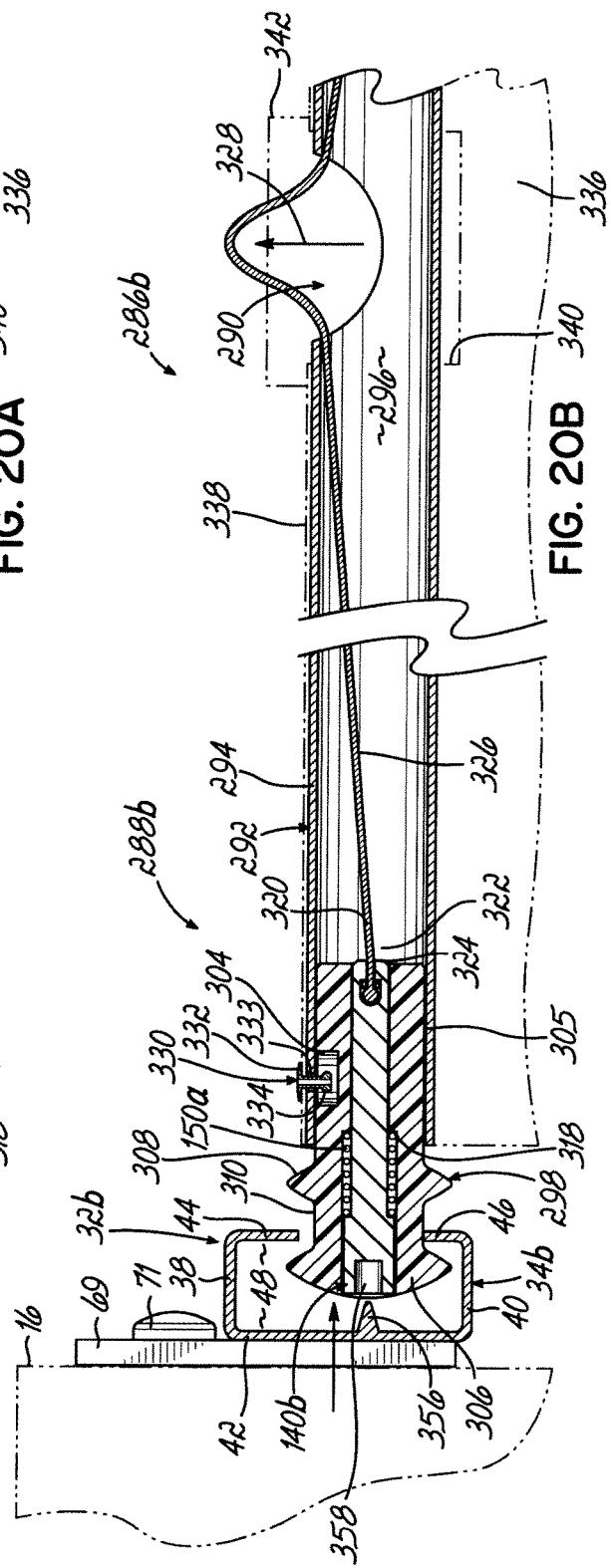

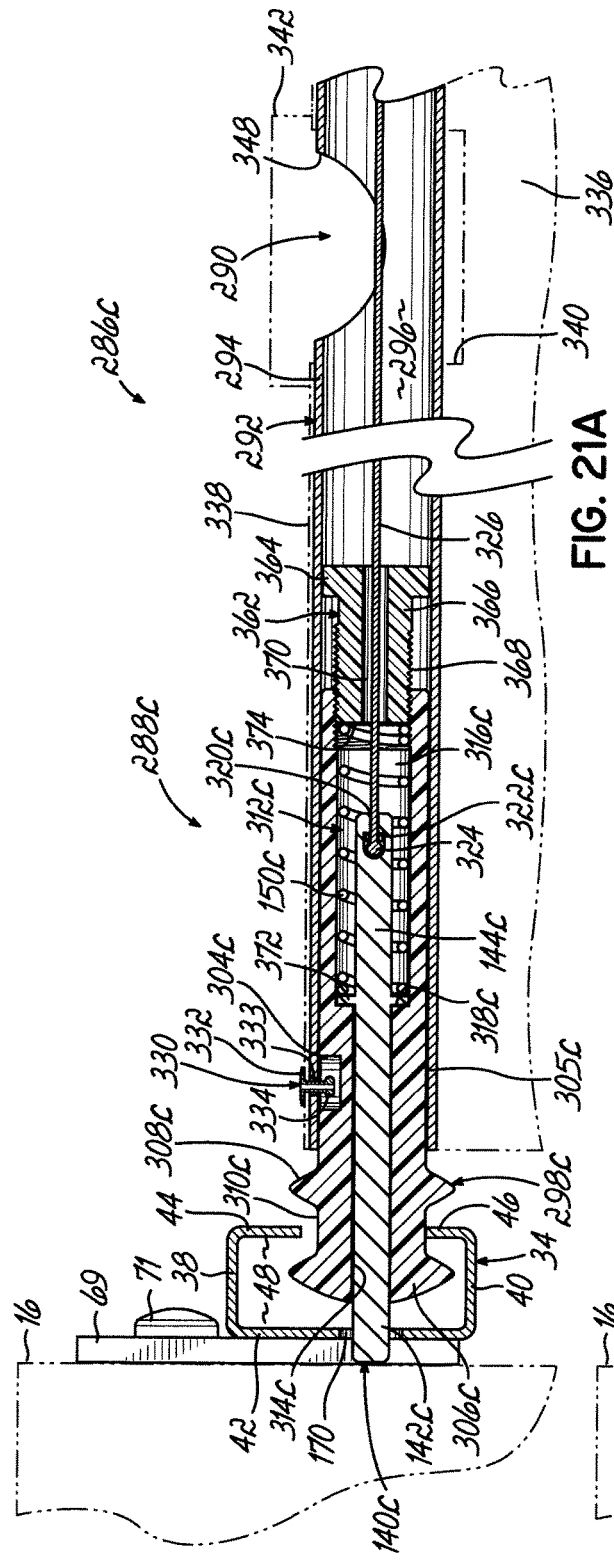
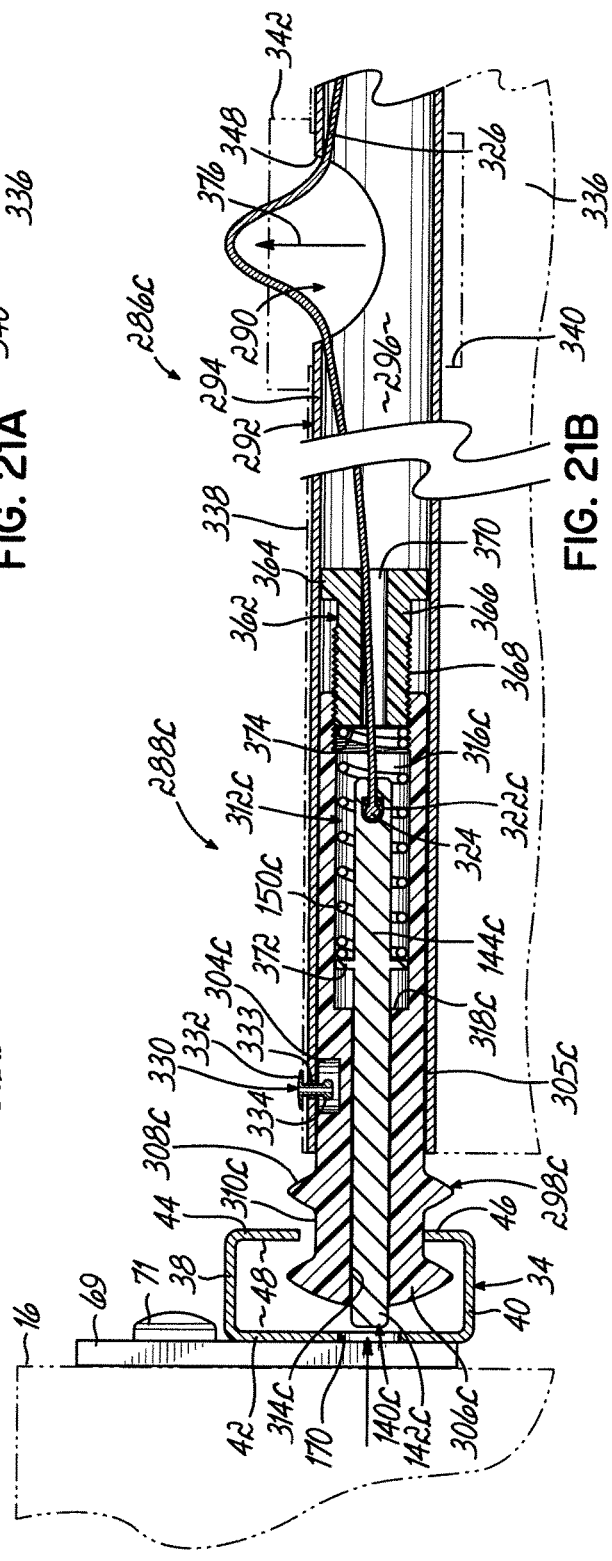
FIG. 21A
FIG. 21B

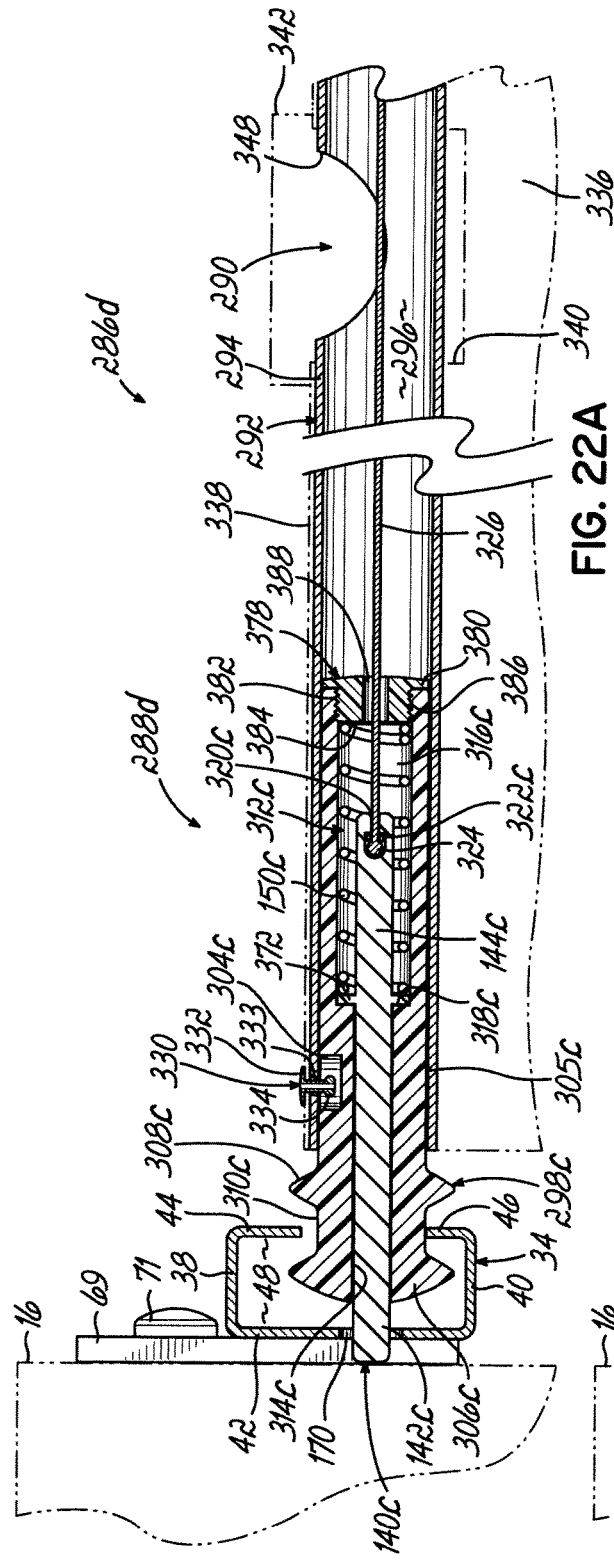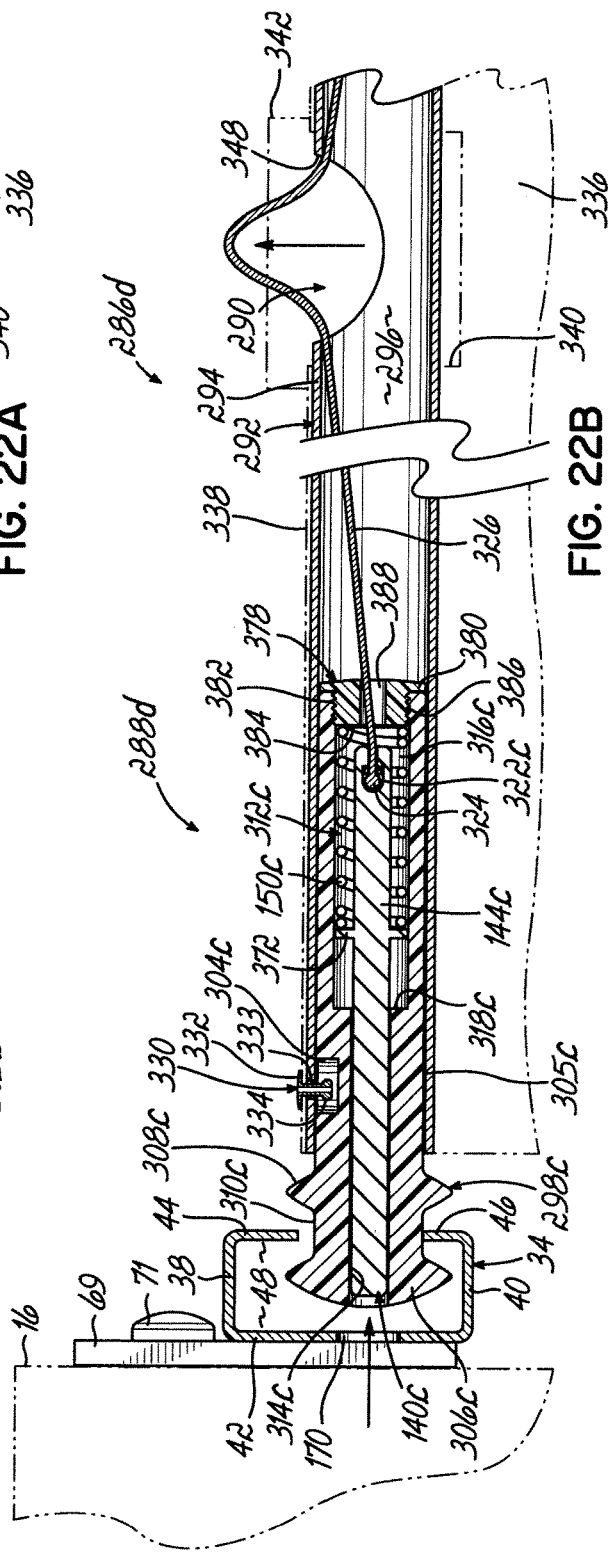

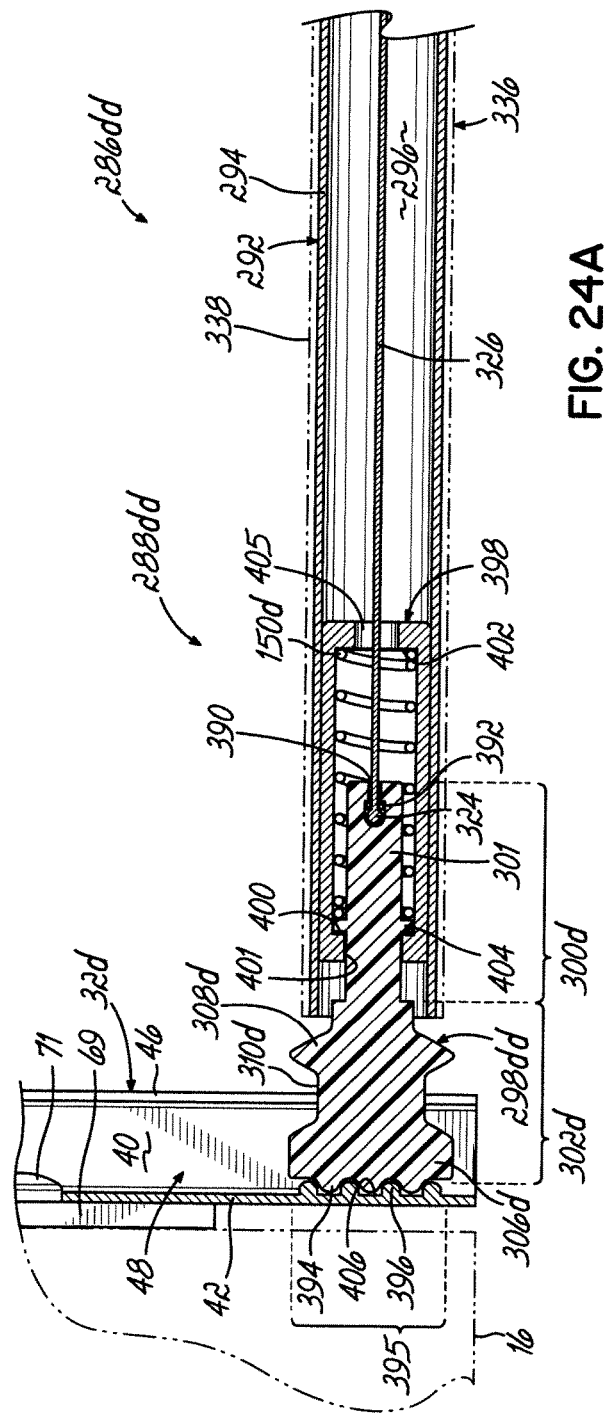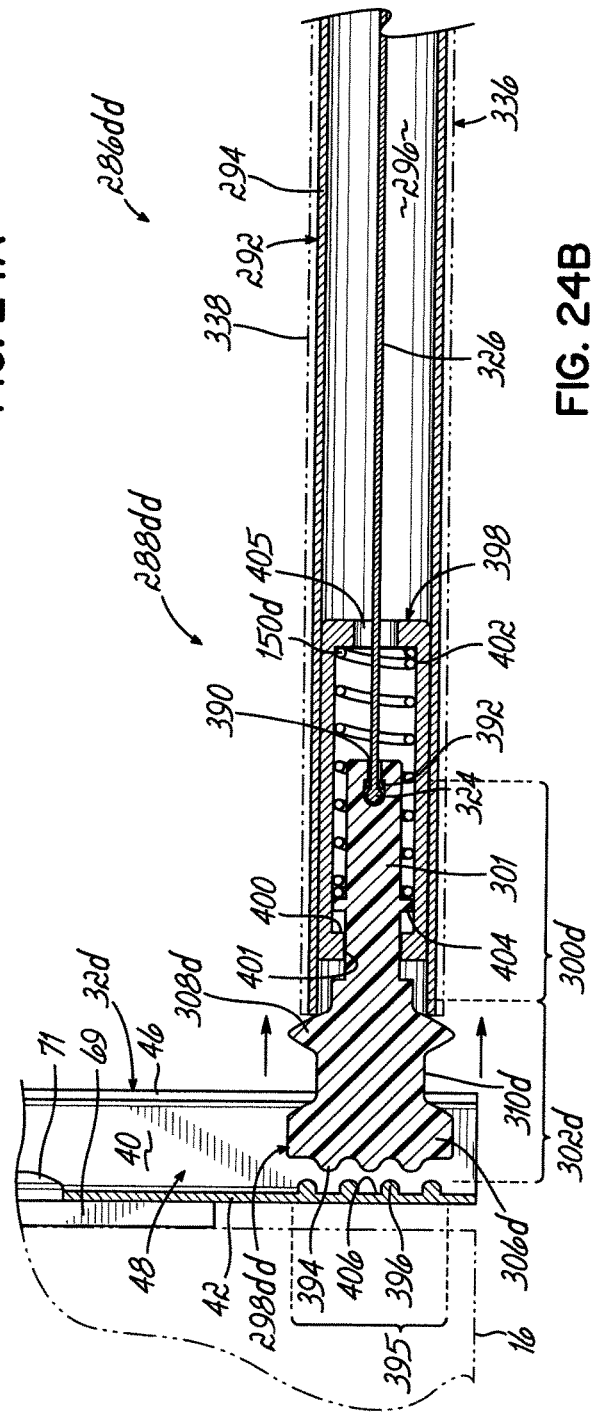
FIG. 24A
FIG. 24B

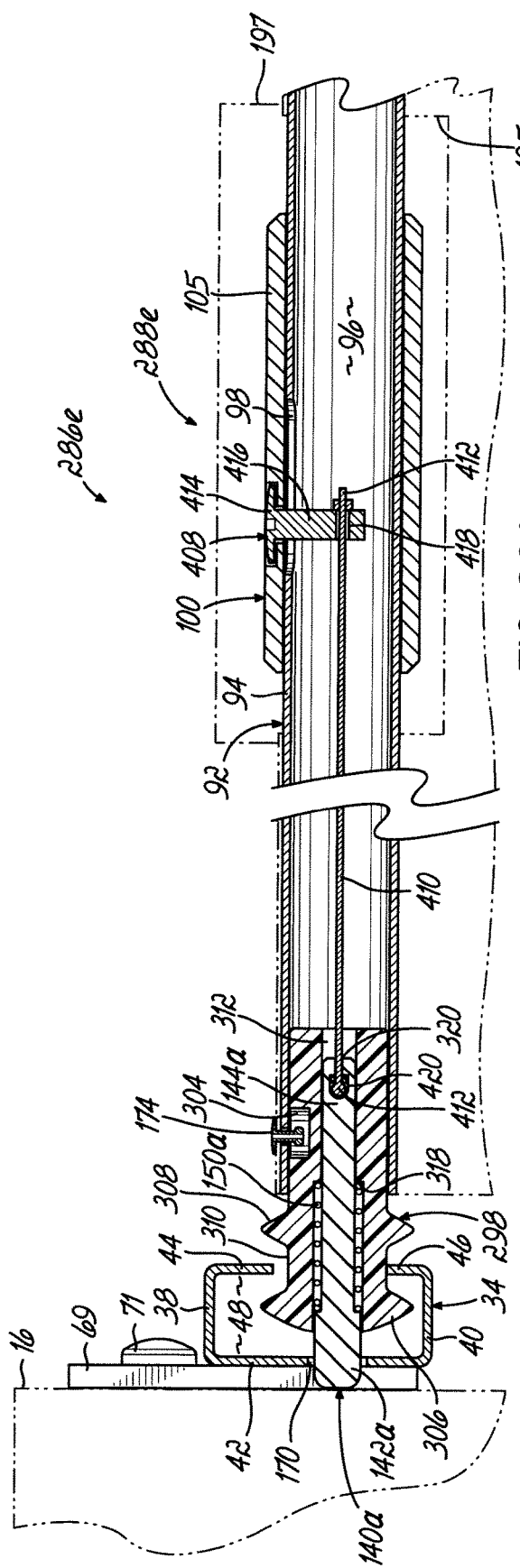
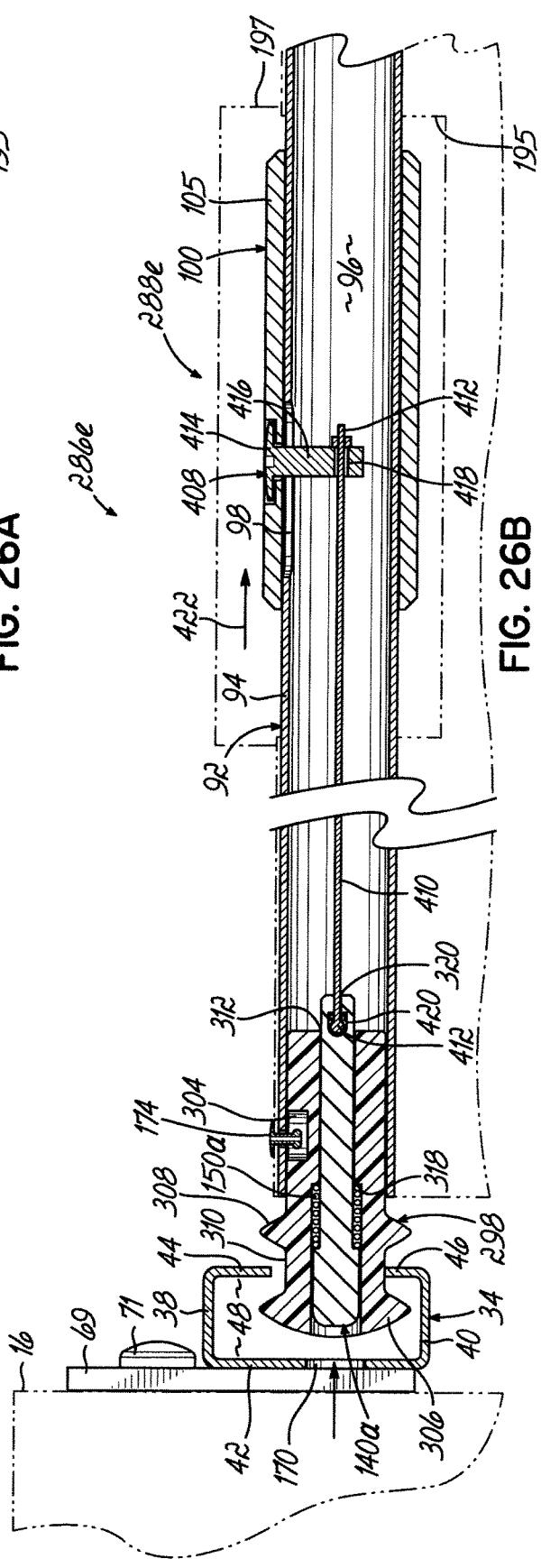
FIG. 26A
FIG. 26B

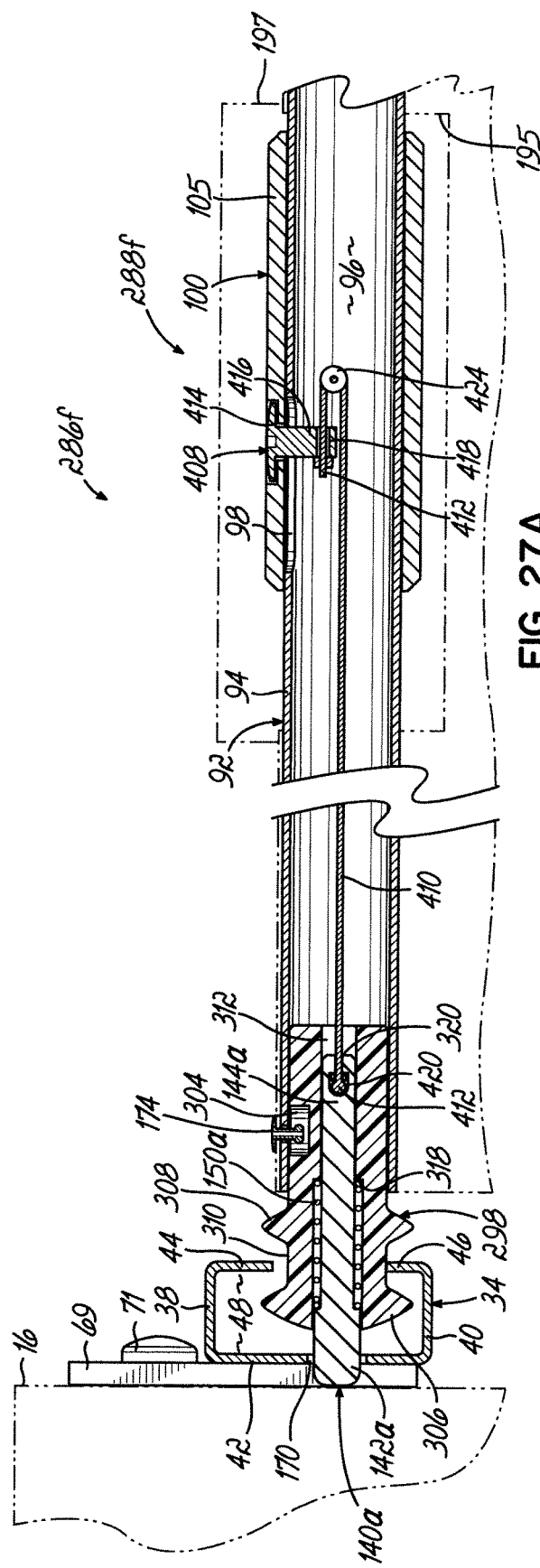
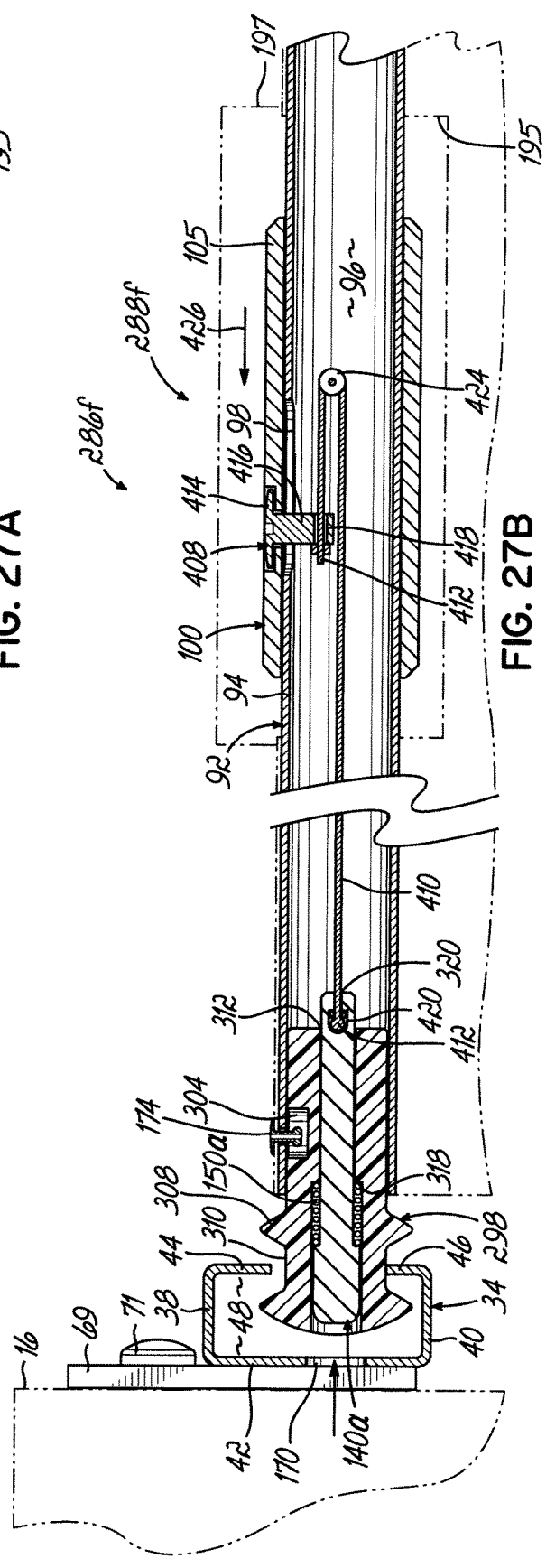
FIG. 27A
FIG. 27B

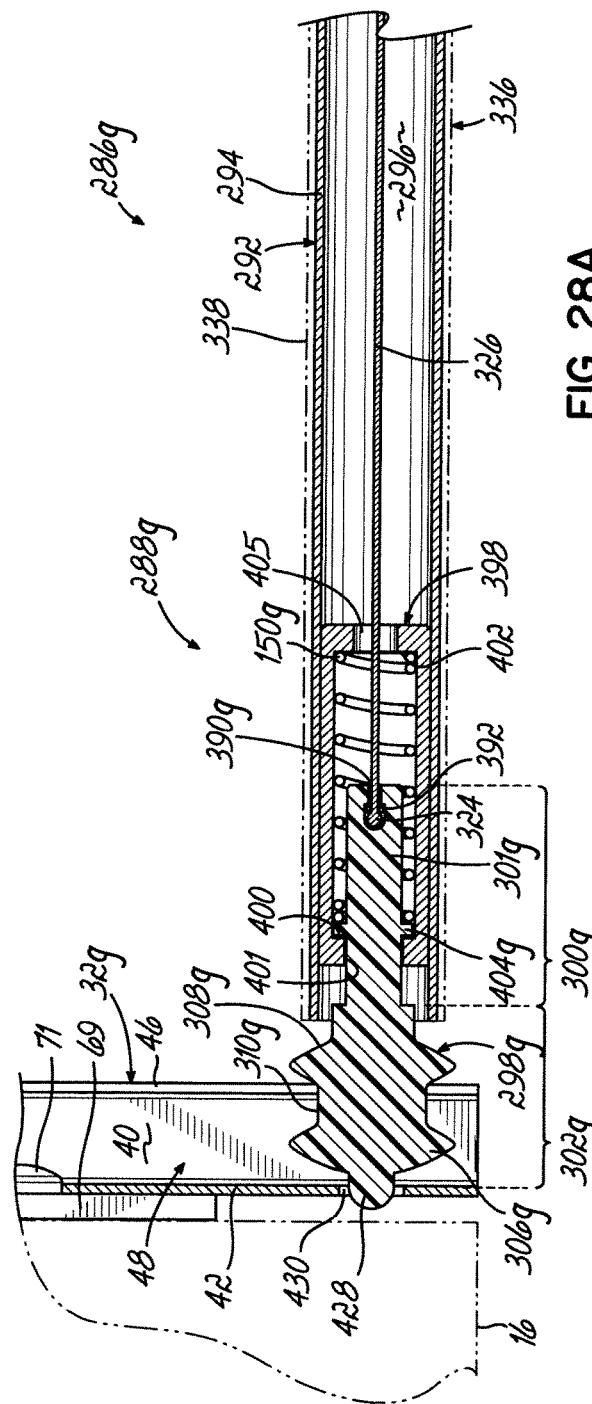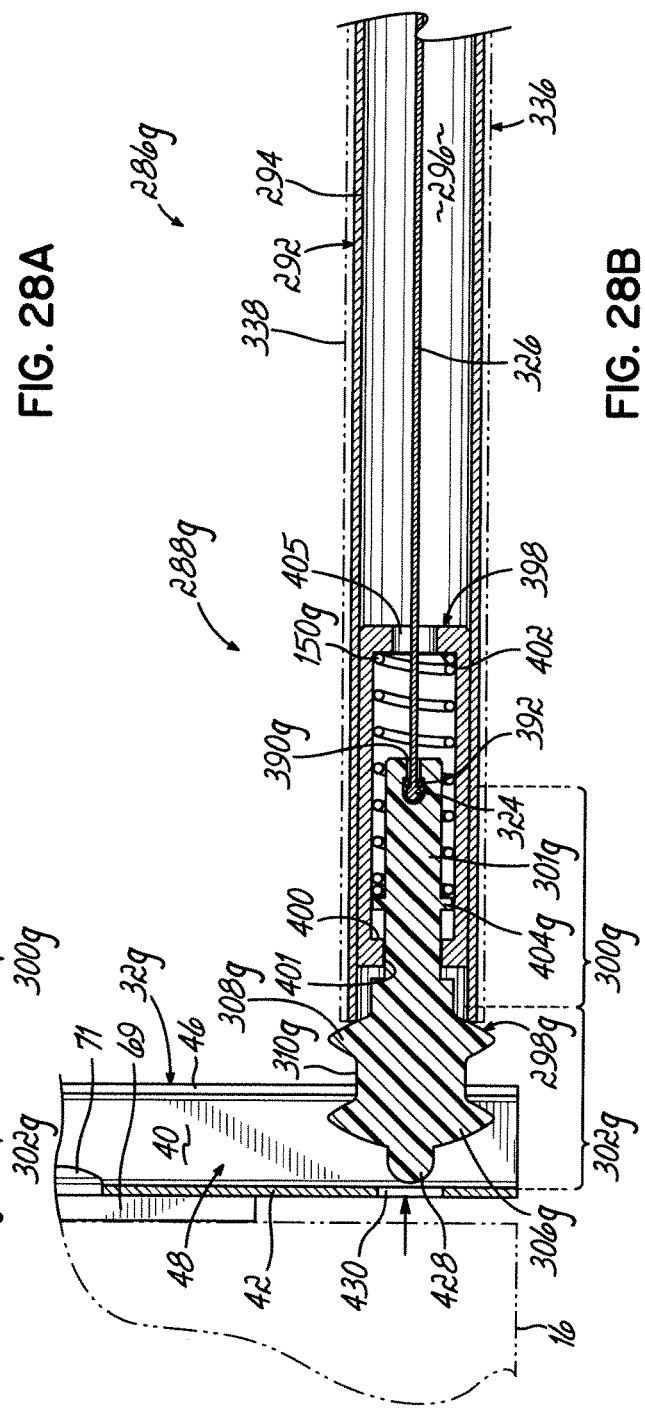

FIG. 29

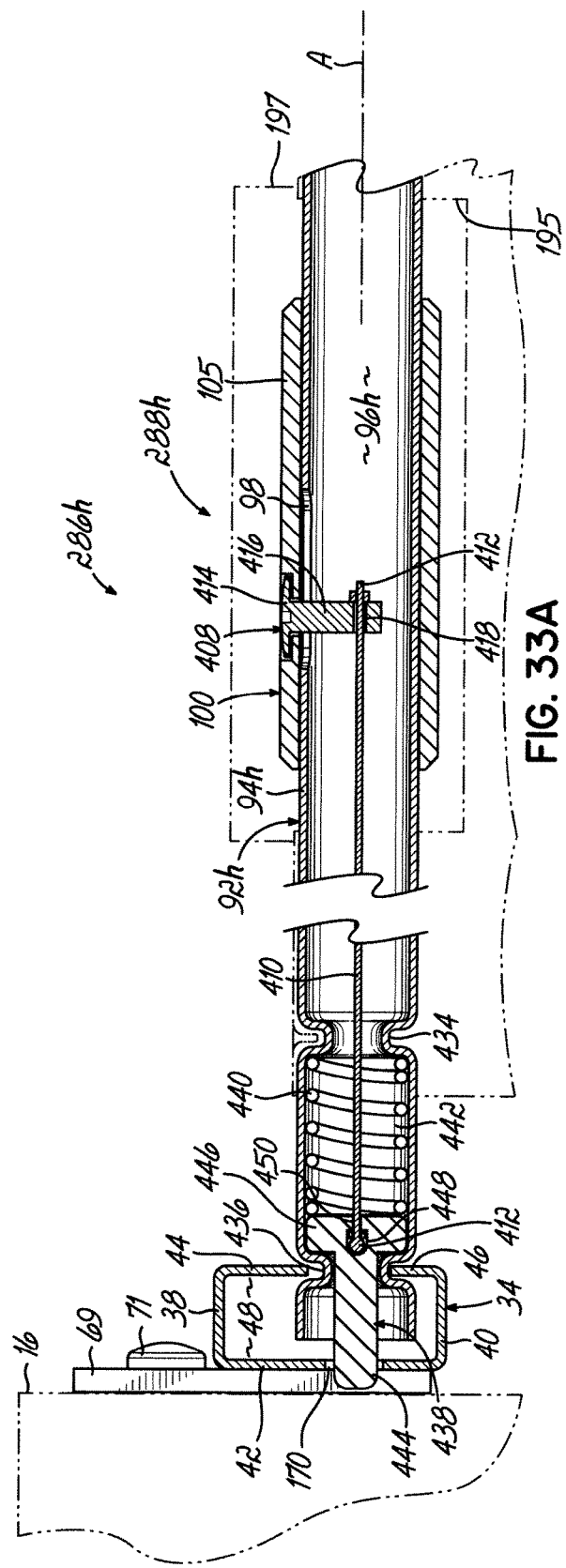
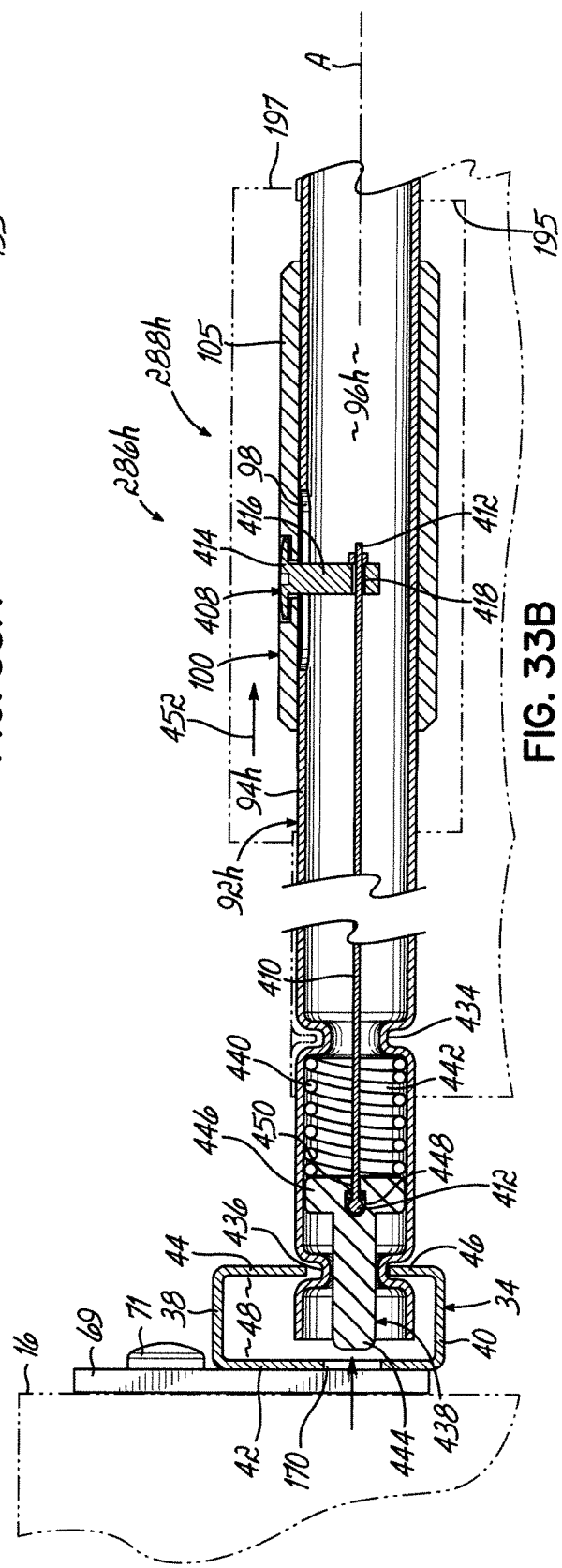
FIG. 33A
FIG. 33B

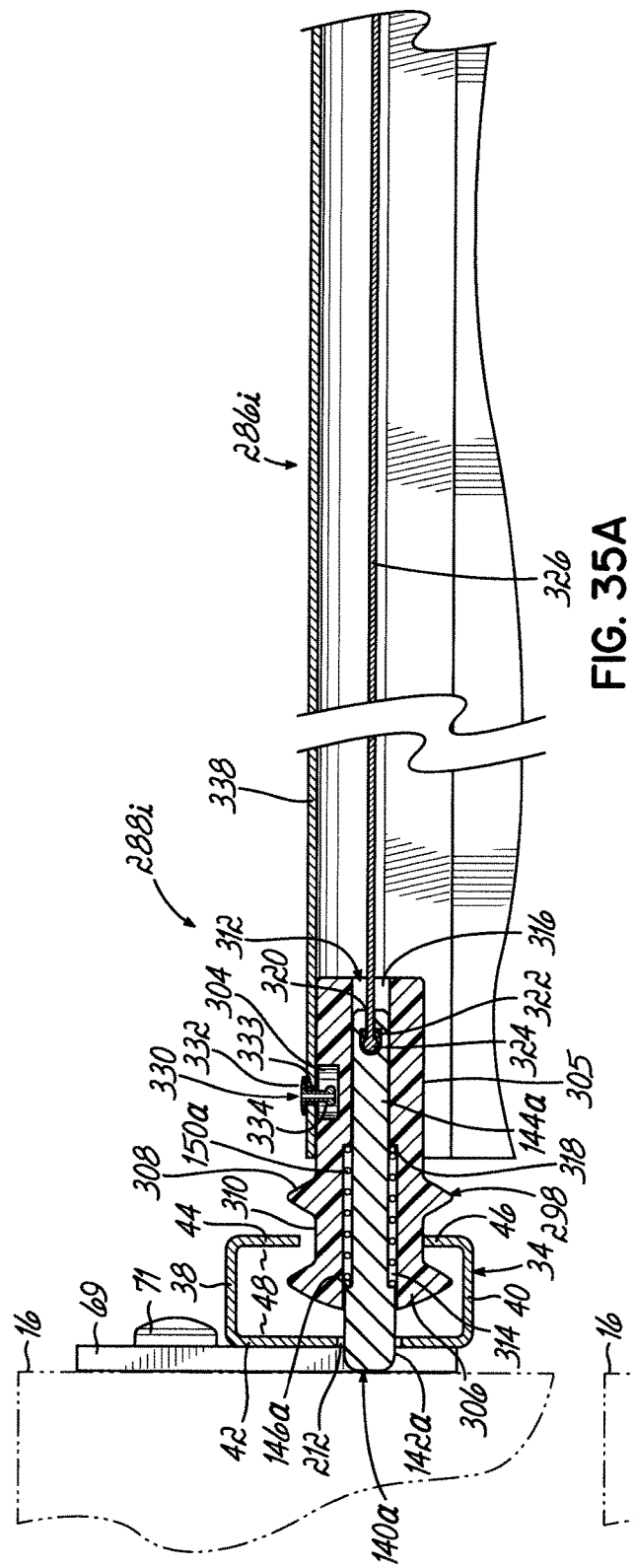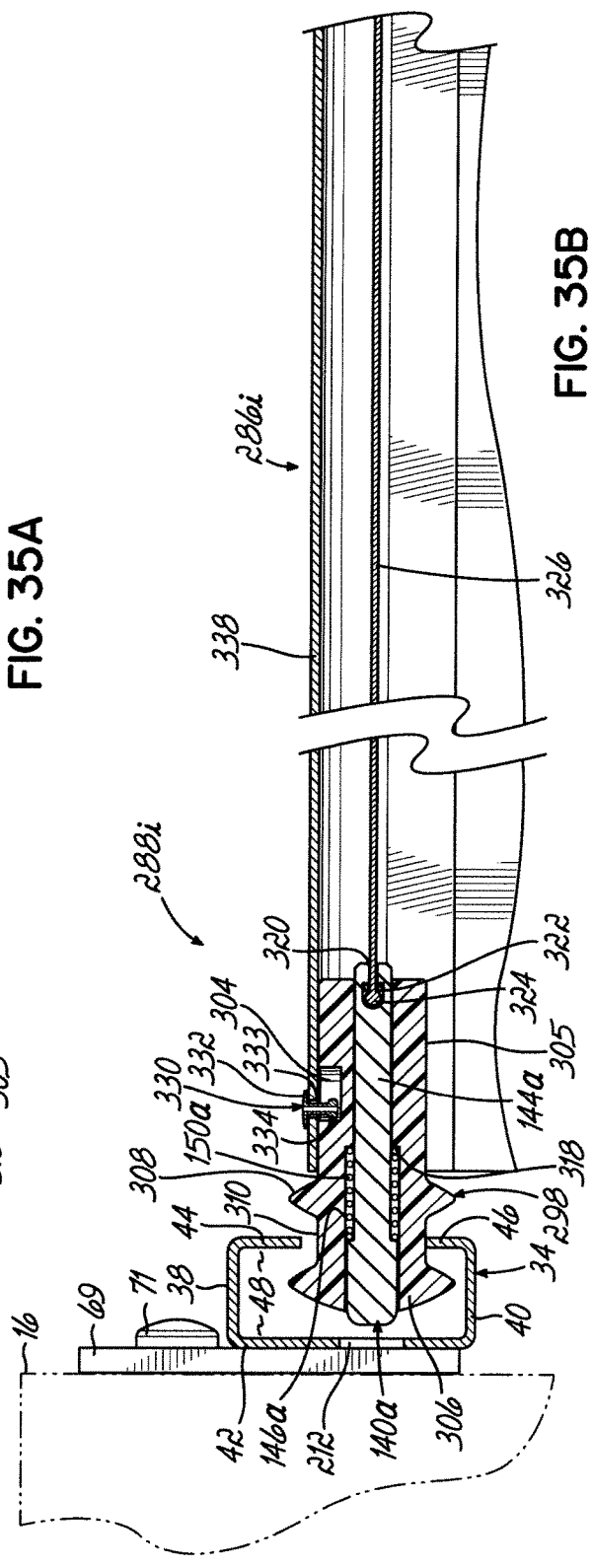

CONTAINER HAVING AT LEAST ONE LOCKABLE CROSSBAR ASSEMBLY MOVABLE ALONG TRACKS

CROSS REFERENCE TO RELATED APPLICATIONS

This application claims the benefit of U.S. Provisional Patent Application Ser. No. 62/364,057 filed Jul. 19, 2016 and the benefit of U.S. Provisional Patent Application Ser. No. 62/328,683 filed Apr. 28, 2016. Both applications are fully incorporated by reference herein.

FIELD OF THE INVENTION

The present invention relates to containers for use in shipping and, more particularly, to containers with at least one lockable crossbar assembly for maintaining dunnage supports and dunnage in a desired location.

BACKGROUND OF THE INVENTION

Different container structures are utilized by manufacturers to ship a variety of different products to end users, which may be, for example, assembly plants. In the automobile industry, for example, an assembly plant assembling a particular automobile might utilize a number of different parts from different manufacturers. These manufacturers ship their respective parts to the assembly plant in container structures where the parts are then removed from dunnage or support members inside the container structure and assembled into a finished automobile.

Access to the product in the containers is of particular concern. Specifically, in the automotive industry, the containers full of product are positioned on an assembly line adjacent to a work area, which is associated with a particular product to be installed on a manufactured vehicle. For example, a container full of interior door panels is usually positioned next to a particular station on an assembly line where interior door panels are installed so that a line worker may easily access the door panels inside the container. The product or part is taken directly from the container and used on the line. Some existing containers are difficult to access, which makes removal of the parts therein difficult and time-consuming. For example, some containers are configured so that a line worker must walk around the container to remove parts or products from opposite ends of the container. As may be appreciated, a line worker only has a certain amount of time to install a part. Any delay in access and removal of the part from the container is undesirable.

In some automotive manufacturing plants, turntables may be provided which enable a container to be rotated. However, the installation of such turntables adds to the cost of production, takes up valuable floor space and reduces plant flexibility.

In many containers, a line worker or employee must insert or remove parts from a distal or rear part of the container. The size and/or weight of the parts or workpieces may cause stress or strain on the line worker and, more particularly, on the back of the worker when inserting or removing parts from such a container. Such ergonomically unfriendly movements may cause physical trauma, pain and other injuries that may lead to lost production time.

In some situations, in order to alleviate such stress and/or strain on his or her body, the line worker may move to the rear or opposite end of the container to remove parts from inside the container. This requires space around the container which may not be available, depending on the physical layout of the plant or facility. The length (front to back) of certain containers may be limited because the container manufacturer needs to eliminate the need for a line worker to walk around the container to remove product from inside the container. Such containers having a reduced length reduce the number of parts or products which may be shipped and/or stored in the container. The more containers needed to ship a predetermined number of parts, the greater the cost to the shipper.

In other containers, a line worker or employee must lean forward and bend down into the container to insert or remove a part or workpiece from a lower portion of the container. This movement by the line worker is ergonomically unfriendly because the line worker must lean forward and bend down and lift a part or workpiece up and over a wall of the container to remove the part or workpiece from inside the container. Similarly, when a part or workpiece must be inserted into a container, the line worker may have to lean forward and insert the part, which may be heavy, into its proper location inside the container, again experiencing ergonomically unfriendly movements. Such movements may be necessary with many top loading containers and/or containers having multiple layers or levels of parts.

Depending upon the number of times the line worker repeats this unnatural motion into the interior of the container, strain in the back, legs and arms may result. The size and/or weight of the parts or workpieces may increase the strain on the line worker. Thus, simply removing multiple parts during a work day may cause physical trauma, pain and other injuries that may lead to lost production time.

Containers which solve the difficulties identified above have crossbar assemblies which move freely along opposed tracks. The tracks may be non-linear tracks, including generally L-shaped tracks, such as those disclosed in U.S. Pat. Nos. 9,004,307; 9,010,563; 9,051,112; 9,051,113; and 9,233,790, each fully incorporated herein. Other examples of non-linear tracks include generally U-shaped tracks, such as those disclosed in U.S. Pat. Nos. 9,221,999; 9,422,081 and 9,382,039, each fully incorporated herein.

Some of the containers disclosed in these patents have a door at the front of the container which, when raised, keeps unlockable crossbar assemblies in an upper generally horizontally oriented portion of the tracks, thereby preventing the crossbar assemblies from falling into the generally vertically oriented portions of the tracks. However, in some applications, a door is not desirable.

In these and other containers, when the container is empty or partially empty of products, the movable dunnage supports, and dunnage suspended by them, may undesirably move inside the container during shipment, possibly creating noise and potentially damaging a portion of the container.

Accordingly, a need exists for a container without a door having generally non-linear tracks which has the ability to keep dunnage supports in upper generally horizontally oriented portions of the tracks so the dunnage supports do not fall into generally vertically oriented portions of the tracks during transport.

Furthermore, there is a need for a container which has at least one crossbar assembly which may be locked in a desired location inside the container.

There is further a need for a container without a door which has dunnage supports which may be secured in a desired location by at least one lockable crossbar assembly.

There is further a need for a selectively lockable crossbar assembly for use in a reusable shipping container which may be locked in a desired location quickly and easily by an operator.

SUMMARY OF THE INVENTION

The present invention provides a container for holding product therein during shipment. The container comprises a base and two opposed sides. The base and sides may be part of a metal frame or part of a plastic pallet box.

A track is supported by each of the opposed sides of the container. In one embodiment, each track may be a stationary generally L-shaped track having a generally horizontally oriented portion and a generally vertically oriented portion extending downwardly from the generally horizontally oriented portion towards a base. In other embodiments, each non-linear track may be, but is not limited to, a generally U-shaped or C-shaped or J-shaped track. In some embodiments, each track may be linear or straight.

For purposes of this document, the term "track" may be a unitary member or multiple components secured together. The present invention is not intended to be limited to the tracks like those illustrated and described herein. For example, a "track" may comprise a rail attached to one or more sides of a container or a groove therein. The term "track" is intended to include any stationary apparatus which directs movement of crossbar assemblies, as defined and/or illustrated herein. The crossbar assemblies may slide or move along the tracks during loading or unloading of products from dunnage inside the container. For purposes of this document, the term "track" is not intended to be limited to an element separable from the shell of the container.

It is within the contemplation of the inventors that one or more tracks, or a portion thereof, may be movable to assist in selectively locking or unlocking the position of one or more crossbar assemblies or dunnage supports.

The container further comprises a plurality of movable dunnage supports engaged with the tracks. Each dunnage support may extend between opposed tracks and may comprise any number of components, including a single unitary piece. The container may further comprise at least one lockable crossbar assembly which may be locked in a selected position. The lockable crossbar assembly may have at least one locking assembly. One locking assembly may include an inter-engaging locking pin which may be moved between an extended position and a retracted position.

A lockable crossbar assembly may have two locking assemblies, one on each end of the lockable crossbar assembly. An operator may lock the lockable crossbar assembly in a fixed position by extending the locking pins so they enter openings. The openings may extend through the tracks of the container or into the container itself. An operator may unlock the lockable crossbar assembly so the lockable crossbar assembly can move along the tracks by retracting the locking pins so they enter/exit the openings. The locking pins may be biased in an extended position by at least one spring. Movement of the locking pins may be accomplished by an operator pulling a cord or other mechanism extending between the locking assemblies to retract the locking pins out of their extended positions and out of engagement with openings in the tracks or elsewhere. The locking pins of the locking assemblies of a lockable crossbar assembly may be selectively moved by an operator to engage and disengage the locking pins from the tracks. The locking pins of the locking assemblies of a lockable crossbar assembly may be selectively engaged by an operator to fix the location of the lockable crossbar assembly relative to the tracks.

Regardless of the shape of the tracks, a portion of each lockable crossbar assembly remains inside an interior of the track regardless of whether the lockable crossbar assembly is in a locked or unlocked position. In other words, regardless of whether the lockable crossbar assembly is in a locked or unlocked position, end portions of all crossbar assemblies or dunnage supports, including any or all of the lockable crossbar assemblies, remain engaged with the tracks causing the crossbar assemblies to travel along a predetermined path defined by the tracks. The dunnage supports and end portions of each lockable crossbar assembly remain engaged with the tracks and travel along a path defined by the tracks regardless of whether one or more lockable crossbar assembly is in a locked position.

The container further comprises dunnage supported by at least some of the dunnage supports and the lockable crossbar assembly. The dunnage may be pouches or any other known dunnage. The dunnage may be secured to at least one lockable crossbar assembly and at least some dunnage supports in any known manner, such as sewing.

According to another aspect of the invention, a lockable crossbar assembly for use in a shipping container moves along a predetermined path defined by tracks inside the container. The lockable crossbar assembly comprises a crossbar and two handles, each handle having a hollow interior through which the crossbar passes. The lockable crossbar assembly further comprises two end members, each end member having a bore through the end member. The lockable crossbar assembly further comprises two locking pins, each locking pin being spring loaded in an extended position and extending through the bore of one of the end members, wherein the locking pins may be retracted by an operator moving the handles, thereby moving the lockable crossbar assembly from a locked position, in which the locking pins are inside openings in the tracks to an unlocked position in which the lockable crossbar assembly may move along a path defined by opposed tracks secured to the container. A portion of each lockable crossbar assembly remains inside the opposed tracks regardless of the location of the lockable crossbar assembly to enable the lockable crossbar assembly to travel along a path defined by the tracks.

Due to the tracks, movable dunnage supports and dunnage supported thereby, a person loading the container from the front of the container need not stretch or reach to the back of the container to insert or load product into the container. The loader of the container may push the dunnage supports and associated dunnage loaded with product rearwardly and load additional product in a more ergonomically friendly position or manner. For example, after product is loaded into dunnage suspended by adjacent dunnage supports, these dunnage supports and associated dunnage are pushed rearwardly to enable the loader to load additional product. Thus, the container allows product to be more efficiently and safely removed from the container or inserted therein without unnecessary stress or strain on the operator.

The end members of the lockable crossbar assemblies and dunnage supports may be made of plastic or any other desired material. Each side of the container may have non-linear tracks along which the lockable crossbar assemblies and dunnage supports move to move dunnage supported thereby closer to the user for loading or unloading product. Each end member may have at least one head located inside the interior of the track or outside the track so the end member remains engaged with the track or remains contacting the track. The end member may have at least one head outside the track for preventing the dunnage material from entering the interior of the track.

The ease of operation and other objects and advantages of the invention shall be made apparent from the accompanying drawings and the brief description thereof.

BRIEF DESCRIPTION OF THE DRAWINGS

The accompanying drawings, which are incorporated in and constitute a part of this specification, illustrate embodiments of the invention and, together with a general description of the invention given above and the detailed description of the embodiments given below, serve to explain the principles of the invention.

FIG. 5A is a cross-sectional view taken along the line 5A-5A of FIG. 3, a lockable crossbar assembly being locked in a desired position;

FIG. 5B is a cross-sectional view of a portion of the lockable crossbar assembly of FIG. 5A, showing one of the locking pins being retracted out of engagement with one of the openings in the tracks;

FIG. 18A is a cross-sectional view taken of a portion of the lockable crossbar assembly of FIG. 17 being locked in a desired position;

FIG. 18B is a cross-sectional view taken of a portion of the lockable crossbar assembly of FIG. 17; showing one of the locking pins being retracted out of engagement with one of the openings in one of the tracks;

FIG. 18C is a cross-sectional view taken of a portion of another lockable crossbar assembly being locked in a desired position;

FIG. 18D is a cross-sectional view taken of a portion of the lockable crossbar assembly of FIG. 18C; showing one of the locking pins being retracted out of engagement with one of the openings in one of the tracks;

FIG. 19A is a cross-sectional view taken of a portion of the lockable crossbar assembly of FIG. 17 being locked in a desired position in a different track;

FIG. 19B is a cross-sectional view taken of a portion of the lockable crossbar assembly of FIG. 17; showing one of the locking pins being retracted out of engagement with the opening in the track shown in FIG. 19A;

FIG. 20A is a partially disassembled view of a portion of another version of lockable crossbar assembly and another version of track;

FIG. 20B is a cross-sectional view taken of a portion of the lockable crossbar assembly of FIG. 20A; showing one of the locking pins being retracted out of engagement with the opening in the track of FIG. 20A;

FIG. 21A is a partially disassembled view of a portion of another version of lockable crossbar assembly locked in a desired position;

FIG. 21B is a partially disassembled view of a portion of the lockable crossbar assembly of FIG. 21A, showing one of the locking pins being retracted out of engagement with one of the openings in one of the tracks;

FIG. 22A is a partially disassembled view of a portion of another version of lockable crossbar assembly locked in a desired position;

FIG. 22B is a partially disassembled view of a portion of the lockable crossbar assembly of FIG. 22A, showing one of the locking pins being retracted out of engagement with one of the openings in one of the tracks;

FIG. 24A is a cross-sectional view taken along the line 24A-24A of FIG. 23;

FIG. 24B is a cross-sectional view taken of a portion of the lockable crossbar assembly of FIG. 24A; showing one of the locking pins retracted out of engagement with the opening in the track shown in FIG. 23;

FIG. 26A is a cross-sectional view taken of a portion of the lockable crossbar assembly of FIG. 25 being locked in a desired position;

FIG. 26B is a cross-sectional view taken of a portion of the lockable crossbar assembly of FIG. 25; showing one of the locking pins being retracted out of engagement with one of the openings in one of the tracks;

FIG. 27A is a partially disassembled view of a portion of another version of lockable crossbar assembly;

FIG. 27B is a cross-sectional view taken of the portion of the lockable crossbar assembly of FIG. 27A; showing one of the locking pins being retracted out of engagement with an opening in the track shown in FIG. 27A;

FIG. 28A is a partially disassembled view of a portion of another version of lockable crossbar assembly;

FIG. 28B is a cross-sectional view taken of the portion of the lockable crossbar assembly of FIG. 28A; showing one of the locking pins being retracted out of engagement with an opening in the track shown in FIG. 28A;

FIG. 29 is a perspective view of another embodiment of reusable and returnable container;

FIG. 33 is a partially disassembled view of a portion of another version of lockable crossbar assembly;

FIG. 33A is a cross-sectional view of a portion of another version of lockable crossbar assembly;

FIG. 33B is a cross-sectional view taken of the portion of the lockable crossbar assembly of FIG. 33A; showing one of the locking pins being retracted out of engagement with an opening in the track shown in FIG. 33A;

FIG. 35A is a cross-sectional view taken of a portion of the lockable crossbar assembly of FIG. 35 being locked in a desired position;

FIG. 35B is a cross-sectional view taken of a portion of the lockable crossbar assembly of FIG. 35; showing one of the locking pins being retracted out of engagement with one of the openings in one of the tracks.

DETAILED DESCRIPTION OF THE INVENTION

Figure 1:
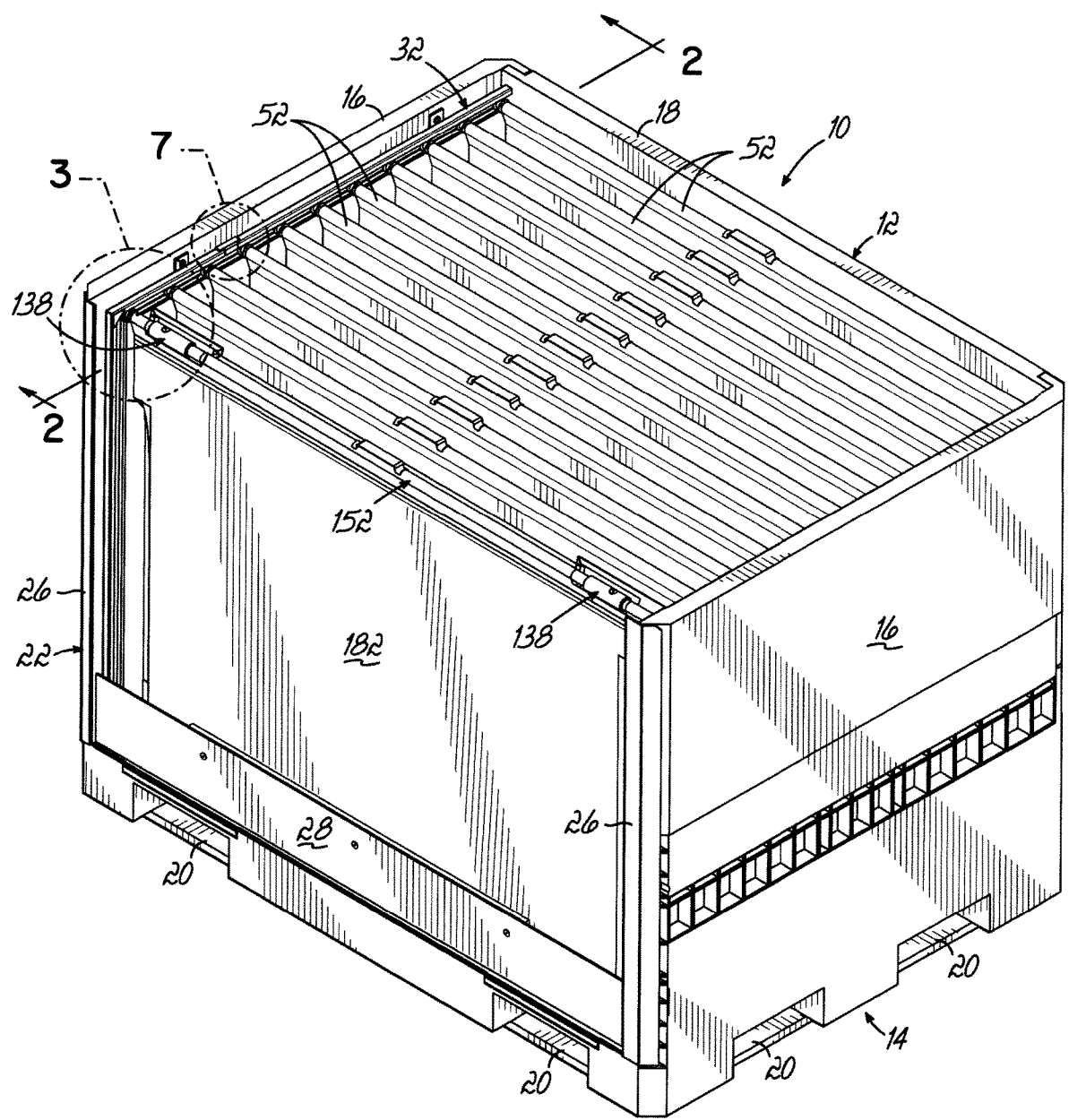
FIG. 1 is a perspective view of one embodiment of a reusable and returnable container.

Referring to FIG. 1, there is illustrated a reusable and returnable container 10 for holding products 5 therein, according to one embodiment. The reusable and returnable container 10, as shown, comprises a body 12 having a base 14, side walls 16 and a rear wall 18, all extending upwardly from the base 14. The side walls 16 and/or rear wall 18 may be hingedly secured to the base 12. The base 14 may have a plurality of passages 20 therethrough adapted to receive the prongs of a forklift for purposes of lifting and moving the reusable and returnable container 10. Although one configuration of reusable and returnable container in the form of a pallet box is illustrated, the present invention may be used with other types or configurations of containers.

Although one specific shape of product 5 is illustrated in the drawings, this document is not intended to limit in any way the size, shape or configuration of products 5 shipped or stored in any of the embodiments described or shown herein. One type of product which may be used in accordance with the present invention is car door panels.

Figure 2:
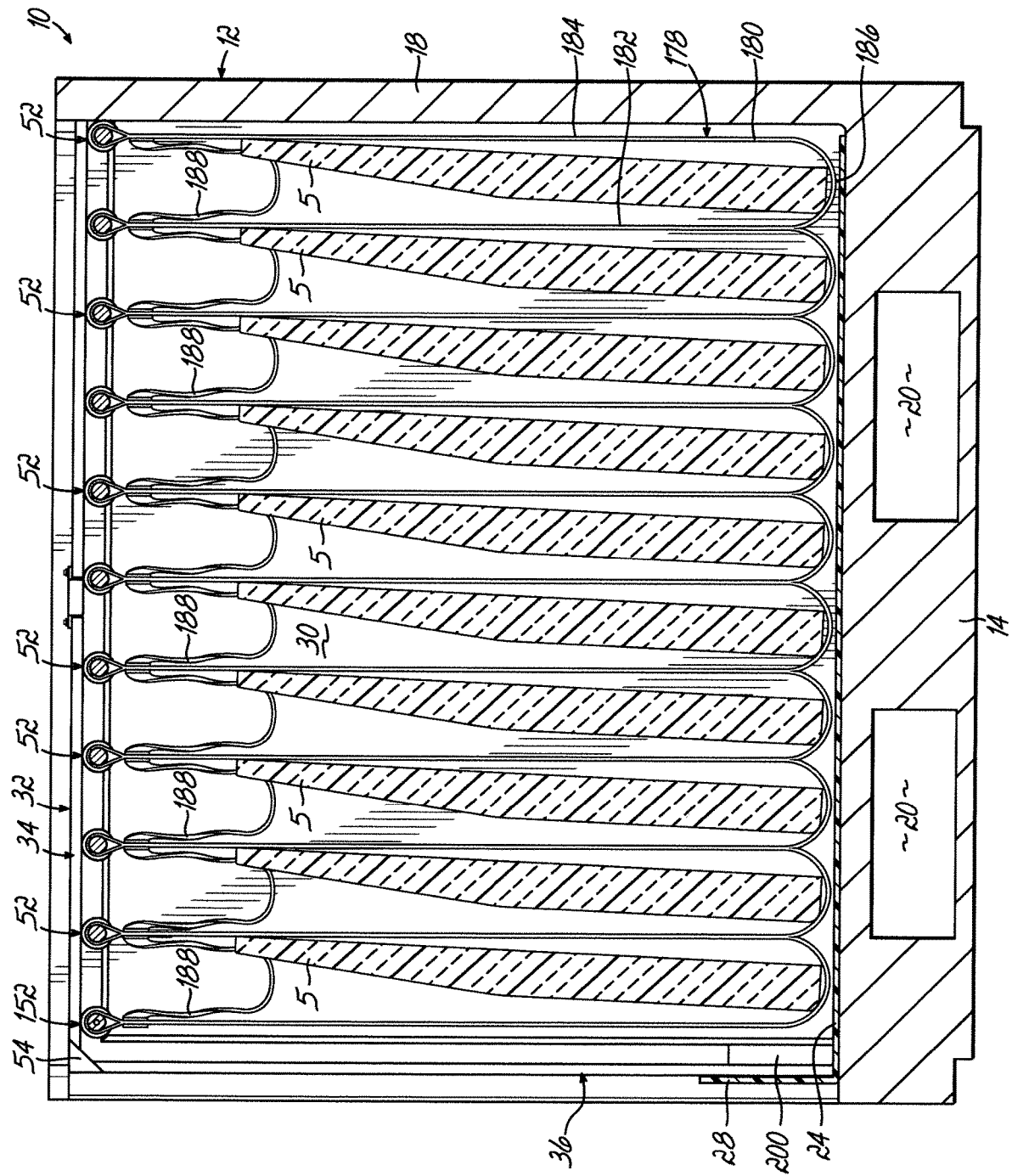
FIG. 2 is a cross-sectional view taken along the line 2-2 of FIG. 1.

As seen in FIGS. 1 and 2, a generally U-shaped front frame 22 may be fixedly secured to the container body 12, including the side walls 16 and base 14 and does not move relative to the side walls 16 after the container is assembled. The front frame 22 may be made of metal or any other suitable material. As best shown in FIGS. 1 and 2, the front frame 22 comprises a bottom 24, including a kick plate 28 and two side members 26 extending upwardly from the bottom 24. The kick plate 28 extends between the side members 26 and is generally vertically oriented as shown in the drawings when the container 10 is upright. The frame bottom 24 may be fixedly secured to the base 14 of the container 10 with rivets or fasteners (not shown), while the side members 26 of the front frame 22 may be secured to the side walls 16 with additional fasteners (not shown). In some instances, the frame bottom may be omitted.

As shown in FIG. 2, a bumper 30 may be secured to each of the side walls 16 (only one being shown) on the inside thereof. Each bumper 30 functions to protect the products 5 from contacting the side walls 16 and being scratched or damaged in some fashion. The bumpers may be made of foam or any other suitable material of any desired size. If desired, the bumpers may be omitted.

Although one type of container is illustrated, the present invention may be used with other types or configurations of container. For example, each side wall may not be a solid wall, as described below.

Figure 3:
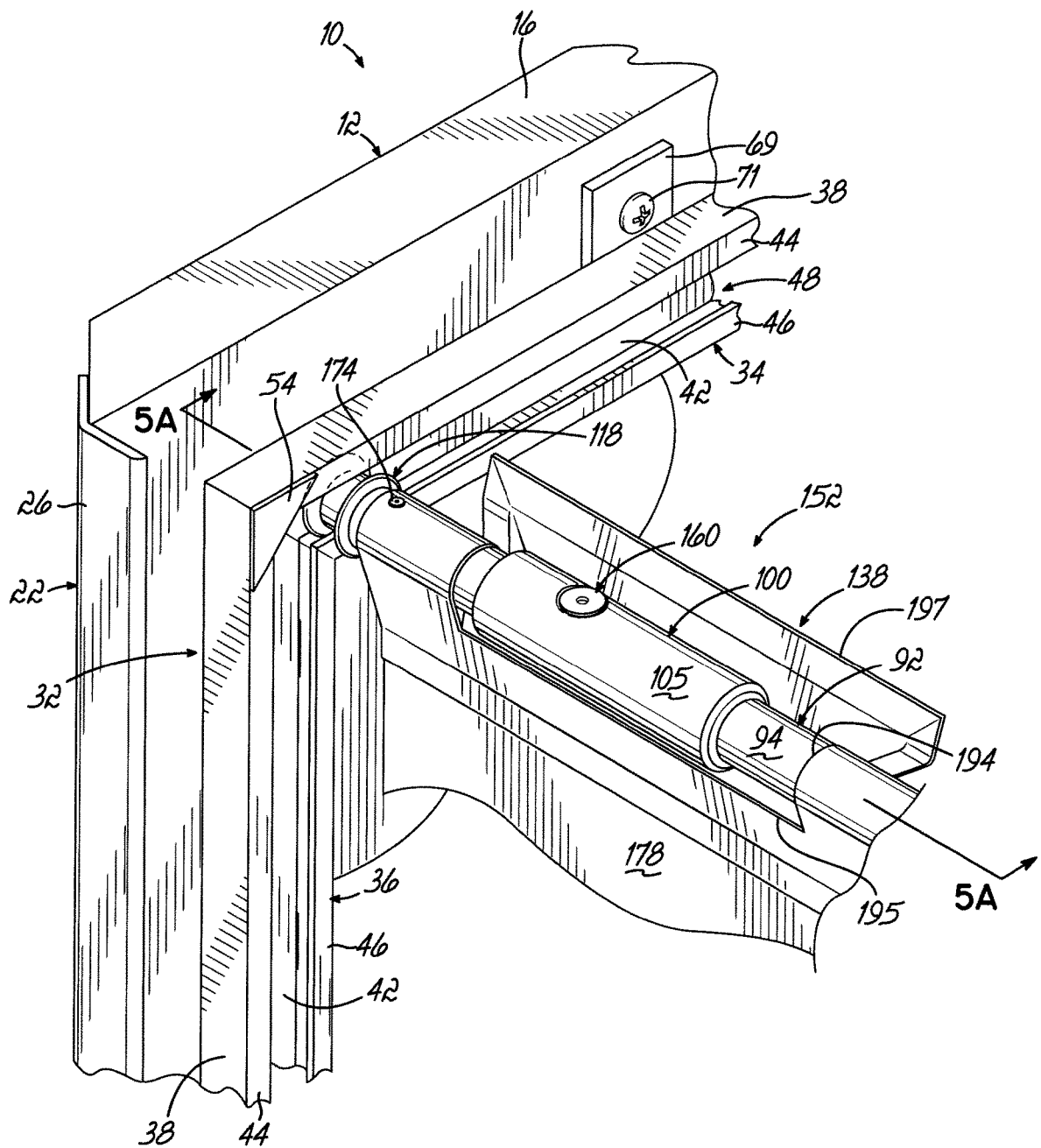
FIG. 3 is an enlarged view of the encircled area 3 of FIG. 1.

As best shown in FIGS. 2 and 3, container 10 further comprises a generally L-shaped track 32 secured to each side wall 16 of the reusable and returnable container 10. Each generally "L-shaped" track 32 does not move relative to the side wall 16 after the reusable and returnable container 10 is assembled and during the loading or unloading processes (only one generally L-shaped track 32 being shown in FIG. 2). Each generally L-shaped track 32 comprises a generally horizontally oriented track portion 34 and a generally vertically oriented track portion 36, each being fixedly secured to a side wall 16 of the reusable and returnable container 10. Each generally L-shaped track 32 may be constructed of several pieces or may be a unitary piece. A stop 200 is shown located at the bottom of each generally vertically oriented track portion 36 of each generally L-shaped track 32. However, in some applications, the stop may be omitted or a different size than that shown.

Figure 7:
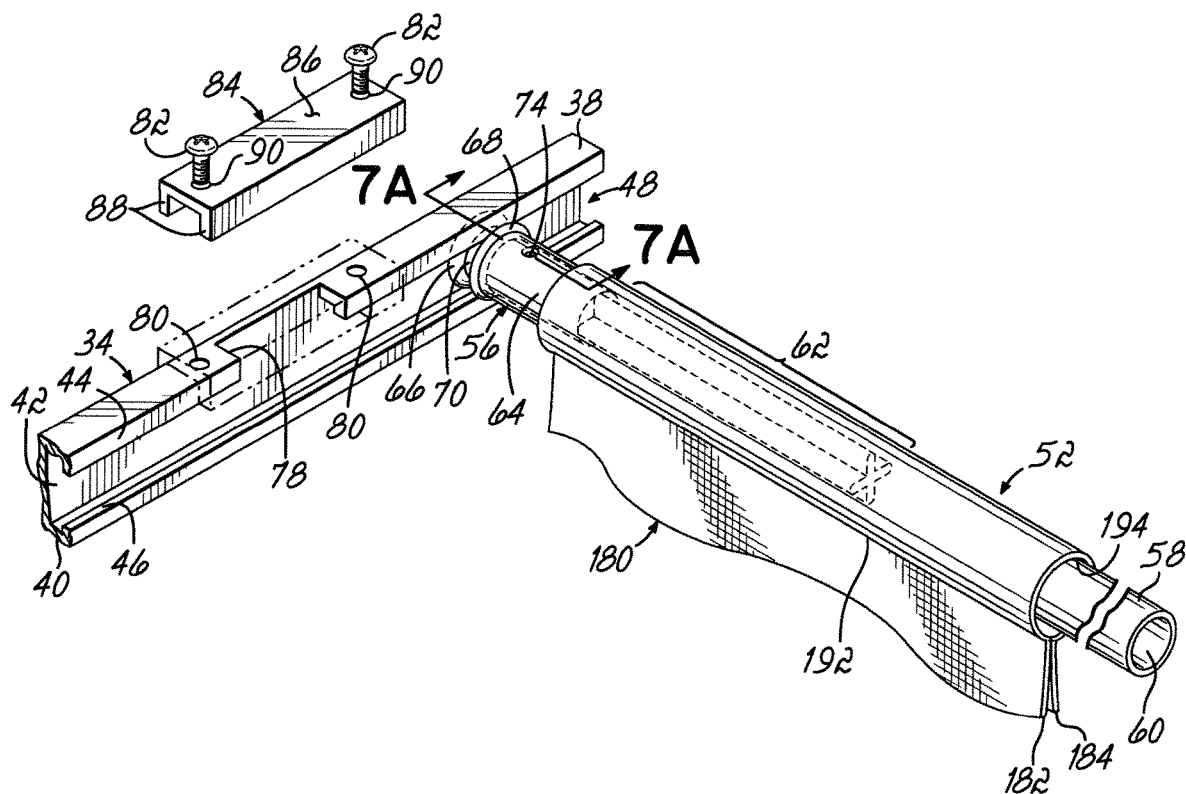
FIG. 7 is an enlarged perspective view of the encircled area 7 of FIG. 1.

As shown in FIG. 7, each generally horizontally oriented track portion 34 and each generally vertically oriented track portion 36 of each generally "L-shaped" track 32 has a cross-sectional configuration comprising an upper wall 38, a lower wall 40 joined to the upper wall 38 by a side wall 42. An upper lip 44 extends downwardly from the upper wall 38, and a lower lip 46 extends upwardly from the lower wall 40 defining an interior 48 of the generally "L-shaped" track 32. The upper and lower lips 44, 46 extend toward each other and are generally co-planar.

As shown in FIG. 3, a stationary generally L-shaped track 32 may be secured via brackets 69 to each side of the container 10. As best shown in FIGS. 5A and 5B, mounting brackets 69, welded or otherwise secured to the generally horizontally oriented track portion 34 of the generally L-shaped track 32, may be secured via fasteners 71, shown as being screws, to one of the side walls 16 of container body 12. The generally L-shaped track 32 may be secured in any desired manner to each side of the container 10. For example, the side wall 42 of the generally L-shaped track 32 may be secured to an inside surface of one of the container side walls 16 without brackets. The apparatus used to hold the tracks in place is not intended to be limiting and is not intended to be part of the present invention.

As best shown in FIGS. 6A-6D, generally vertically oriented track portion 36 of generally L-shaped track 32 may be fixedly secured to each side wall 16 of the reusable and returnable container 10. The generally vertically oriented track portion 36 and generally horizontally oriented track portion 34, each being fixedly secured to one of the side walls 16 of the reusable and returnable container 10, do not move after the reusable and returnable container 10 is assembled and do not move relative to the side walls 16 of the reusable and returnable container 10 during the loading or unloading of parts or products. On each side of the reusable and returnable container, the top of the generally vertically oriented track portion 36 may connect or communicate with the front end of the generally horizontally oriented track portion 34 at corner 50. The generally vertically oriented track portion 36 may be the same construction and/or material as the horizontally oriented track portion 34, or they may be slightly different. The interior 48 of the generally horizontally oriented track portion 34 connects with the interior of the generally vertically oriented track portion 36 so that the lockable crossbar assembly 152 and dunnage supports 52 may move along a continuous path in both a horizontal and vertical direction. The generally horizontally oriented track portion 34 and generally vertically oriented track portion 36 may be separate pieces welded or joined together, or may be a unitary generally L-shaped piece of track fixedly secured to each of the side walls 16. In either event, a corner piece 54 may be welded or otherwise secured to each corner 50 to prevent the end members or portions of the crossbar assembly 152 and dunnage supports 52 from coming out of the tracks at the corner.

Figure 7A:
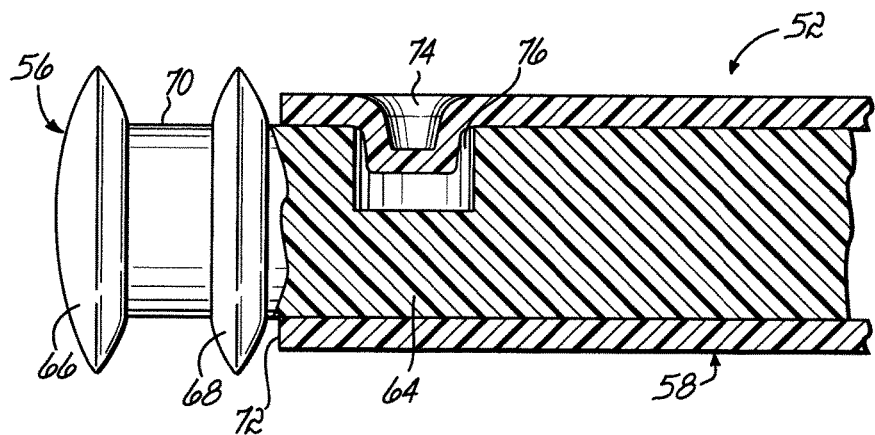
FIG. 7A is a cross-sectional view taken along the line 7A-7A of FIG. 7.

Referring to FIG. 2, reusable and returnable container 10 further comprises a plurality of dunnage supports 52 and one lockable crossbar assembly 152, the lockable crossbar assembly 152 being in front of the dunnage supports 52 extending between corresponding tracks. Although one lockable crossbar assembly 152 is illustrated, any number of lockable crossbar assemblies 152 may be used in any embodiment of container shown or described herein, including all of the crossbar assemblies being lockable. FIGS. 7 and 7A illustrate the details of one of the dunnage supports 52, while FIGS. 3, 4, 5A and 5B illustrate the details of one of the lockable crossbar assemblies 152.

Although the drawings show each dunnage support 52 comprising multiple components in an assembly, it is within the scope of the present invention that each dunnage support 52 be a unitary member as disclosed in U.S. Pat. No. 9,120,597 or U.S. patent application Ser. No. 14/281,246 or U.S. patent application Ser. No. 14/539,115, each of which is fully incorporated by reference herein.

As shown in FIG. 7, one version of dunnage support 52 includes a pair of end members 56 and a tubular middle member 58 having a hollow interior 60 extending therebetween. The end members 56 are preferably made of injection molded plastic, such as nylon, but may be made of any other material. The tubular middle member 58 is preferably made of metal, but may be made of other suitable material, such as plastic.

As shown in FIG. 7, each end member 56 preferably has a first portion 62 having an X-shaped cross-sectional configuration, and a second portion 64 having a circular cross-sectional configuration. Although one configuration of end member 56 is illustrated, any type or configuration of end member may be used with the present invention. In this embodiment, each end member 56 has a pair of heads 66, 68 at the end of the end member 56. Outer head 66 is furthest from the first portion 62 of each end member 56, and inner head 68 is spaced inwardly from outer head 66. The outer and inner heads 66, 68, respectively, of each end member 56 are spaced from one another to define a groove 70 therebetween. The groove 70 of each end member 56 receives and retains the lips 44, 46 of one of the generally L-shaped tracks 32 during travel of the dunnage support 52 along a path defined by the tracks. As shown in FIG. 7, outer head 66 is located inside the interior 48 of the generally L-shaped track 32, and inner head 68 is located outside the interior 48 of the generally L-shaped track 32. Outer head 66 keeps the end member 56 engaged with the track. Inner head 68 keeps the dunnage material out of the interior 48 of the track, thereby ensuring that the end members 56 may move smoothly along the generally L-shaped tracks 32 or any other tracks shown or described herein.

As shown in FIG. 7A, each end of tubular middle member 58 fits over at least one of the first and second portions 62, 64 of an end member 56. An end surface 72 of tubular middle member 58 abuts inner head 68 of end member 56. Each end member 56 of each dunnage support 52 is adapted to engage and move along one of the tracks. The end members 56 preferably slide along the tracks; however, different end members may rotate, rather than slide, along the tracks. Although one configuration of track and end member is shown and described, other types of end members and tracks may be used if desired.

As best shown in FIG. 7A, each dunnage support 52 includes a pair of end members 56 (only one being shown in FIG. 7A). Each end member 56 has a groove 70 formed in a second portion 64 therein. Dunnage support 52 further includes a tubular middle member 58 having a hollow interior 60 extending therebetween. As shown in FIG. 7, each end of tubular middle member 58 fits over at least one of the first and second portions 62, 64 of an end member 56. The tubular middle member 58 is preferably made of metal, but may be made of other suitable material, such as plastic. As shown in FIG. 7A, tubular middle member 58 has two detents 74 therethrough (one at each end) in which the material of the tubular middle member 58 is pressed downwardly into an opening 76 in the second portion 64 of the end member 56. This attachment between each of the two end members 56 and the tubular middle member 58 enables some movement therebetween. Such interaction between the end members 56 and tubular middle member 58 allows for a tolerance of approximately one-quarter inch on each side. The detents 74 prevent separation of the tubular middle member 58 from the end members 56 while allowing some movement therebetween as the detents 74 move within the openings 76 formed in the end members 56.

Although one configuration of dunnage support in the form of an unlockable crossbar assembly is illustrated, the present invention may be used with any type or configuration of dunnage support for supporting dunnage so the dunnage may slide or move inside the container.

Figure 7B:
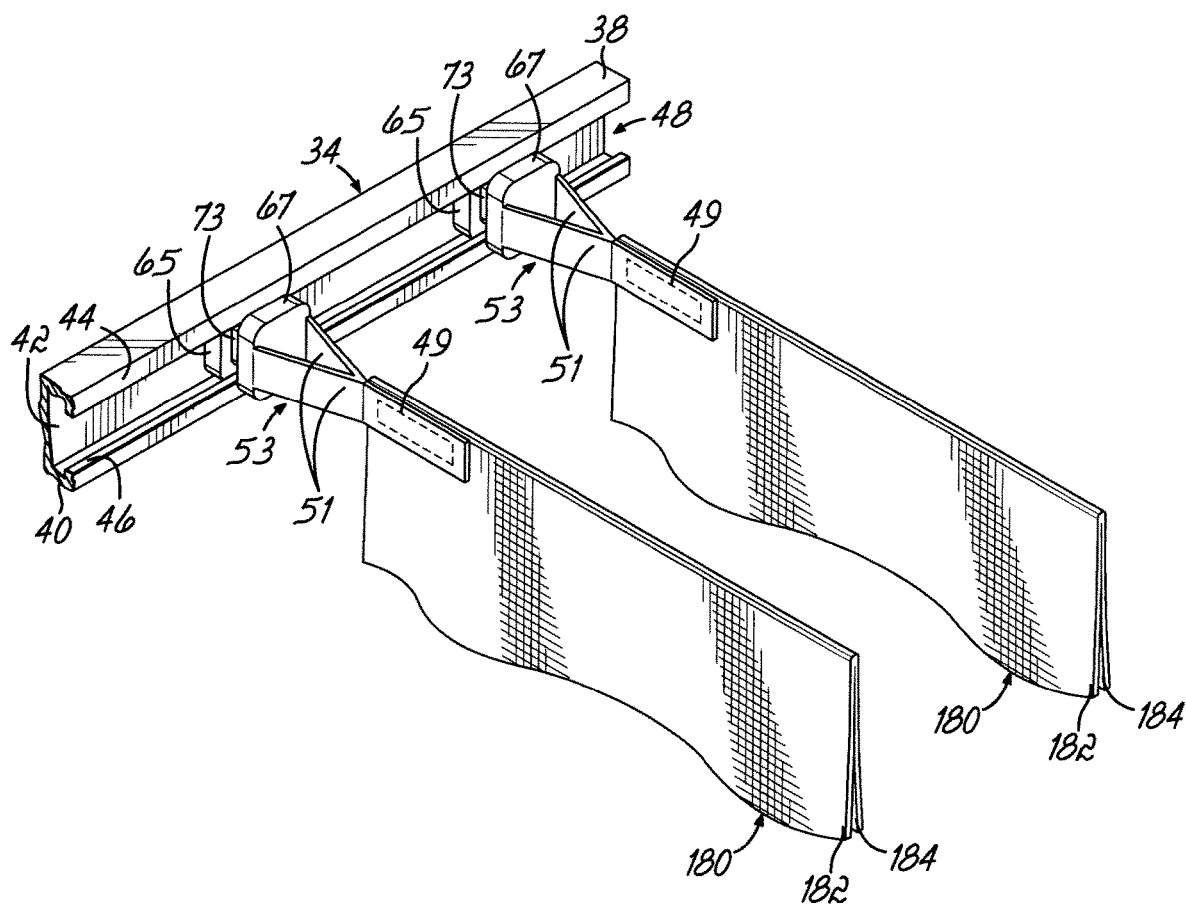
FIG. 7B is an enlarged perspective view of another version of dunnage support.

For example, FIG. 7B illustrates another version of unlockable dunnage support 53 used to support one side of one of the pouches 180. Dunnage support 53 does not extend from one track to the other track, unlike dunnage support 52. Rather, each pouch 180 is supported by four dunnage supports 53, two dunnage supports 53 at opposite ends of each pouch wall.

As shown in FIG. 7B, each dunnage support 53 comprises an outer head 65 and inner head 67 spaced inwardly from outer head 65. The outer and inner heads 65, 67, respectively, of each end member 53 are spaced from one another to define a groove 73 therebetween. The groove 73 of each end member 53 receives and retains the lips 44, 46 of one of the generally L-shaped tracks 32 during travel of the dunnage support 53 along a path defined by the tracks. As shown in FIG. 7B, outer head 65 is located inside the interior 48 of the generally L-shaped track 32, and inner head 67 is located outside the interior 48 of the generally L-shaped track 32. Outer head 65 keeps the end member 53 engaged with the track. Inner head 67 keeps the dunnage material out of the interior 48 of the track, thereby ensuring that the end members 53 may move smoothly along the generally L-shaped tracks 32 or any other tracks shown or described herein.

Though the outer head 65 and inner head 67 of end member 53 are illustrated being a certain shape, they may be other shapes or configurations such as thicker or thinner. For example, although the outer head 65 and inner head 67 of end member 53 are illustrated being generally rectangular, they may be disk shaped like the heads 66, 68 of dunnage support 52 shown in FIG. 7.

As shown in FIG. 7B, end member 53 has connecting straps 51 secured at one end to the end member 53 and secured at the other end to the pouch 180 with stitches 49. When viewed from the top these straps 51 have a generally V-shaped configuration. Although two connecting straps 51 are shown per end member 53, only one connecting strap or any number of connectors may be used to join the dunnage pouch to the end member 53.

FIG. 7 illustrates a dunnage support 52 used to support one wall of one of the pouches. However, FIG. 7 illustrates another feature or aspect of the invention. The generally horizontally oriented track portion 34 of each generally L-shaped track 32 has an opening or cut-out 78 formed therein. Holes 80 are formed in the upper wall 38 of the generally horizontally oriented track portion 34 of each generally L-shaped track 32, which are sized and threaded to receive fasteners 82. Although fasteners 82 are illustrated to be screws, they may be any other desirable fastener. A cap 84 is removably secured to the generally horizontally oriented track portion 34 of each generally L-shaped track 32 to cover the opening or cut-out 78. As best seen in FIG. 7, cap 84 has a generally inverted U-shaped cross-sectional configuration, including a top portion 86 and side portions 88 extending downwardly from the top portion 86. Holes 90 are formed through the top portion 86 of the cap 84 and sized to receive fasteners 82, as shown in FIG. 7. The fasteners 82 are adapted to pass through the holes 90 in the cap 84 and into the holes 80 in the upper wall 38 of the generally horizontally oriented track portion 34 of each generally L-shaped track 32. Caps of alternative shapes or sizes may be used if desired. The caps may snap on in place of using fasteners.

When one of the end members 56 or any part of any of the crossbar assemblies is damaged or needs to be replaced for any reason, one may remove cap 84 after loosening fasteners 82, thereby exposing the opening or cut-out 78 of the generally horizontally oriented track portion 34 of one of the generally L-shaped tracks 32. After the caps 84 of each track are removed, one or more damaged crossbar assembly may then be removed or inserted as necessary to repair or replace the damaged part or parts.

Figure 4:
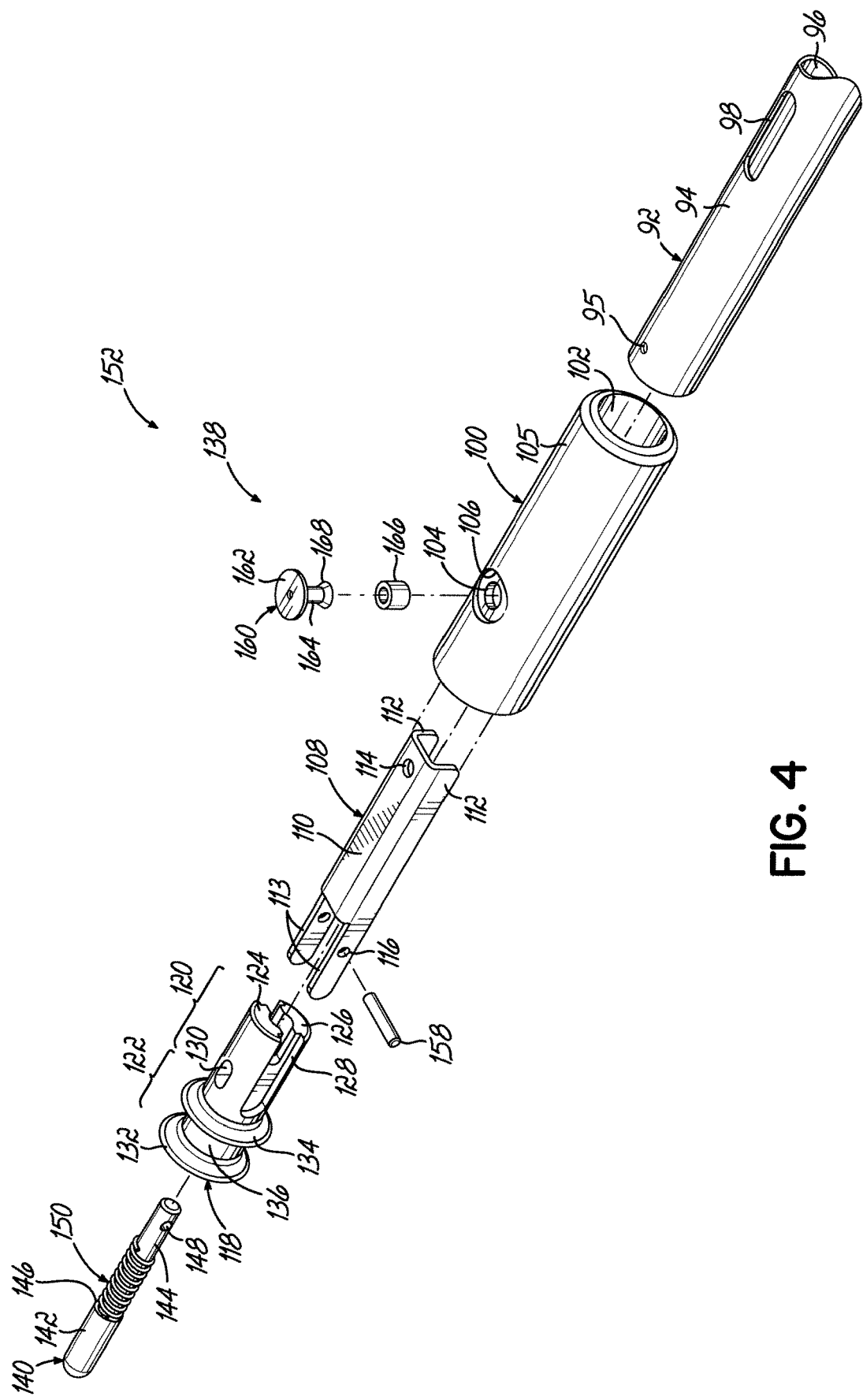
FIG. 4 is a partially dissembled view of one of the locking assemblies of one of the lockable crossbar assemblies.

Each lockable crossbar assembly 152 has two locking assemblies 138 between which is a crossbar 92. FIGS. 3, 4, 5A and 5B illustrate the components and operation of one of the locking assemblies 138 of one of the lockable crossbar assemblies 152. As shown in FIG. 4, each lockable crossbar assembly 152 has a crossbar 92 having an outer wall 94 defining a hollow interior 96. The outer wall 94 of the crossbar 92 has a slot 98 at each end (only one being shown in FIG. 3). The crossbar 92 is preferably made of metal, but may be made of other suitable material, such as plastic.

Each locking assembly 138 of each lockable crossbar assembly 152 further comprises a handle 100 having a hollow interior 102 inside which is located the crossbar 92. The handle 100 has an opening 104 extending through its wall 105 and a recess 106 surrounding the opening 104. See FIG. 4.

As best shown in FIG. 4, each locking assembly 138 of each lockable crossbar assembly 152 further comprises a key 108 which is a unitary member having a top portion 110 and two side portions 112 of a length greater than the top portion 110, resulting in legs 113. The top portion 110 of key 108 has an opening 114, and each of the legs 113 has an opening 116. As best shown in FIG. 4, each locking assembly 138 of each lockable crossbar assembly 152 further comprises an end member 118 having spaced outer and inner heads 132, 134, like end members 56 of dunnage support 52, shown in detail in FIGS. 7 and 7A. Each end member 118 is a unitary member, preferably made of injection molded plastic, such as nylon, but may be made of any other material.

As shown in FIG. 4, each end member 118 preferably has an inner portion 120 and an outer portion 122. The inner portion 120 has upper and lower portions 124, 126, respectively, separated by grooves 128 on each side, the grooves 128 being adapted to receive the legs 113 of the key 108. The upper portion 124 of the inner portion 120 of end member 118 has a detent 130. The outer portion 122 of end member 118 has a spaced outer and inner heads 132, 134, respectively, at the end of the end member 118. Outer head 132 is furthest from the inner portion 120 of the end member 118, and inner head 134 is spaced inwardly from outer head 132.

The outer and inner heads 132, 134, respectively, are spaced from one another to define a groove 136 therebetween which receives and retains the upper and lower lips 44, 46, respectively, of generally horizontally oriented track portion 34 of each generally L-shaped track 32. As shown in FIGS. 5A and 5B, outer head 132 is located inside the interior 48 of generally horizontally oriented track portion 34 of each generally L-shaped track 32, and inner head 134 is located outside the interior 48 of generally horizontally oriented track portion 34 of each generally L-shaped track 32. Outer head 132 keeps the end member 118 engaged with the track, while inner head 134 keeps the dunnage material out of the interior 48 of the track, thereby ensuring that the end members 118 may move smoothly along the generally L-shaped tracks 32 or any other tracks shown or described herein. Though the outer and inner heads 132, 134 of each end member 118 are illustrated being a certain shape, they may be other shapes or configurations such as thicker or thinner. This is true for any of the heads of any of the end members shown or described herein including outer and inner heads 68, 66 of end member 56, shown in detail in FIG. 7A.

As best shown in FIG. 4, each locking assembly 138 of each lockable crossbar assembly 152 further comprises a locking pin 140. The locking pin 140 has an outer portion 142 and an inner portion 144, the diameter of the outer portion 142 being larger than the diameter of the inner portion 144, thereby creating an annular shoulder 146. An opening 148 extends through the inner portion 144 of the locking pin 140. A spring 150 surrounds the inner portion 144 of locking pin 140 and abuts the annular shoulder 146 of locking pin 140.

As best shown in FIGS. 5A and 5B, upon assembly, the locking pin 140 and spring 150 extend into a bore 156 extending through the end member 118. The end member 118 has an annular shoulder 154 directly below the detent 130. The spring 150 is shown in a relaxed position in FIG. 5A. In FIG. 5B, the spring 150 is shown in a compressed position between the annular shoulder 146 of the locking pin 140 and the annular shoulder 154 of end member 118. As the locking pin 140 moves inwardly towards the center of the lockable crossbar assembly 152 by a user moving the handle 100 inwardly towards the center of the lockable crossbar assembly 152, the spring 150 is compressed between annular shoulder 146 of the locking pin 140 and annular shoulder 154 of the end member 118. When an operator lets go of the handle 100, the spring 150 biases or forces the locking pin 140 outwardly (to the left as shown in FIGS. 5A and 5B) to an extended locked position.

As best shown in FIGS. 5A and 5B, upon assembly, the legs 113 of the key 108 reside in the grooves 128 of the end member 118 and are held therein by pin 158. Pin 158 also extends through opening 148 in the locking pin 140 and through openings 116 of key 108, thereby connecting the locking pin 140 to the key 108. A rivet 160 joins key 108, handle 100 and crossbar 92. More particularly, rivet 160 has a generally planar upper portion 162 which resides in the recess 106 of handle 100 upon assembly. Rivet 160 has a neck 164 surrounded by a sleeve 166 and a lower portion 168. As shown in FIGS. 5A and 5B, the neck 164 of the rivet 160 and sleeve 166 travel along the slot 98 of crossbar 92. The neck 164 of the rivet 160 extends through the opening 114 in the key 108, the lower portion 168 of rivet 160 keeping the rivet 160 in place.

Figure 1A:
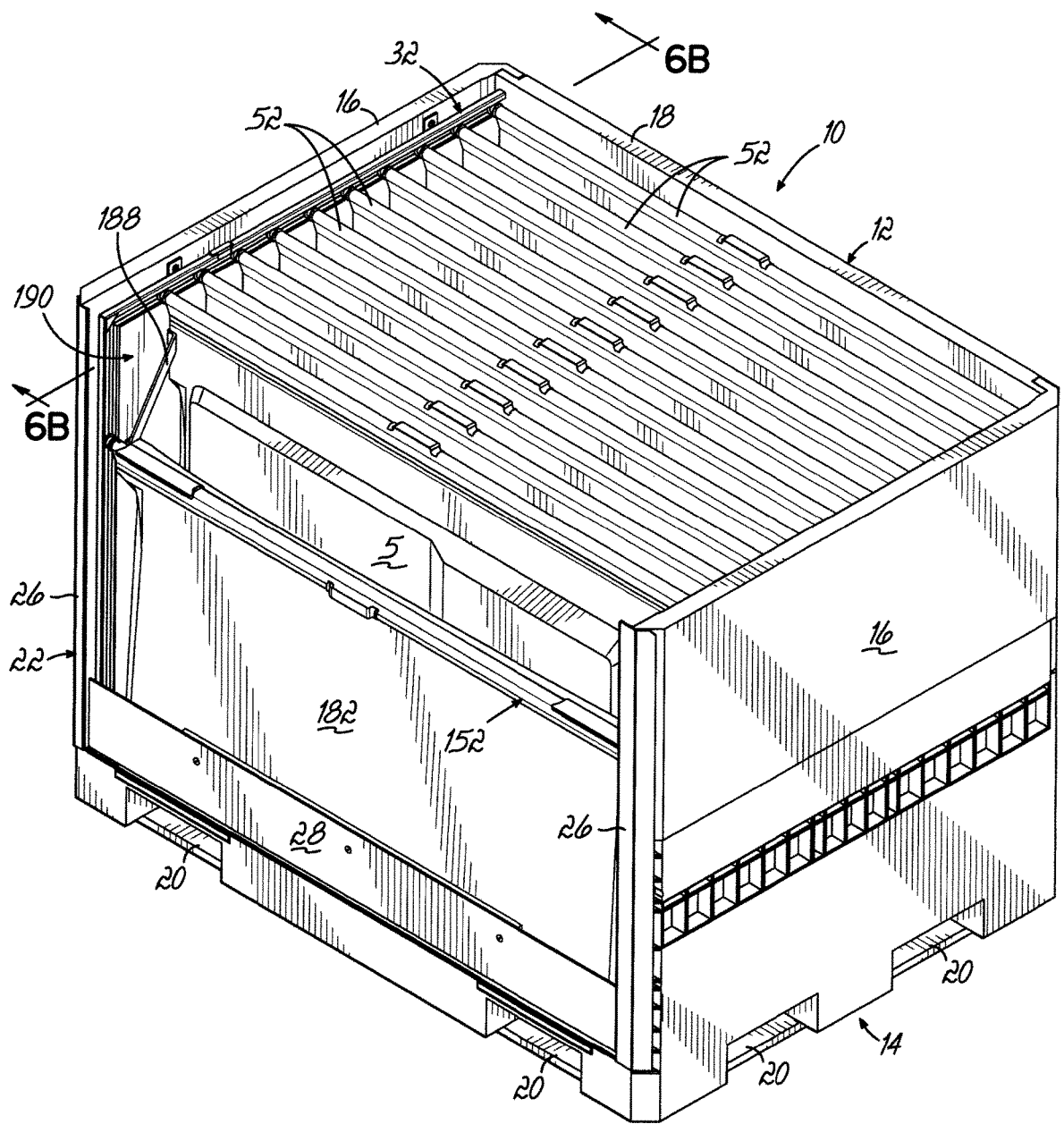
FIG. 1A is a perspective view of the container of FIG. 1 with the front pouch partially opened for removal of the front product.

In operation, inward movement of the handles 100 by an operator causes inward movement of the keys 108, which causes inward movement of the locking pins 140 against the outward bias of springs 150. The locking pins 140 move relative to the crossbar 92 and end members 118. As shown in FIGS. 5A and 5B, inward movement of the handles 100 by an operator causes the locking pins 140 to move from extended locked positions extending through openings 170 in the side walls 42 of the generally horizontally oriented track portion 34 of the generally L-shaped tracks 32. Although one locking assembly 138 (left side) of the lockable crossbar assembly 152 is shown in FIGS. 5A and 5B, the right side is a mirror image. To unlock the lockable crossbar assembly 152 from a locked position shown in FIG. 5A to an unlocked position shown in FIG. 5B, an operator must move handles 100 of the locking assemblies 138 inwardly towards each other, compressing the spring 150 on each side of the lockable crossbar assembly 152 and moving two locking pins 140 of the lockable crossbar assembly 152 inwardly out of the openings 170 of the generally horizontally oriented track portions 34 of the generally L-shaped tracks 32. Once the locking pins 140 are in their unlocked position shown in FIG. 5B, an operator is free to move the lockable crossbar assembly 152 to its desired position, including another position in the generally vertically oriented track portions 36 of the generally L-shaped tracks 32, as shown in FIG. 1A.

As shown in FIGS. 3, 5A and 5B, a fastener in the form of a rivet 174 at each end secures dunnage 178 to the end member 118 of lockable crossbar assembly 152. The rivet 174 passes through an opening 95 in crossbar 92 (see FIG. 4) and extends into recess 130 of end member 118, limiting movement of the dunnage relative to the crossbar 92, as seen in FIGS. 5A and 5B.

Although one configuration of lockable crossbar assembly is illustrated, the present invention may be used with any type or configuration of lockable crossbar assembly for supporting dunnage so the dunnage may slide or move inside the container and be selectively locked and/or unlocked in a fixed position.

Although the drawings show only one set of openings 170 extending through side walls 42 of the generally horizontally oriented track portions 34 of the generally L-shaped tracks 32 near the corners 50 of the tracks, any number of openings extending through side walls 42 anywhere along the path of the generally L-shaped tracks 32 and corresponding cavities in the container side walls 16 may be used at any desired locations in any of the embodiments shown or described herein to hold any of the lockable crossbar assemblies in a desired location. The location and number of openings adapted to receive and retain any number of lockable crossbar assemblies for supporting dunnage so the crossbar assemblies and hanging dunnage may be fixed inside the container is not intended to be limited by the drawings. In some applications, openings in the side walls 42 of the generally L-shaped tracks 32 may be sufficient to hold any of the lockable crossbar assemblies in a desired location or position without corresponding cavities in the side walls 16.

As best shown in FIG. 2, container 10 further comprises dunnage 178, in the form of a plurality of pouches 180, and are suspended by and supported by a plurality of dunnage support 52 and lockable crossbar assembly 152. As shown in FIG. 2, each pouch 180 has a front wall 182, a rear wall 184, a bottom 186 and two straps 188 extending therebetween (one on each side). The front wall 182 of one pouch 180 may be the rear wall 184 of the pouch 180 in front of it. All pouches may be formed from one piece of material of any number of pieces of material.

The straps 188 may be considered space limiters because they limit the distance adjacent dunnage supports 52 or lockable crossbar assemblies 152 may travel from each other. Each strap 188 is preferably made of elastic material which has some stretch, such as nylon, but may be made of any other material, including non-elastic material, such as plastic. In some applications, the straps 188 may be omitted.

As shown in FIGS. 1A and 2, each of the two straps 188 extending between the front and rear walls of one pouch 180 are sewn or otherwise secured below the dunnage supports 52 or lockable crossbar assemblies 152 and proximate a side edge of a pouch 180 so as to enable product(s) 5 to be inserted or removed from the pouches 180 without interference from the straps 188. The straps 188 serve two functions. First, the straps 188 limit the distance adjacent crossbar assemblies may be moved apart. An operator may move the pouches 180 together forwardly as a group so the operator need not reach backwardly too far. By pulling on the front pouch, the operator may move each of the pouches 180 towards the front of the container and towards the operator, providing an ergonomic benefit.

Figure 6A:
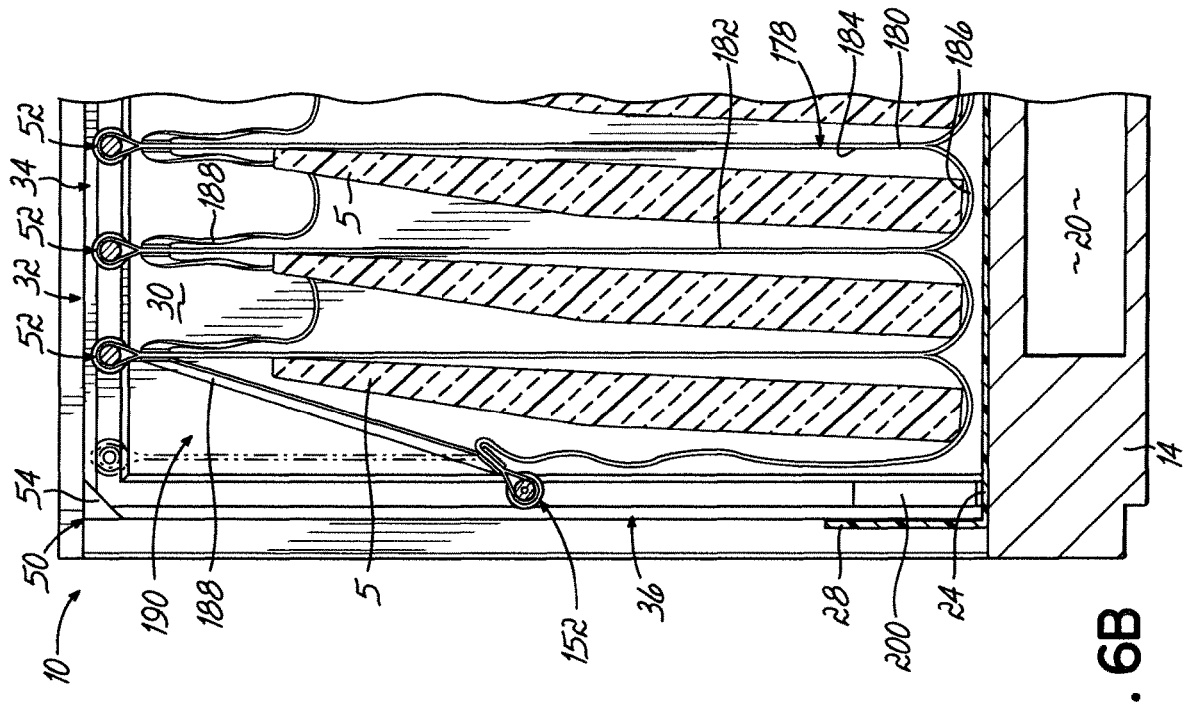
FIG. 6A is a partial cross-sectional view of the container of FIG. 1 loaded with products.
Figure 6B:
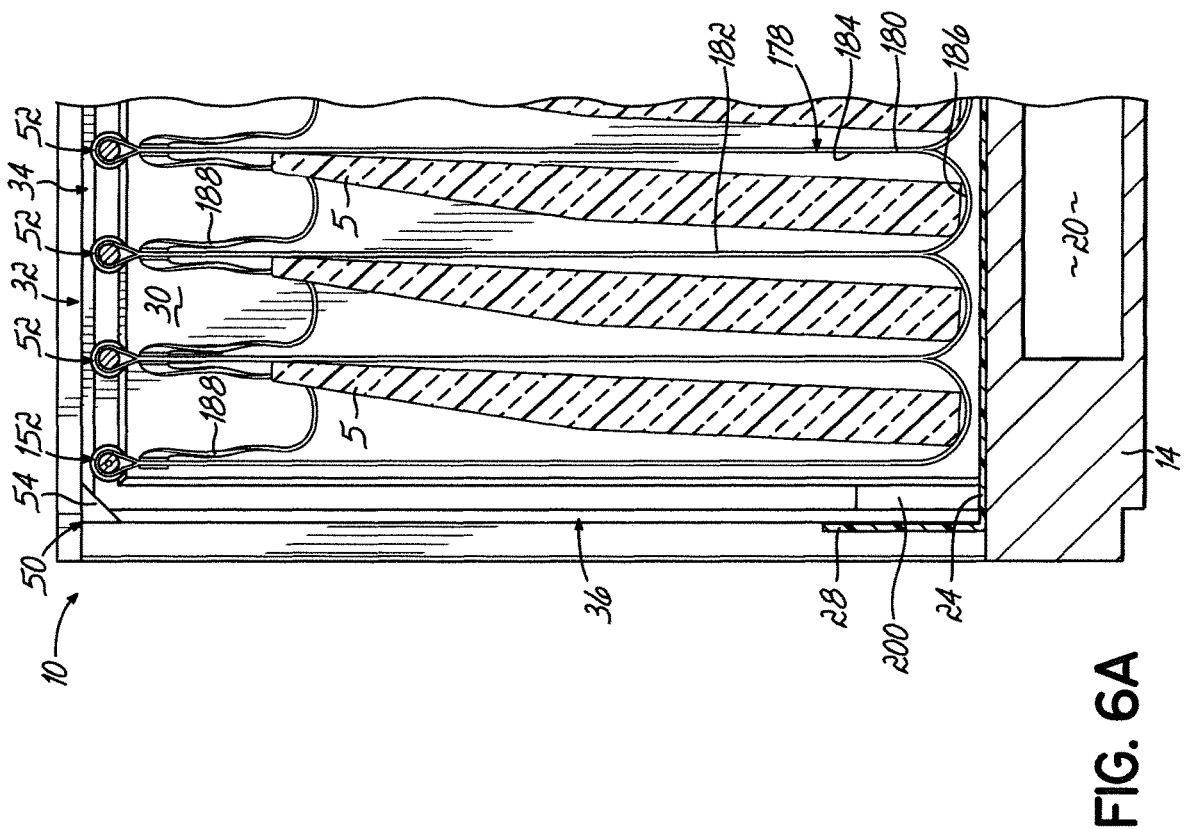
FIG. 6B is a partial cross-sectional view of the container of FIG. 1, showing the front lockable crossbar assembly in a lowered position.

Second, as seen in FIGS. 1A and 6B, the straps 188 suspend one of the dunnage supports 52 or lockable crossbar assembly 152 in the generally vertically oriented track portions 36 of generally L-shaped tracks 32 while the adjacent crossbar assembly 52, 152 remains extending between the generally horizontally oriented track portions 34 of the generally L-shaped tracks 32 without the front crossbar assembly falling to the bottoms of the generally vertically oriented track portions 36 of the generally L-shaped tracks 32. As shown in FIG. 1A, this suspension of the front crossbar assembly creates an opening 190 for removal or insertion of product(s) 5.

As shown in FIG. 2, the front crossbar assembly of the crossbar assemblies extending between the generally L-shaped tracks 32 is a lockable crossbar assembly 152 which may be fixed in a desired location during shipment or at any desired time. All the other crossbar assemblies extending between the generally L-shaped tracks 32 are unlockable dunnage supports 52. However, any number, including all of the crossbar assemblies extending between the generally L-shaped tracks 32, may be lockable crossbar assemblies 152.

As shown in FIG. 2, the top of the front wall 182 of pouch 180 is attached to one of the lockable crossbar assemblies 152, and the rear wall 184 of pouch 180 is attached to an adjacent dunnage support 52. For all the remaining pouches 180, the top of the front wall 182 is attached to one of the dunnage supports 52, and the top of the rear wall 184 is attached to an adjacent dunnage support 52.

Although the dunnage 178, as shown, comprises pouches, the dunnage may assume other shapes or configurations. A pouch 180 is supported by adjacent lockable crossbar assemblies or dunnage supports or combination thereof. As shown in FIG. 7, the fabric of the pouch 180 is sewn or otherwise secured together along a seam 192 to make a pocket 194 in which is located a tubular middle member 58 of the dunnage support 52. The same is true with regards to the lockable crossbar assemblies 152. As shown in FIG. 3, the pocket 194 of fabric surrounding each lockable crossbar assembly 152 has two cut-outs 195 (only one being shown) to allow access to the handle 100 of each locking assembly 138. Each cut-out 195 creates a flap 197 which may be secured over the handle 100 with hook and loop fasteners or any other known closing means or mechanism.

Dunnage supports 52 and lockable crossbar assemblies 152 support pouches 180 are adapted to move horizontally and vertically inside the interior of the container 10. The end members 56 of the dunnage supports 52 and the end members 118 of the lockable crossbar assemblies 152 move along the stationary generally L-shaped tracks 32.

Multiple pouches 180 are shown being formed or created from one piece of material draped or laying over multiple crossbar assemblies and secured to itself along seams 192, as shown in FIG. 7. Alternatively, each pouch 180 may be made from its own piece of material, in which case the pouches 180 would not be interconnected other than via straps 188.

Figure 1B:
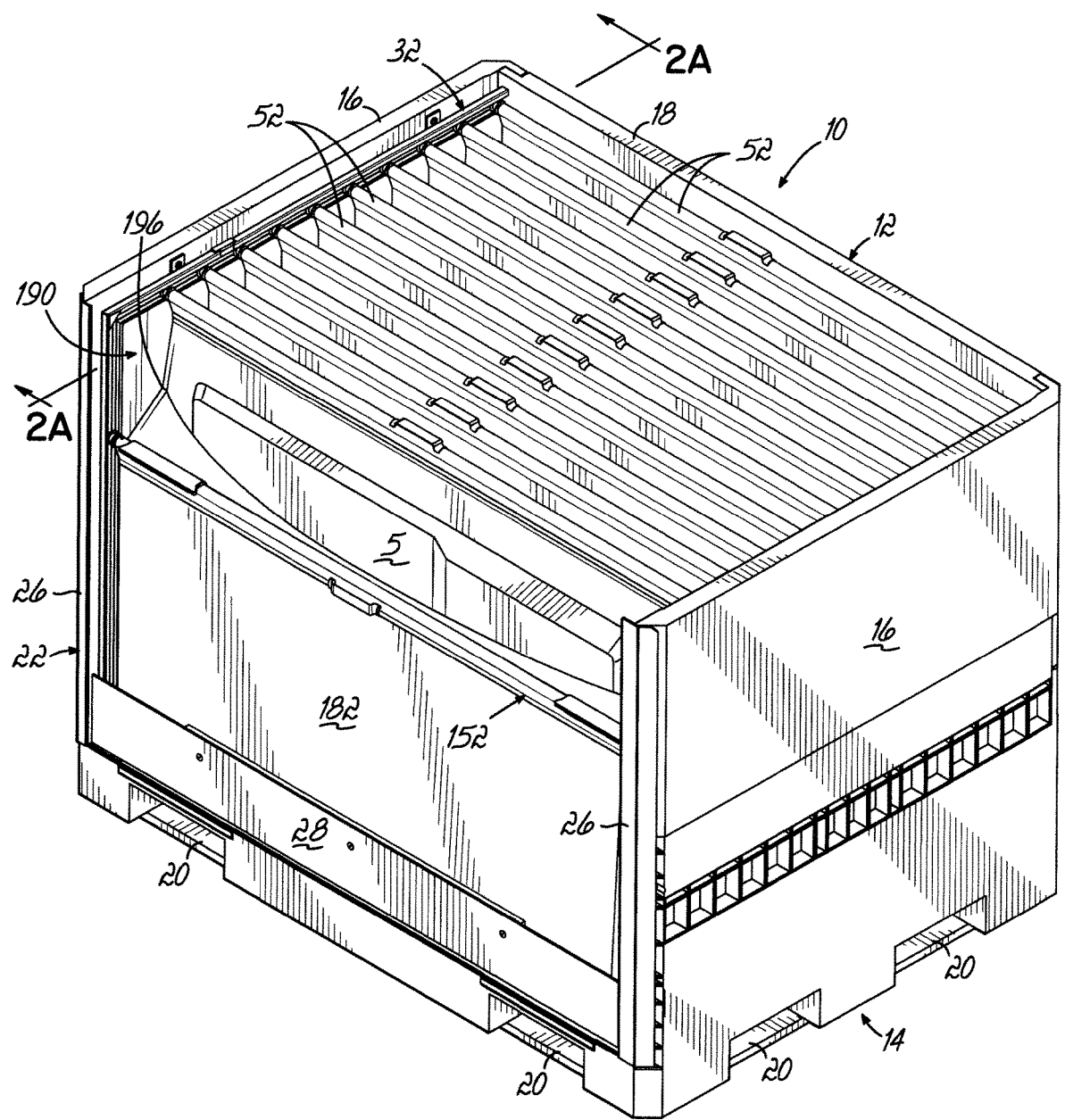
FIG. 1B is a perspective view of the container of FIG. 2A with the front pouch partially opened for removal of the front product.
Figure 2A:
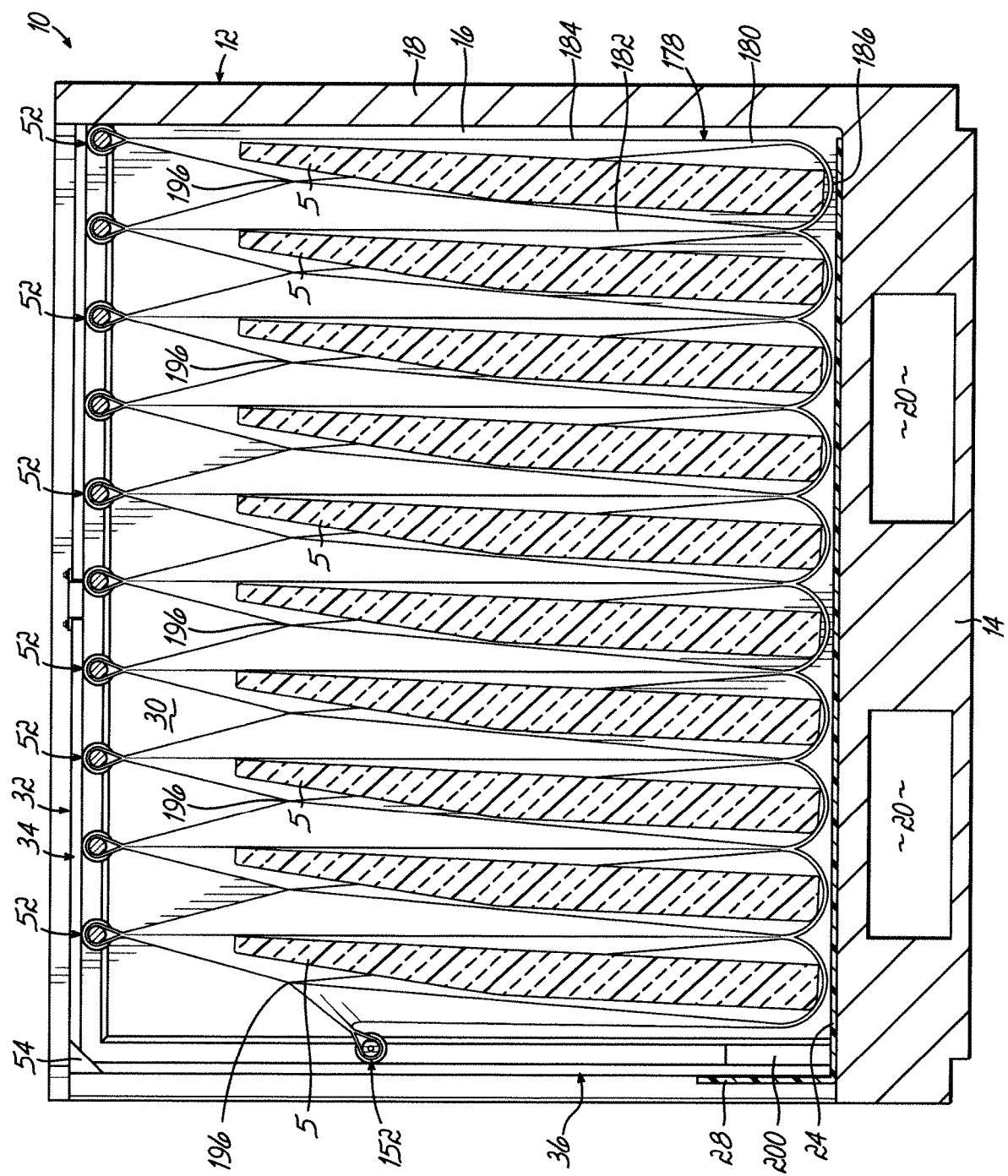
FIG. 2A is a cross-sectional view like FIG. 2 showing an alternative form of dunnage inside the container of FIG. 1.

As shown in FIGS. 1B and 2A, straps extending between adjacent pouches may be omitted and replaced with two side sewn locations 196 (only one being shown in FIG. 1B). As shown in FIG. 1B, each pouch 180 has two sewn locations 196 on opposite sides of the pouch 180, thereby enabling the product(s) 5 to be inserted or removed as desired. Each sewn location 196 comprises the location where front and rear walls 182, 184 of a pouch 180 are sewn together.

Figure 6C:
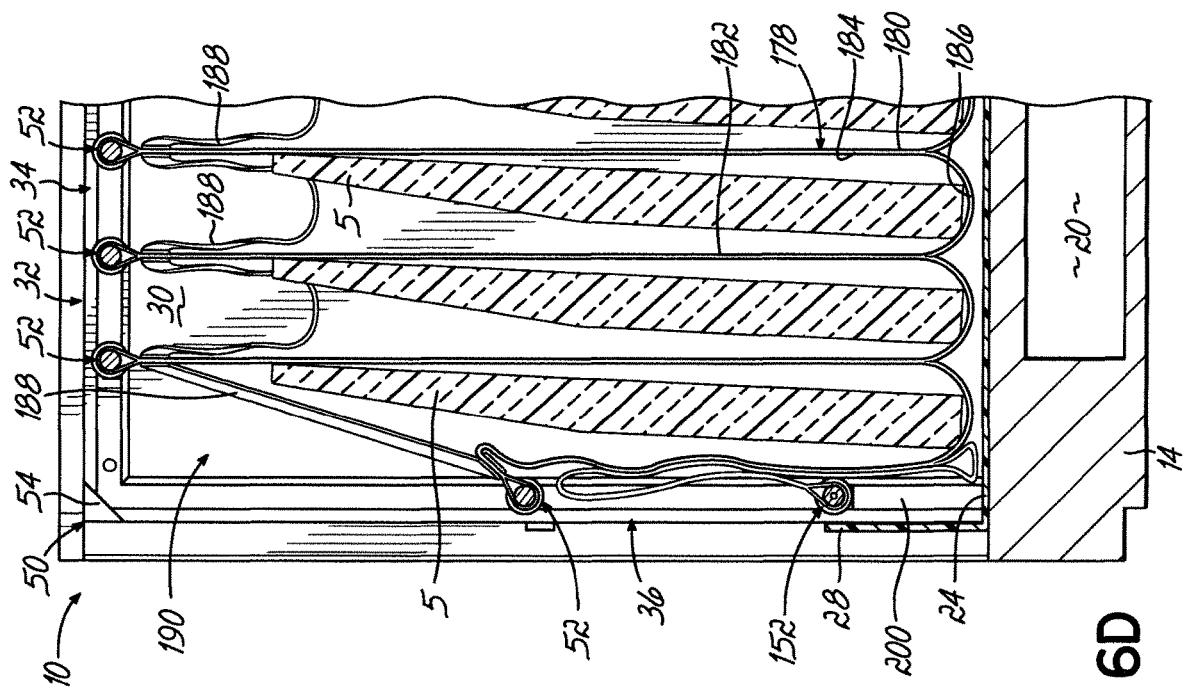
FIG. 6C is a partial cross-sectional view of the container of FIG. 1, showing the front product being removed.

FIGS. 6A-6E illustrate a method of unloading products 5 from the pouches 180 of container 10. This unloading method comprises the first step of unlocking the front lockable crossbar assembly 152 of the crossbar assemblies extending between the generally horizontally oriented track portions 34 of generally L-shaped tracks 32 and moving it from its locked position shown in FIG. 6A into the generally vertically oriented track portions 36 of the generally L-shaped tracks 32 to a position shown in FIG. 6B. As shown in FIG. 6B, the elastic straps 188 limit the distance the front wall of the front pouch 180 may travel down the generally vertically oriented track portions 36 of the generally L-shaped tracks 32, thus presenting the front product 5 in a position in which an operator may quickly and easily remove the front product 5. As shown in FIG. 6C, the next step comprises an operator (not shown) removing the front product 5 (closest to the front of the container) out of the dunnage pouch 180 in the direction of arrow 198.

As shown in FIG. 6B, when front upper lockable crossbar assembly 152 is located extending between the generally vertically oriented track portions 36 of the generally L-shaped tracks 32 and next crossbar assembly, an unlockable crossbar assembly or dunnage support 52 is located extending between the generally horizontally oriented track portions 34 of the generally L-shaped tracks 32, an operator may easily remove a product inside the front pouch 180 through opening 190 because the front lockable crossbar assembly 152 is below the dunnage support 52.

Figure 6D:
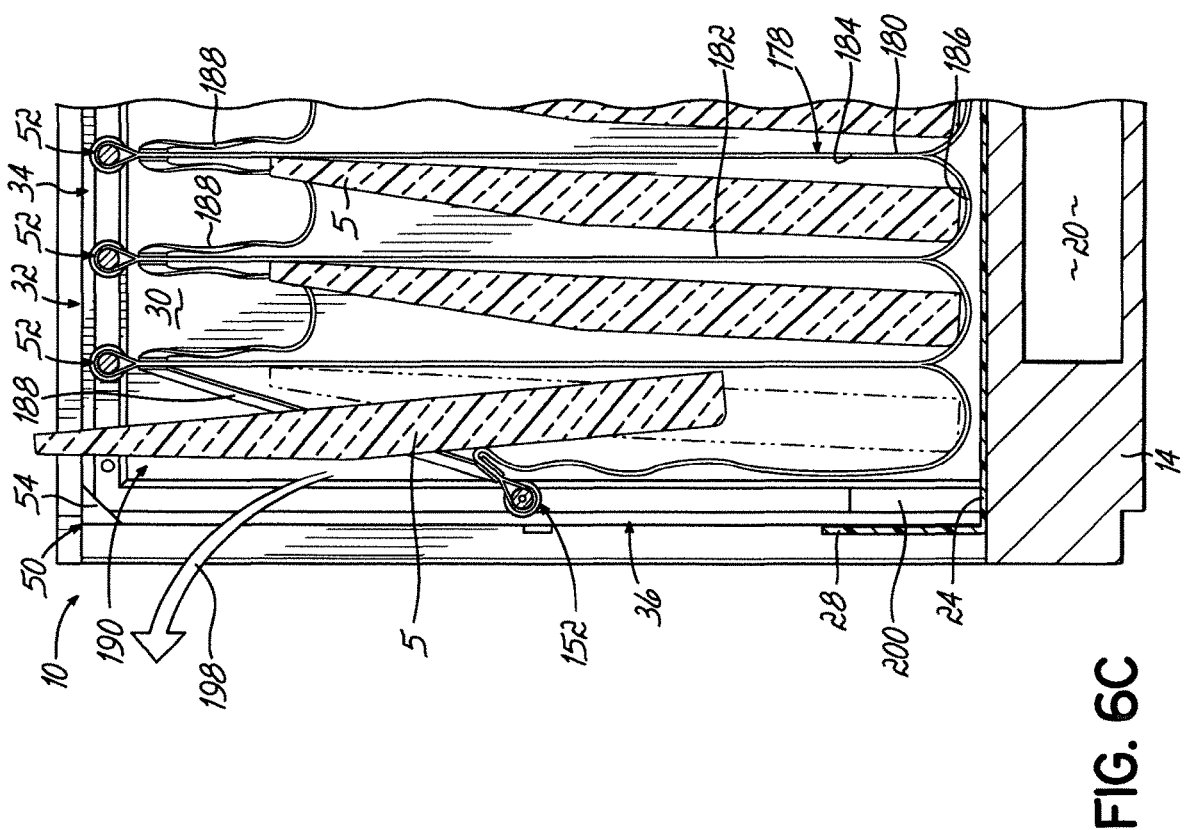
FIG. 6D is a partial cross-sectional view of the container of FIG. 1, showing the front dunnage support in a lowered position.

As shown in FIG. 6D, this is also true as regards dunnage supports 52 when an operator is unloading a second product 5 from the dunnage. This orientation of the crossbar assemblies, due to the configuration of the generally L-shaped tracks 32, helps an operator from an ergonomic standpoint, reducing the stress and strain on the body of the operator when unloading products from the dunnage. Thus, the unique configuration of the upper generally L-shaped tracks 32 inside the container 10 may reduce the container owner's costs because workers or operators may have fewer injuries/days off due to injury.

As shown in FIG. 6D, the next step comprises moving dunnage support 52 (second from the front) from its position extending between the generally horizontally oriented track portions 34 of the generally L-shaped tracks 32 (shown in FIG. 6C) into the generally vertically oriented track portions 36 of the generally L-shaped tracks 32. In addition, the lockable crossbar assembly 152 is moved downwardly from its suspended position shown in FIG. 6C to a position shown in FIG. 6D abutting a stop 200 located at the bottom of each generally vertically oriented track portion 36 of each generally L-shaped track 32. During this step, the lockable crossbar assembly 152 moves towards the bottom of the container, the end members 118 of lockable crossbar assembly 152 moving along the generally vertically oriented track portions 36 of the generally L-shaped tracks 32.

Although the drawings show one lockable crossbar assembly 152 followed by multiple dunnage supports 52 supporting pouches 180, the container may be used with any number of lockable crossbar assemblies, any number of dunnage supports 52 and any number of pouches. The amount of lockable crossbar assemblies, dunnage supports and pouches may be different than that shown.

The process of unloading products 5 from container 10 is continued by an operator one product at a time. When all of the products 5 are removed, the container may be shipped to its desired destination. When the container 10 is empty, the empty container 10 still has the dunnage therein, the crossbar assemblies extending between the generally vertically oriented portions of the generally L-shaped tracks. The container 10 may then be shipped back to its original location or any desired location for loading the empty dunnage with product. During the unloading and loading processes, the tracks 32 remain stationary fixedly secured to the container 10. The crossbar assemblies and dunnage hanging from the crossbar assemblies move inside the container with the assistance of an operator during the loading and unloading processes.

Figure 8:
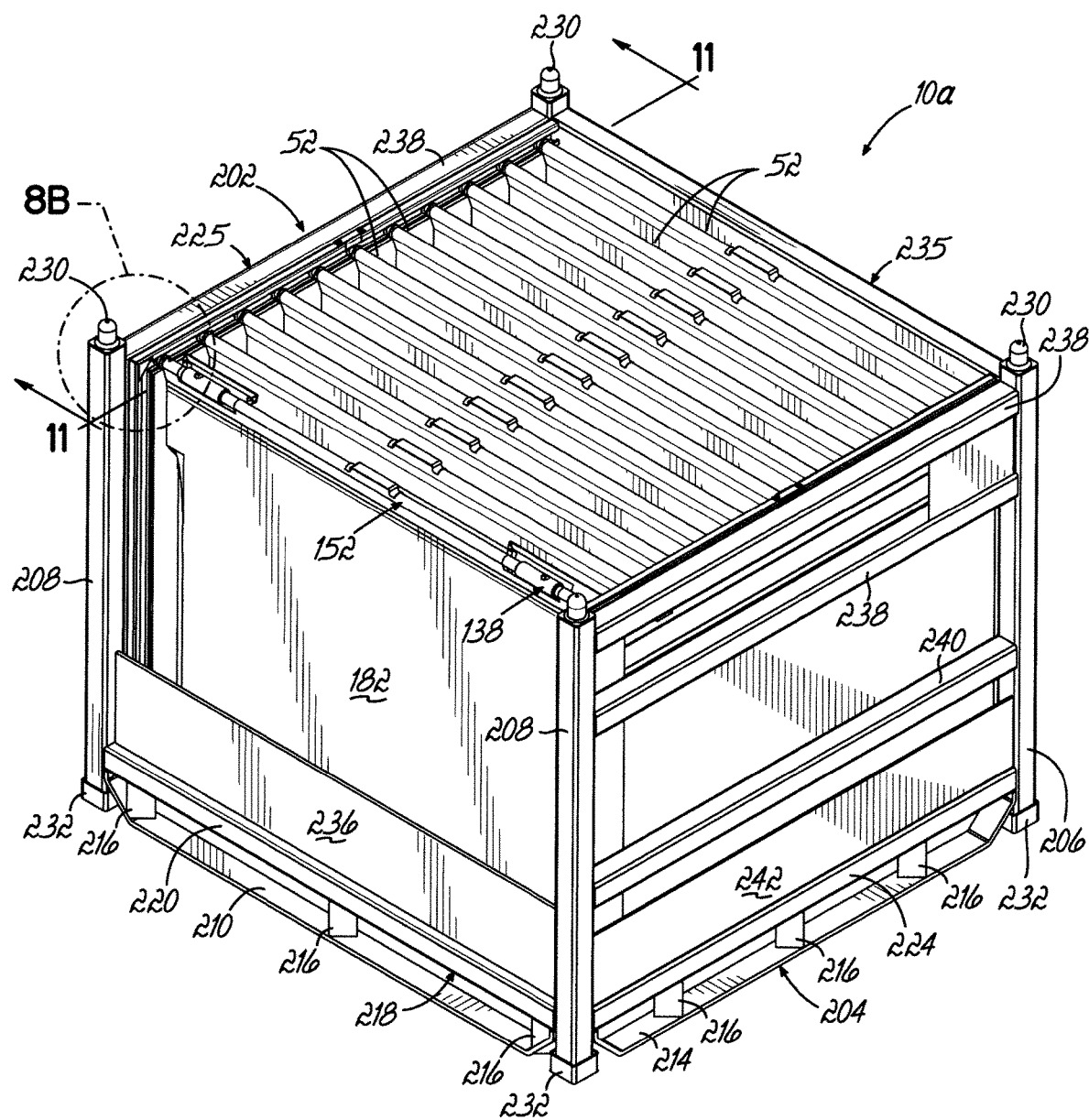
FIG. 8 is a perspective view of another embodiment of a reusable and returnable container.
Figure 9:
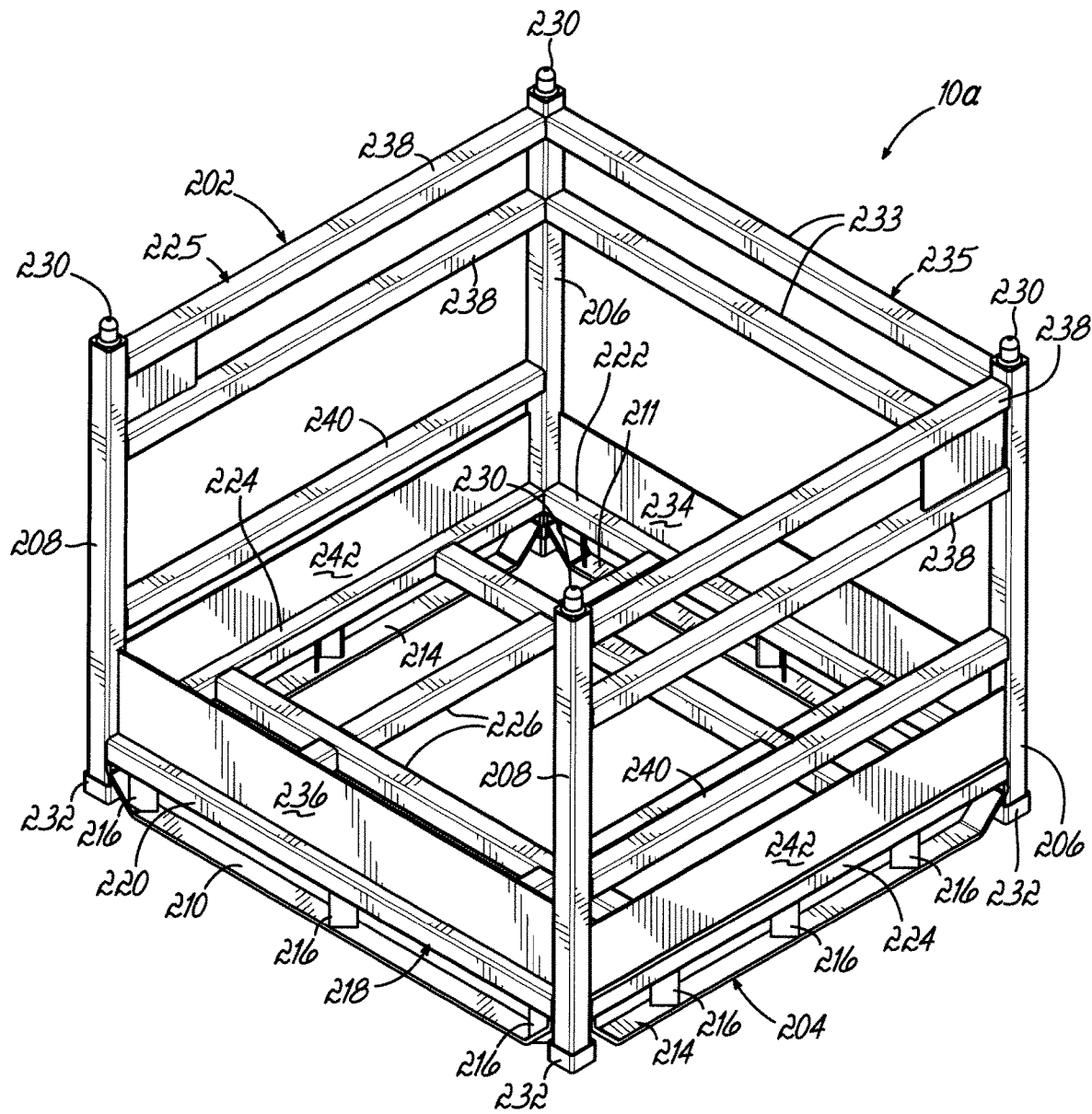
FIG. 9 is a perspective view of the frame of the container of FIG. 8 without the tracks, crossbar assemblies and dunnage.

FIG. 8 illustrates an alternative embodiment of reusable and returnable container 10*a*. As best shown in FIG. 9, reusable and returnable reusable and returnable container 10*a* comprises a frame 202 having a base 204, two rear corner posts 206 and two front corner posts 208, all four corner posts 206, 208 extending upwardly from the base 204. The frame 202 is preferably made of metal, but may be made of other known materials.

As best shown in FIG. 9, the base 204 is generally rectangular in shape and comprises a front perimeter member 210, a rear perimeter member 211 and two side perimeter members 214. The front perimeter member 210, rear perimeter member 211 and side perimeter members 214 of base 204 may be secured together or secured to the rear and front corner posts 206, 208 via any conventional means, including welding. A plurality of stubs 216 extend upwardly from the base 204 and are secured thereto via any conventional means, including welding.

As best shown in FIG. 9, a generally rectangular sub-base 218 is spaced above the base 204 by the stubs 216 and secured to the stubs 216 by any conventional means, including welding. The sub-base 218 comprises a front member 220, a rear member 222 and two side members 224. The front member 220, rear member 222 and side members 224 of the sub-base 218 may be secured together or secured to the rear and front corner posts 206, 208 via any conventional means, including welding. Although three stubs 216 are shown extending upwardly from each of the front perimeter member 210, rear perimeter member 211 and side perimeter members 214 of the base 204 to corresponding front member 220, rear member 222 and side members 224 of the sub-base 218, any number of stubs (or a single continuous member) may be used to space the sub-base 218 above the base 204.

As best shown in FIG. 9, the sub-base 218 of the reusable and returnable container 10*a* further comprises a plurality of interior members 226 extending between the front member 220 of the sub-base 218 and the rear member 222 of the sub-base 218 and being secured thereto. Additional interior members 226 extend between the side members 224 of the sub-base 218 and are secured to the side members 224 of the sub-base 218. These interior members 226 intersect with the interior members 226 extending between the front member 220 of the sub-base 218 and the rear member 222 of the sub-base 218. These intersecting interior members 226 comprise part of the sub-base 218 of the frame 202. Although four interior members 226 are shown in the sub-base 218 of the reusable and returnable container 10*a*, any number of interior members, including a solid member, may be used. Each of the interior members 226 of the sub-base 218 is generally rectangular in cross-section and has a hollow interior.

Figure 10:
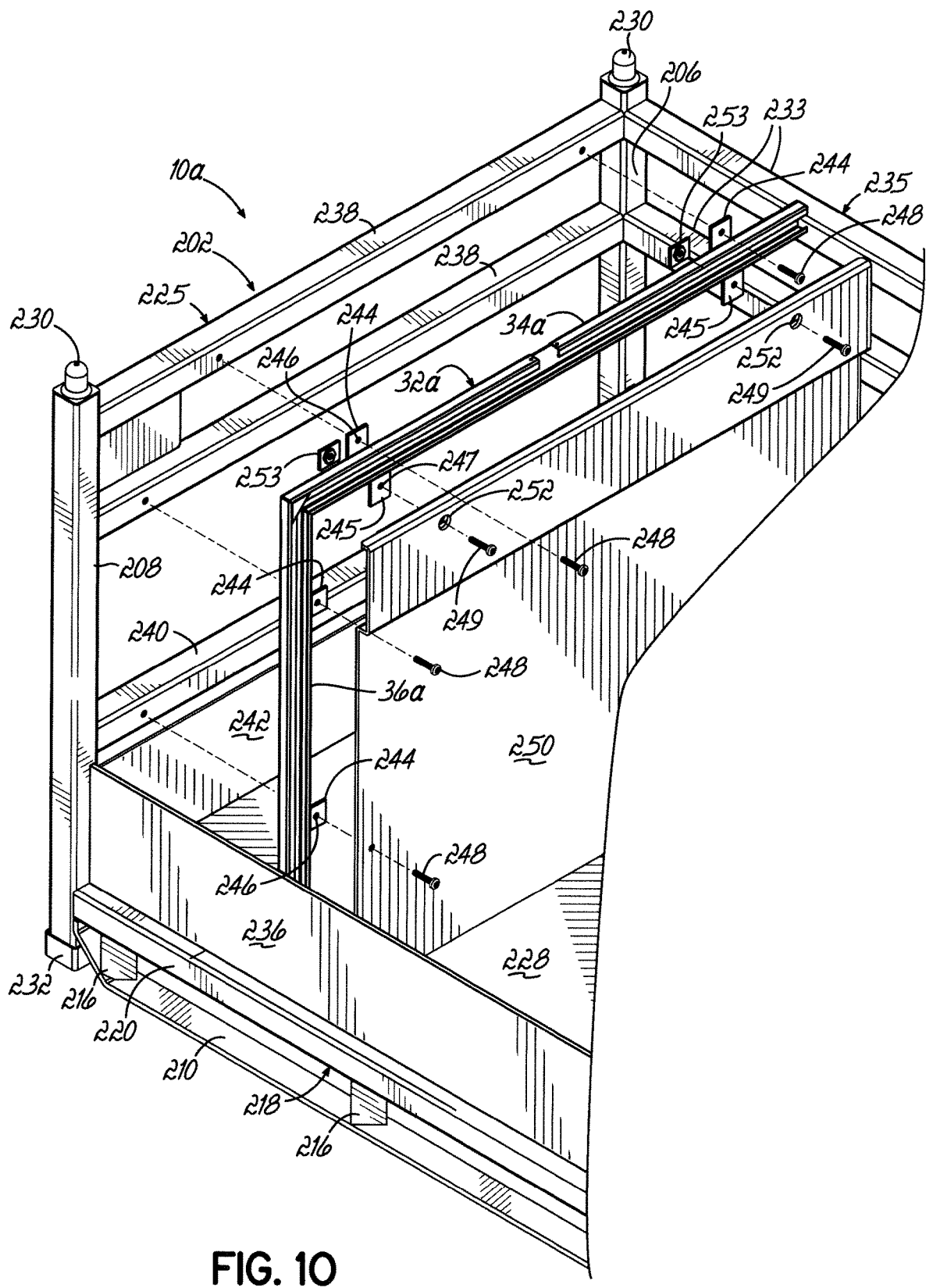
FIG. 10 is a partially disassembled view of a portion of the container of FIG. 8 showing the tracks, but not the dunnage and crossbar assemblies.

As best shown in FIG. 10, a floor 228 rests on top of the sub-base 218 of the frame 202. Although the floor 228 is shown as one piece, it may comprise multiple pieces and may be made of any desired material. One suitable material is corrugated plastic.

Figure 11:
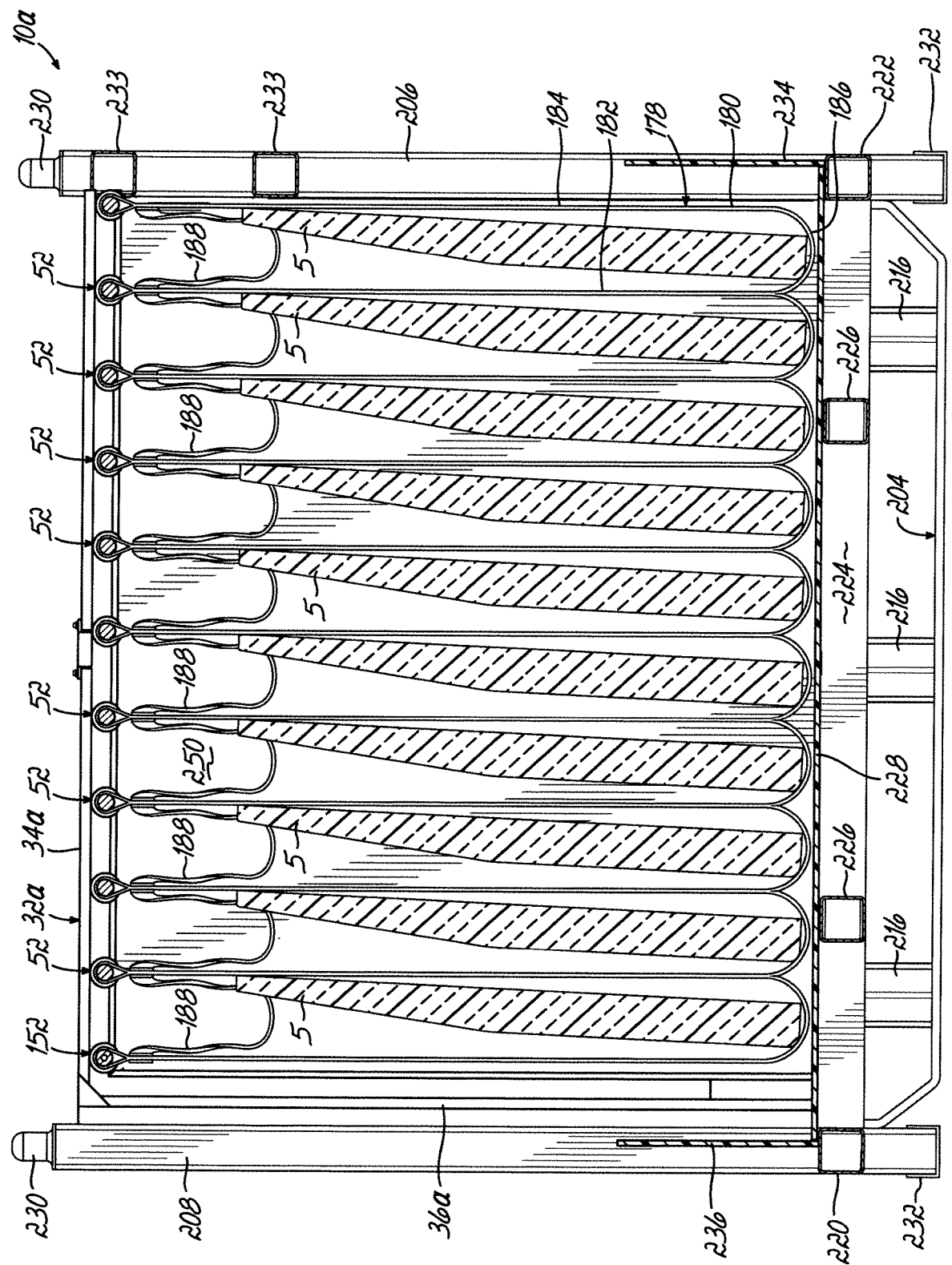
FIG. 11 is a cross-sectional view taken along the line 11-11 of FIG. 8.
Figure 12:
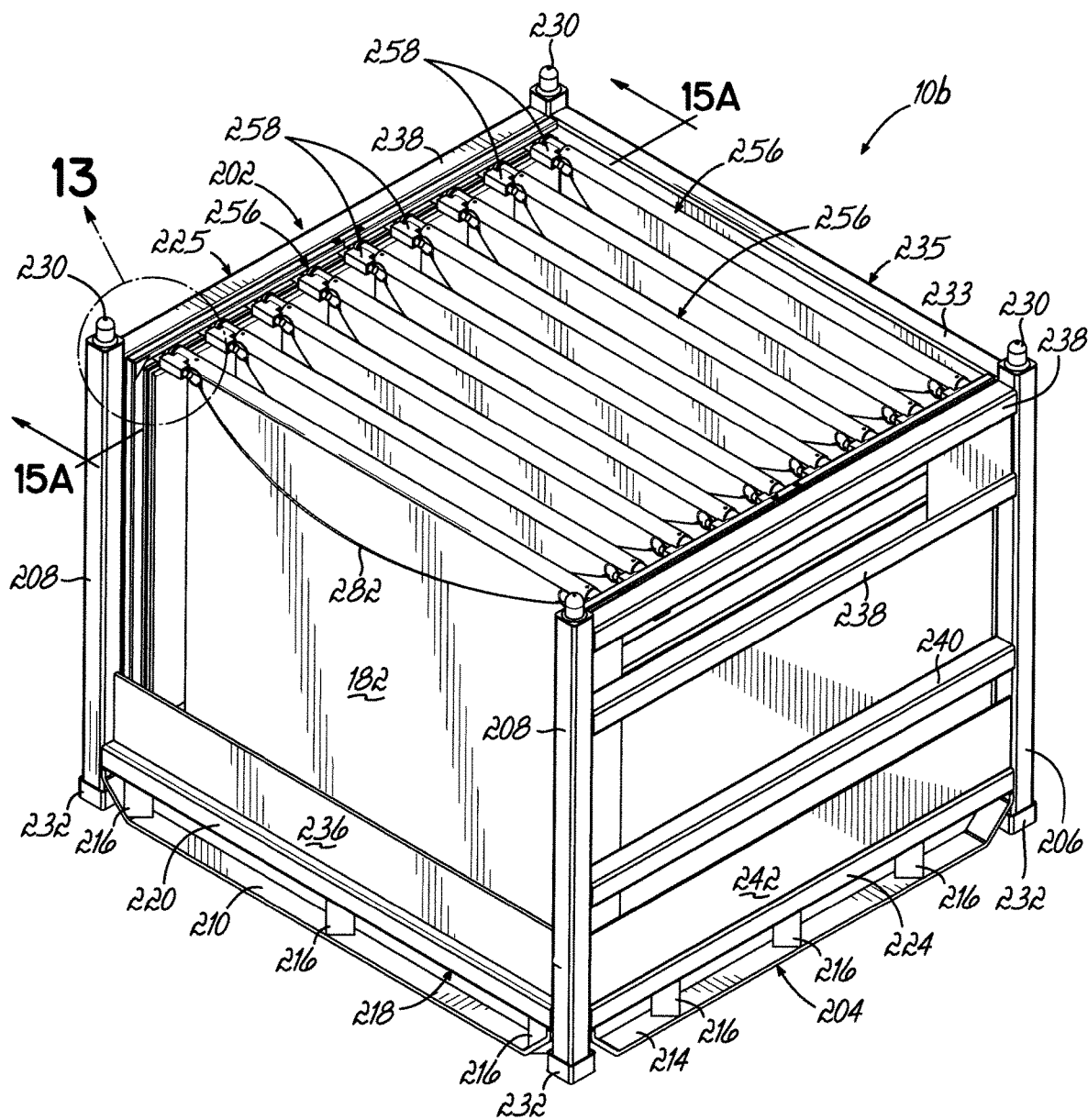
FIG. 12 is a perspective view of another embodiment of reusable and returnable container.

As best shown in FIG. 11, each of the rear corner posts 206 and front corner posts 208 is generally rectangular in cross-section, has a hollow interior, and a knob 230 at the top thereof for stacking purposes so that multiple reusable and returnable containers 10*a* may be stacked upon one another. The knobs 230 of a first container fit inside the hollow interiors of the corner posts of another or second container located above the first container for stacking purposes. As shown in the drawings, a cap 232 adapted to receive one of the knobs 230 may be located at the bottom of each corner post.

As best shown in FIG. 9, frame 202 further comprises upper rear members 233 and lower rear member 234. Each upper rear member 233 and lower rear member 234 extends between the rear corner posts 206 and is secured thereto. The upper rear members 233 and lower rear member 234 and rear corner posts 206 define a rear portion 235 of the frame 202.

The frame 202 further comprises, on each side of the container, upper side members 238, a middle side member 240 and a lower side member 242. Each of the upper side members 238, middle side member 240 and lower side member 242 extends between one of the rear corner posts 206 and one of the front corner posts 208 and is secured thereto. The upper side members 238, middle side member 240 and lower side member 242, one of the rear corner posts 206 and one of the front corner posts 208 define a side portion 225 of the frame 202.

The frame 202 further comprises a front brace or kick plate 236 extending between the front corner posts 208 and secured thereto by any conventional means, including welding. Although one configuration of frame is illustrated, the present invention may be used with other types or configurations of frames.

As best shown in FIG. 10, reusable and returnable container 10*a* further comprises a stationary generally L-shaped track 32*a* secured to each side portion 225 of the frame 202, which does not move relative to the side portion 225 of the frame 202 after the reusable and returnable container 10*a* is assembled and during the loading or unloading processes (only one track 32*a* being shown in FIG. 10). Each generally L-shaped track 32*a* comprises a generally horizontally oriented track portion 34*a* and a generally vertically oriented track portion 36*a*. The generally horizontally oriented track portion 34*a* is fixedly secured to one of the side members 238 of one of the side portions 225 of the frame 202 of reusable and returnable container 10*a*. The generally vertically oriented track portion 36*a* is fixedly secured to at least one of the side members 238, 240 of one of the side portions 225 of the frame 202. Each generally L-shaped track 32*a* may be constructed of several pieces or may be a unitary piece and may be constructed in accordance with any of the tracks shown or described herein.

Figure 8A:
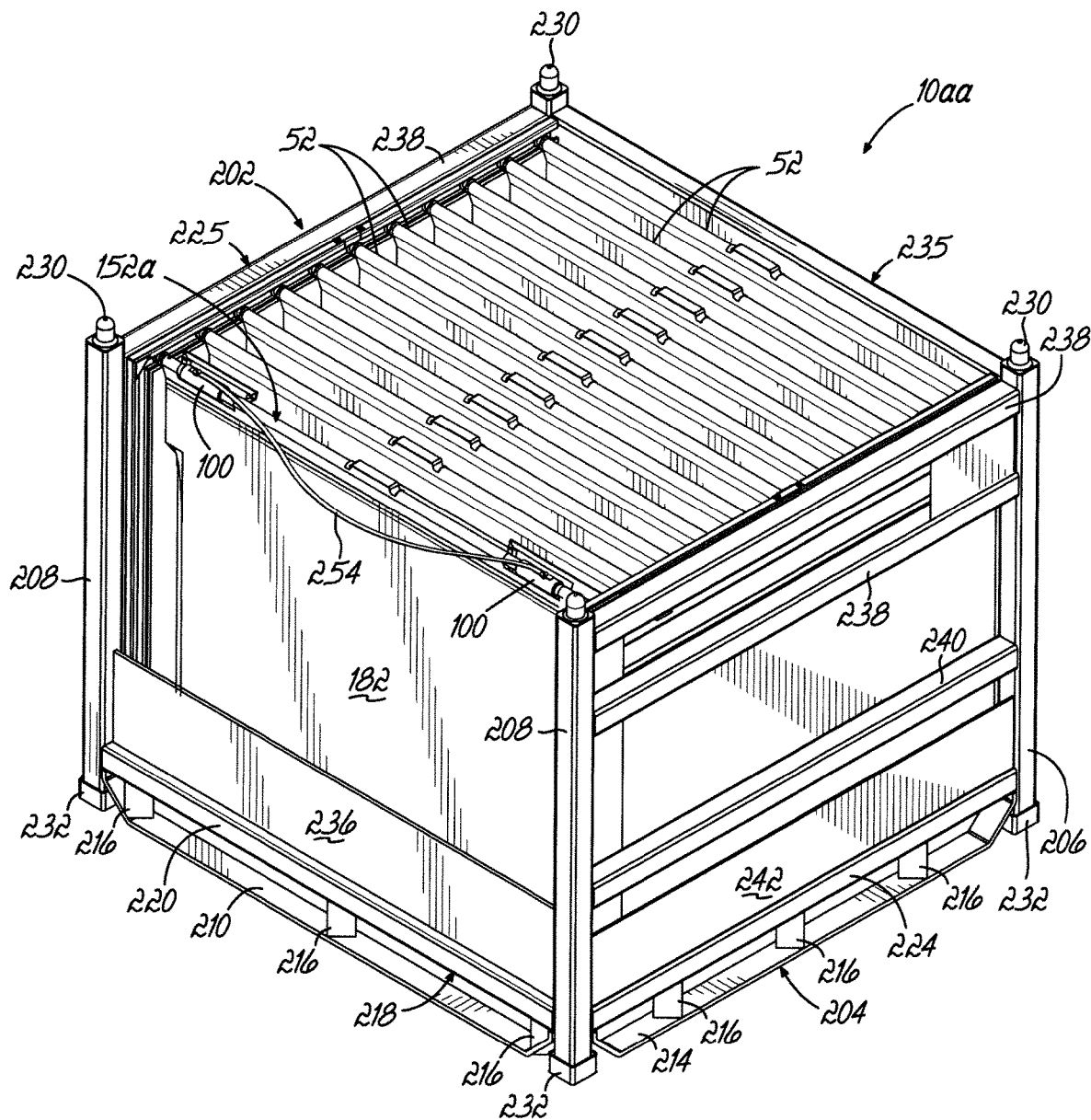
FIG. 8A is a perspective view of the container of FIG. 8 with a strap extending between the handles of the lockable crossbar assembly.
Figure 8B:
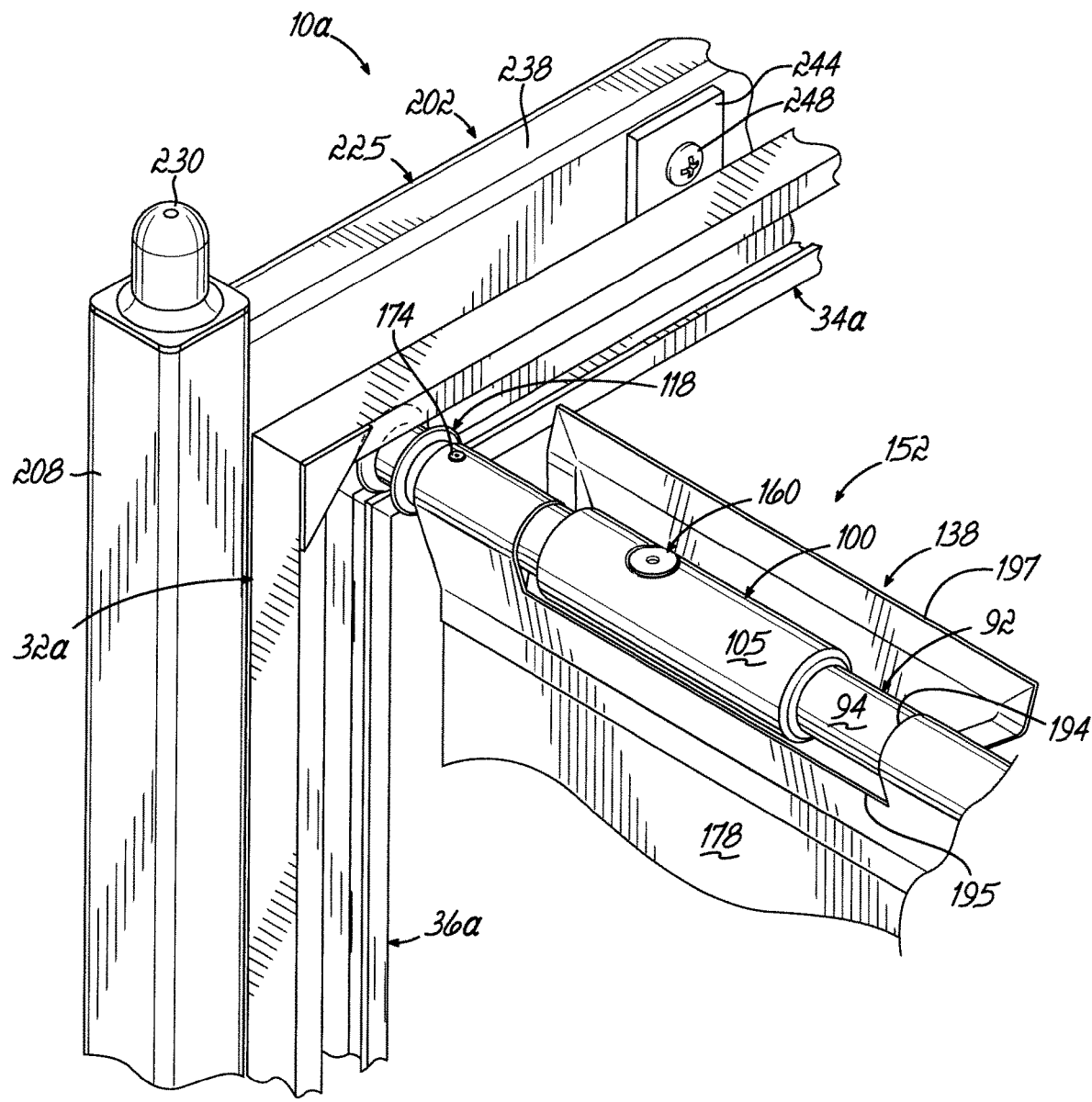
FIG. 8B is an enlarged view of the encircled area 8B of FIG. 8.

As shown in FIGS. 8B and 10, each of the generally L-shaped tracks 32*a* has four mounting brackets 244 welded thereto for securing the generally L-shaped track 32*a* to one side of the reusable and returnable container 10*a*. Each of the mounting brackets 244 has an opening 246 therethrough so a fastener 248 may extend through the mounting bracket 244. Although the drawings show two mounting brackets 244 welded to the generally horizontally oriented track portion 34*a* of generally L-shaped track 32*a* and two more mounting brackets 244 welded to the generally vertically oriented track portion 36*a* of generally L-shaped track 32*a*, any number of plates may be welded to each track 32a. This document is not intended to limit the number or size of mounting brackets 244 which are part of each generally L-shaped track 32a.

As shown in FIG. 10, a guard 250 is secured to each side portion 225 of the frame 202 on the inside thereof (only one being shown). Although preferably made of plastic, these guards 250 may be made of any other suitable material. Fasteners 249 extend through openings 252 in the guard 250, through the openings 247 in the mounting brackets 245 of the track 32a and are secured in place with nuts 253 (only two being shown) for purposes of securing the guard 250 to the track 32a. Again, the apparatus used to hold the tracks in place is not intended to be limiting and is not intended to be part of the present invention.

Each generally L-shaped track 32a is fixed in a stationary position on one side of the reusable and returnable container 10a. Each track may be one-piece or multiple pieces. As best shown in FIG. 7, each of the generally horizontal track portions 34a of the generally L-shaped track 32a may have an opening therein covered with a cover to remove damaged components, as shown and described herein.

FIG. 8A illustrates an alternative embodiment of reusable and returnable container 10aa. Reusable and returnable container 10aa is identical to reusable and returnable container 10a shown in FIGS. 8-11, except for the details of the lockable crossbar assembly 152a. Each lockable crossbar assembly 152a of reusable and returnable container 10aa, as shown in FIG. 8A, comprises the same components as lockable crossbar assembly 152 described above. However, to move the two handles 100 of lockable crossbar assembly 152a towards each other and retract the locking pins 140, an operator need only pull on pull cord 254. The ends of the pull cord 254 are secured in any known manner to any portion including the rivets of the lockable crossbar assembly 152a. Such a pull cord may be used in any of the containers shown or described herein with any of the lockable crossbar assemblies shown or described herein. The pull cord 254 may be made of any desired material and may be used on any of the lockable crossbar assemblies in any of the embodiments shown or described herein.

As shown in FIG. 8B, a stationary generally "L-shaped" track 32a is secured via mounting brackets 244 to each side of the reusable and returnable container 10a. As best shown in FIG. 8B, mounting brackets 244, welded or otherwise secured to the generally horizontally oriented track portion 34a of the generally L-shaped track 32a, may be secured via fasteners 248, shown as being nuts and bolts, to one of the side portions 225 of frame 202. The stationary generally "L-shaped" track 32a may be secured in any desired manner to each side of the reusable and returnable container 10a. The apparatus used to hold the tracks in place is not intended to be limiting and is not intended to be part of the present invention.

FIGS. 12-15D illustrate an alternative embodiment of reusable and returnable container 10b. Reusable and returnable container 10b is identical to reusable and returnable container 10a, including the same frame 202 or outside shell of the container. The reusable and returnable container 10b, as shown, also has the same tracks 32a as shown in FIGS. 8-11 and described herein. However, the crossbar assemblies in reusable and returnable container 10b movable along tracks 32a are all shown to be lockable crossbar assemblies 256, slightly different than the lockable crossbar assemblies 152.

Figure 13:
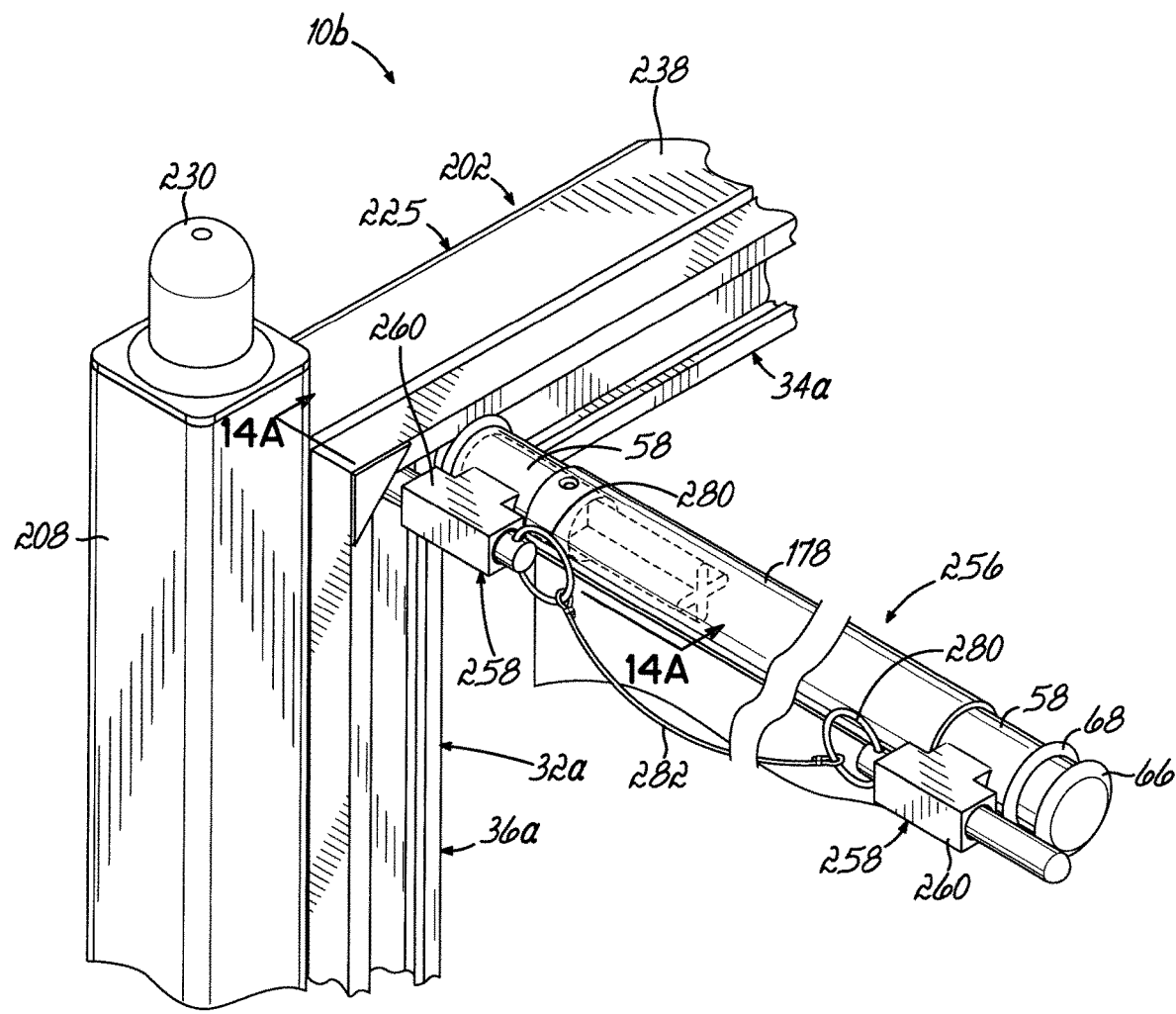
FIG. 13 is an enlarged perspective view of the encircled area 13 of FIG. 12.
Figure 14A:
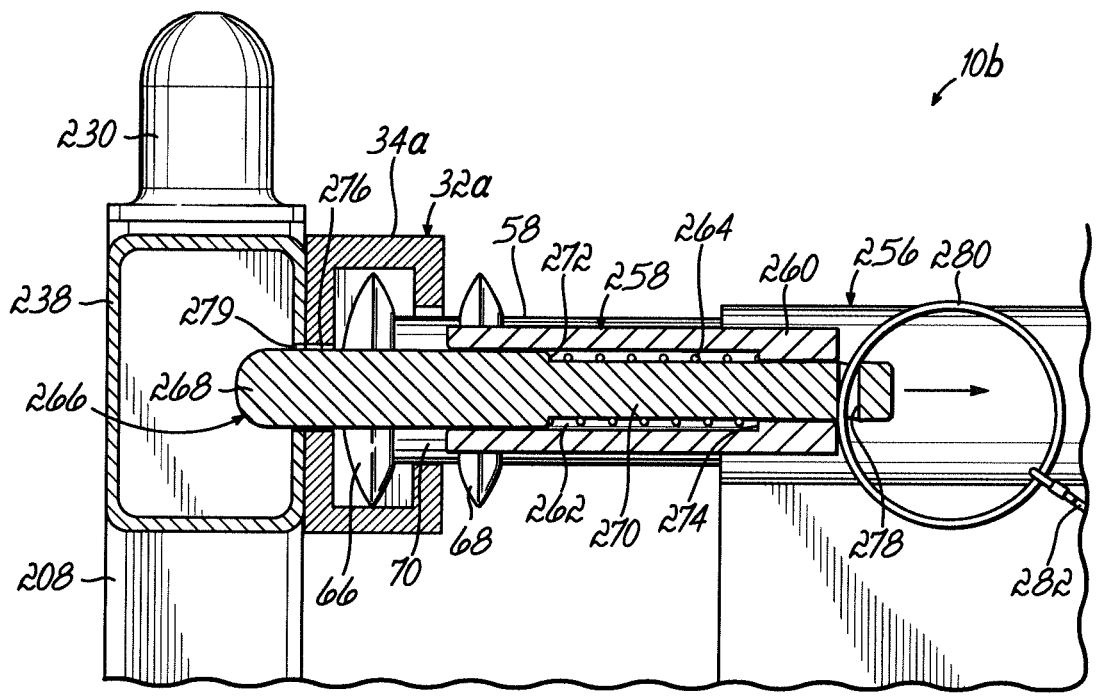
FIG. 14A is a cross-sectional view taken along the line 14A-14A of FIG. 13.
Figure 14B:
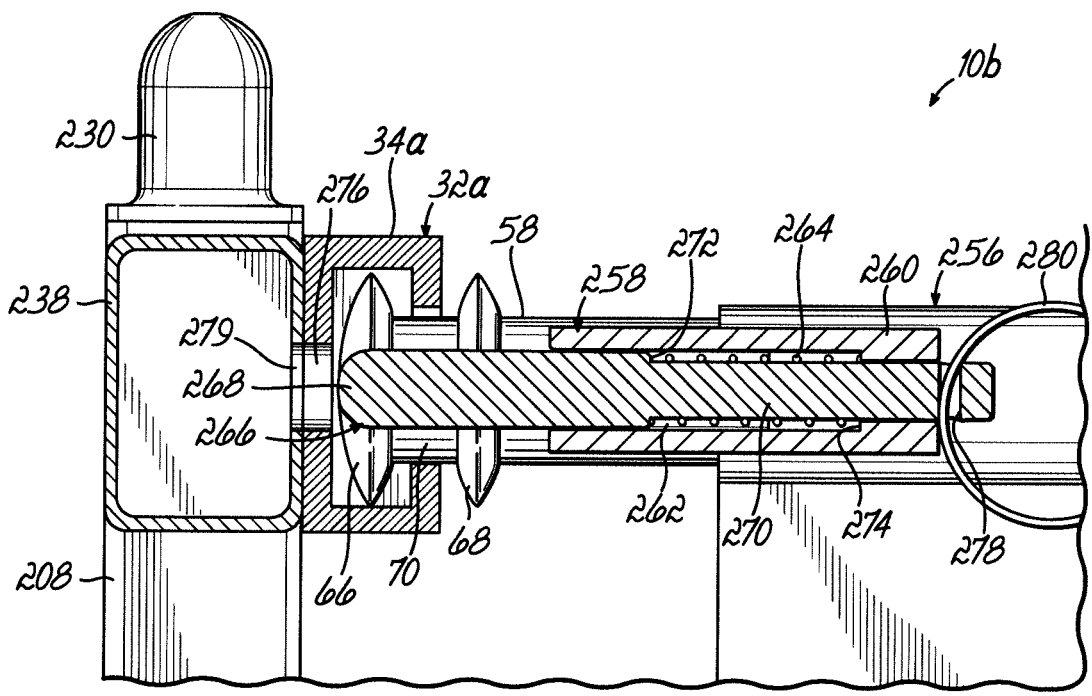
FIG. 14B is a cross-sectional view like FIG. 14A showing the locking assembly of FIG. 14A in an unlocked position.

As shown in FIG. 13, each lockable crossbar assembly 256 has the same components as the unlockable crossbar assemblies 52 shown in detail in FIGS. 7 and 7A and described herein. For simplicity, like numbers will be used. However, in addition to these components, a locking assembly 258 is located at each end of the lockable crossbar assembly 256. Each locking assembly 258 comprises a block 260 welded or otherwise secured to the tubular middle member 58 at each end of the tubular middle member 58. As best shown in FIGS. 14A and 14B, each block 260 has a cavity 262 therein inside which is located a spring 264. Each locking assembly 258 further comprises a locking pin 266 having an outer portion 268 and an inner portion 270 separated by an annular shoulder 272. The diameter of the inner portion 270 is smaller than the diameter of the outer portion 268. The spring 264 surrounds the inner portion 270 of the locking pin 266, as shown in FIGS. 14A and 14B. The inner portion 270 of each locking pin 266 has an opening 278 through which extends a connector 280. Although the connector 280 is illustrated being a ring, it may be any other form connecting the locking pin 266 to a cord 282 extending between the two connectors 280 of the lockable crossbar assembly 256. See FIGS. 12 and 13.

As shown in FIG. 14A, when the locking assembly 258 is in a relaxed locked position, the spring 264 extends between the annular shoulder 272 of the locking pin 266 and the end 274 of cavity 262. The spring 264 exerts an outwardly directed force upon the locking pin 266, extending the locking pin 266 into a locked position in which the lockable crossbar assembly 256 is locked in a selected position. The locking pin 266, in its extended position, extends through an opening 276 in the generally horizontally oriented track portion 34a of generally L-shaped track 32a and into an opening 279 in the upper side members 238 of one of the side portions 225 of frame 202. As shown in FIG. 14B, when an operator pulls the cord 282, the two locking pins 266 are pulled inwardly towards each other. The annular shoulder 272 of each locking pin 266, upon inward movement of the locking pin 266, compresses the spring 264 against the end 274 of the cavity 262 within the block 260. Thus, with the addition of two locking assemblies 258 and a cord 282 extending therebetween, an unlockable crossbar assembly becomes a lockable crossbar assembly.

Figure 15B:
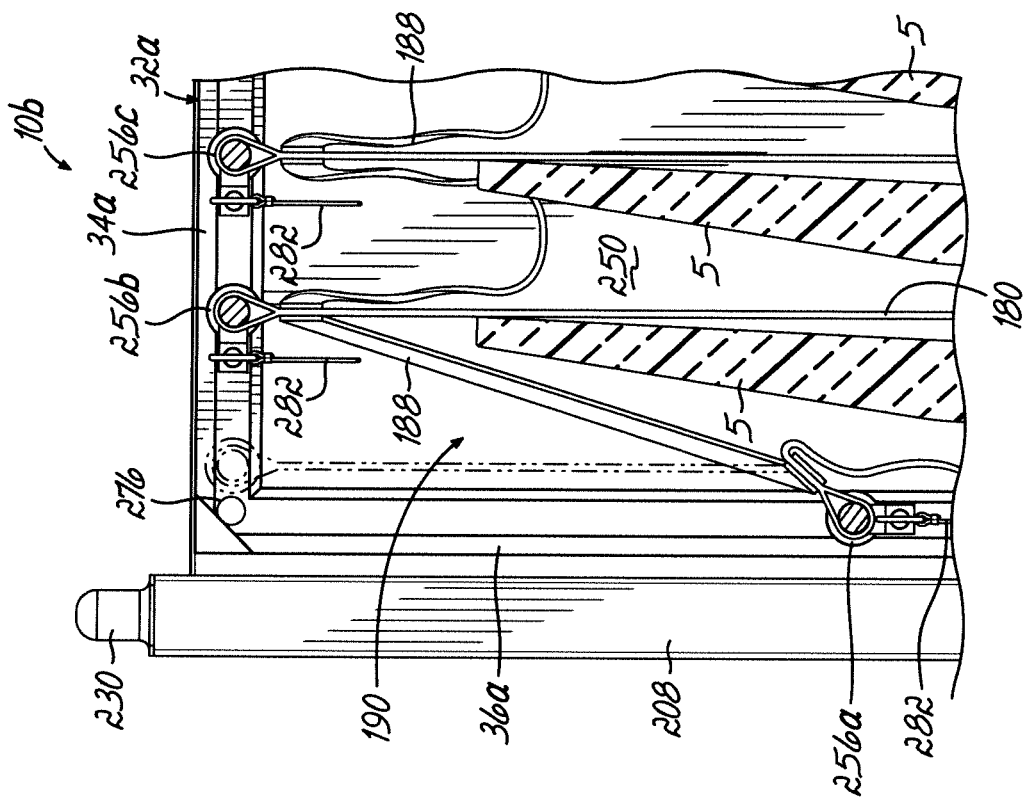
FIG. 15B is a partial cross-sectional view of the container of FIG. 15, showing the front lockable crossbar assembly in a lowered position.
Figure 15A:
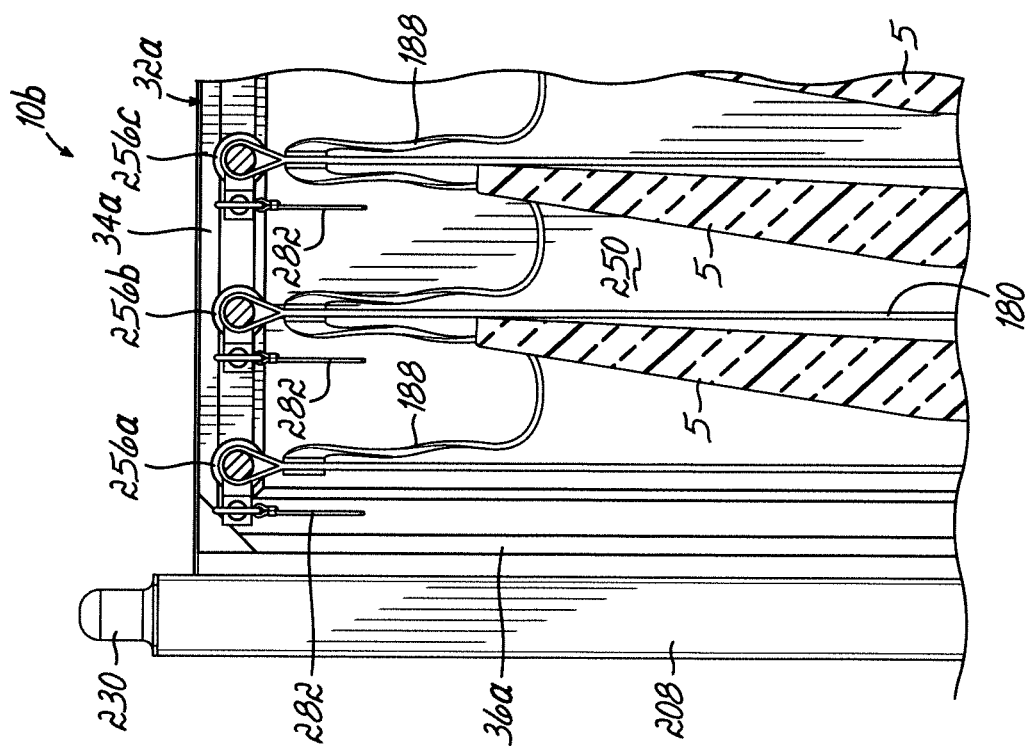
FIG. 15A is a partial cross-sectional view of the container of FIG. 15 loaded with products.
Figure 15C:
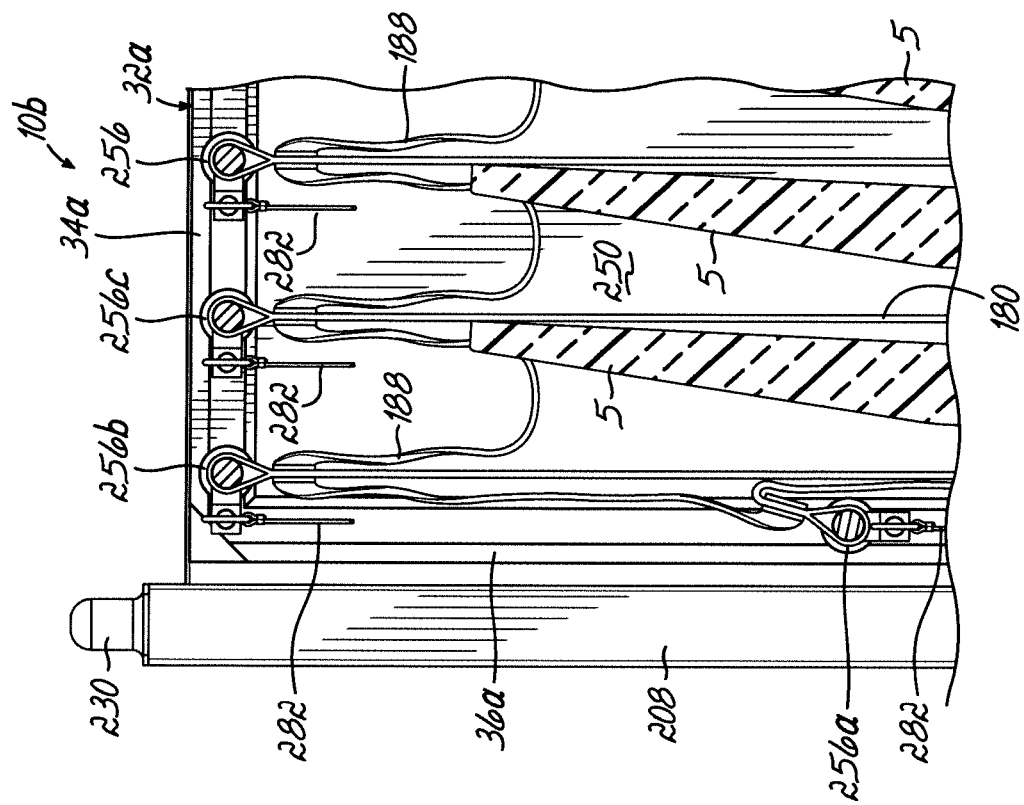
FIG. 15C is a partial cross-sectional view of the container of FIG. 15, showing the front product being removed.

FIGS. 15A-15D illustrate a method of unloading products 5 from the pouches 180 of reusable and returnable container 10b. This unloading method comprises the first step of unlocking the front lockable crossbar assembly 256a of the lockable crossbar assemblies extending between the generally horizontally oriented track portions 34a of generally L-shaped tracks 32a by pulling on cord 282. Pulling on cord 282 exerts an inward force on the locking pin 266 of each of the locking assemblies 258 as shown by the arrow shown in FIG. 14A. Such force moves the locking pin 266 from its locked position shown in FIG. 14A, in which the locking pin 266 of the locking assembly 258 extends through an opening 276 in the side wall of one of the generally horizontally oriented track portions 34a of one of the tracks 32a and into an unlocked position shown in FIG. 14B. Once in their unlocked positions, the locking pins 266 of both of the locking assemblies 258 allow movement of the front lockable crossbar assembly 256a, the outer heads 66 of the end members 56 moving along the interior of the tracks into the generally vertically oriented track portions 36a of the generally L-shaped tracks 32a to a suspended position shown in FIG. 15B. As shown in FIG. 15B, the elastic straps 188 limit the distance the front lockable crossbar assembly 256a may travel down the generally vertically oriented track portions 36a of the generally L-shaped tracks 32a, thus presenting the front product 5 in a position in which an operator may quickly and easily remove the front product 5. As shown in FIG. 15C, the next step comprises an operator (not shown) removing the front product 5 (closest to the front of the container) out of the dunnage pouch 180 in the direction of arrow 284.

As shown in FIG. 15B, when front lockable crossbar assembly 256a is located extending between the generally vertically oriented track portions 36a of the generally L-shaped tracks 32a, and next lockable crossbar assembly 256b is located extending between the generally horizontally oriented track portions 34a of the generally L-shaped tracks 32a, an operator may easily remove a product inside the front pouch 180 through opening 190 because the front lockable crossbar assembly 256a is below the next lockable crossbar assembly 256b.

This is also true as regards lockable crossbar assemblies 256b, 256c when an operator is unloading a second product 5 from the dunnage. This orientation of the crossbar assemblies, due to the configuration of the generally L-shaped tracks 32a, helps an operator from an ergonomic standpoint, reducing the stress and strain on the body of the operator when unloading product from the dunnage. Thus, the unique configuration of the generally L-shaped tracks 32a inside the reusable and returnable container 10b may reduce the container owner's costs because workers or operators may have fewer injuries/days off due to injury.

Figure 15D:
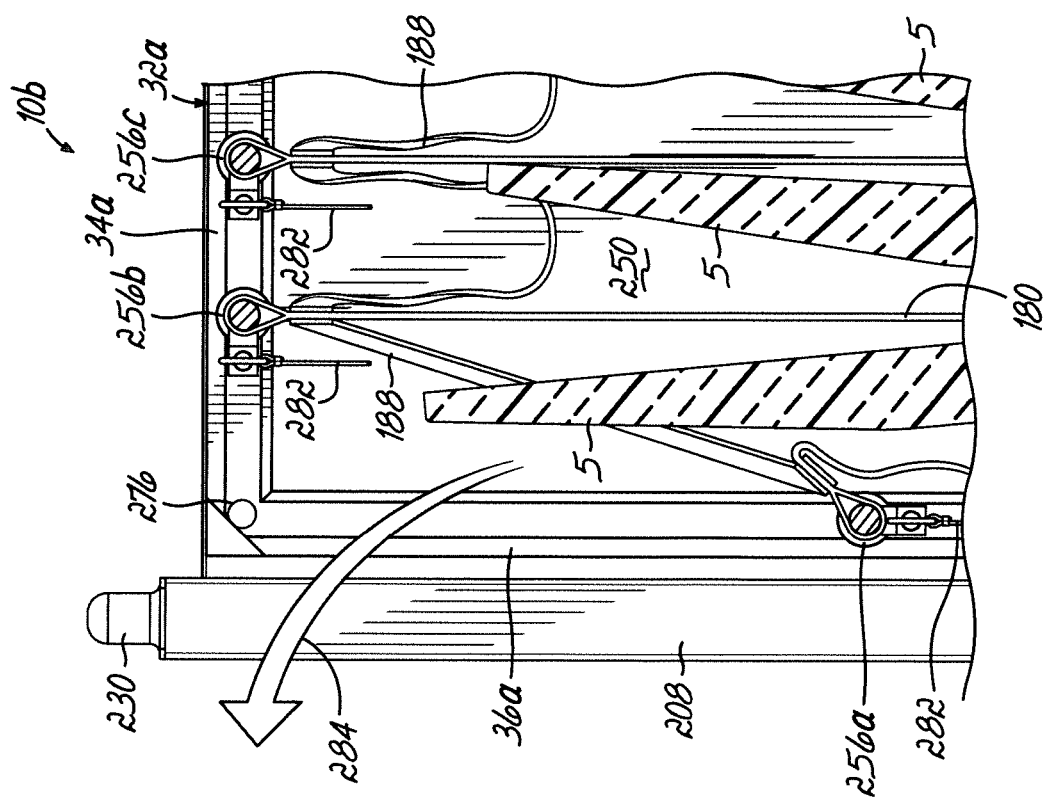
FIG. 15D is a partial cross-sectional view of the container of FIG. 15, showing the second lockable crossbar assembly in a lowered position.

As shown in FIG. 15D, the next step comprises moving lockable crossbar assembly 256b (second from the front) from an unlocked, movable position extending between the generally horizontally oriented track portions 34a of the generally L-shaped tracks 32a (shown in FIG. 15C) into a locked position in which the locking pins 266 of the locking assemblies 258 extend through the openings 276 in the side walls of the generally horizontally oriented track portions 34a of tracks 32a. By pulling on cord 282 of second crossbar assembly 256b, the second crossbar assembly 256b may be unlocked and moved downwardly from its locked position shown in FIG. 15D to a suspended position. This process repeats itself with every product being removed.

Figure 16:
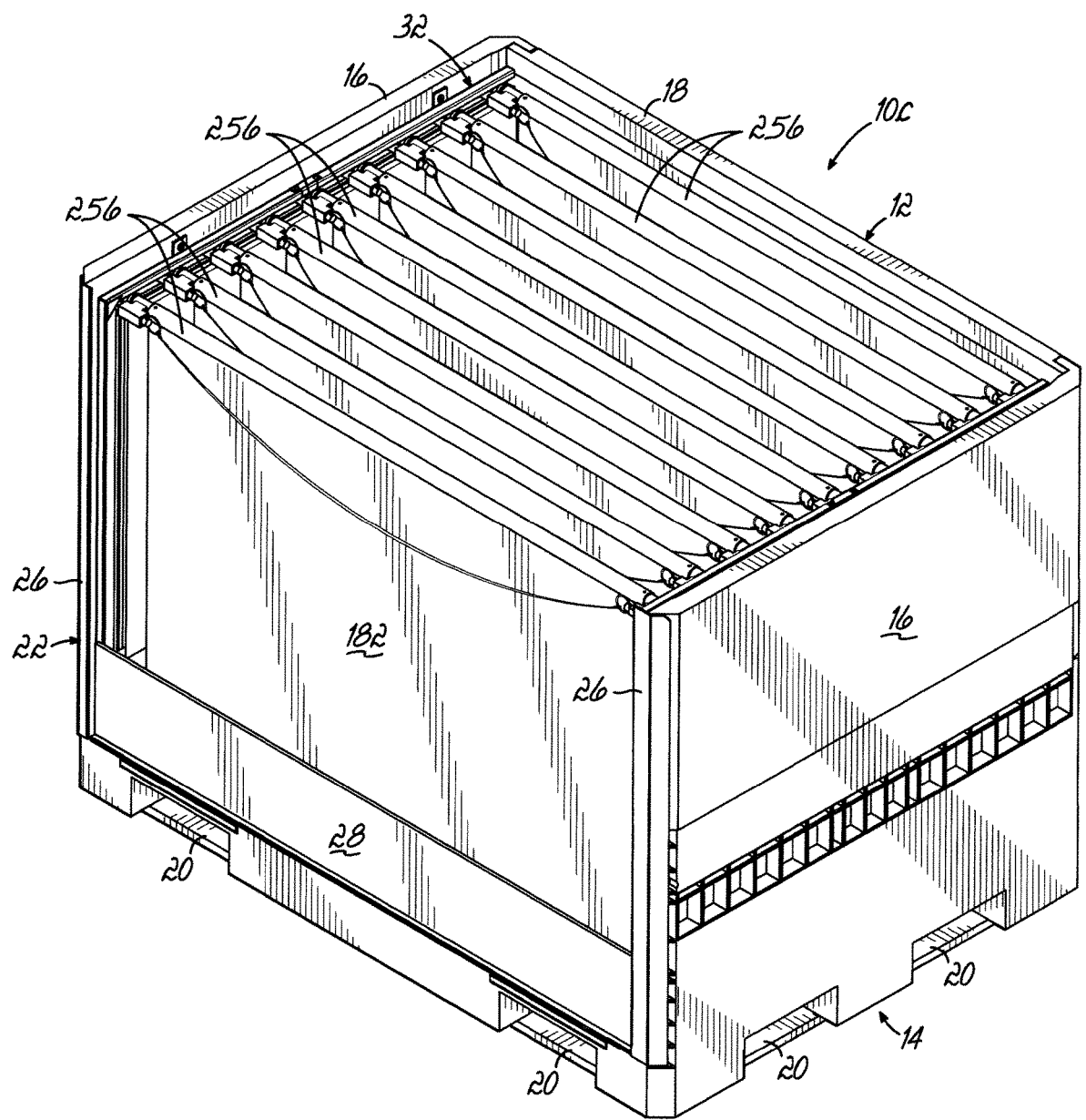
FIG. 16 is a perspective view of another embodiment of reusable and returnable container.

FIG. 16 illustrates an alternative embodiment of reusable and returnable container 10c. Reusable and returnable container 10c is similar to reusable and returnable container 10, but has all lockable crossbar assemblies 256. For simplicity, like parts have like numbers. Any number of crossbar assemblies at any desired location(s) may be lockable or unlockable in any set of tracks.

Figure 17:
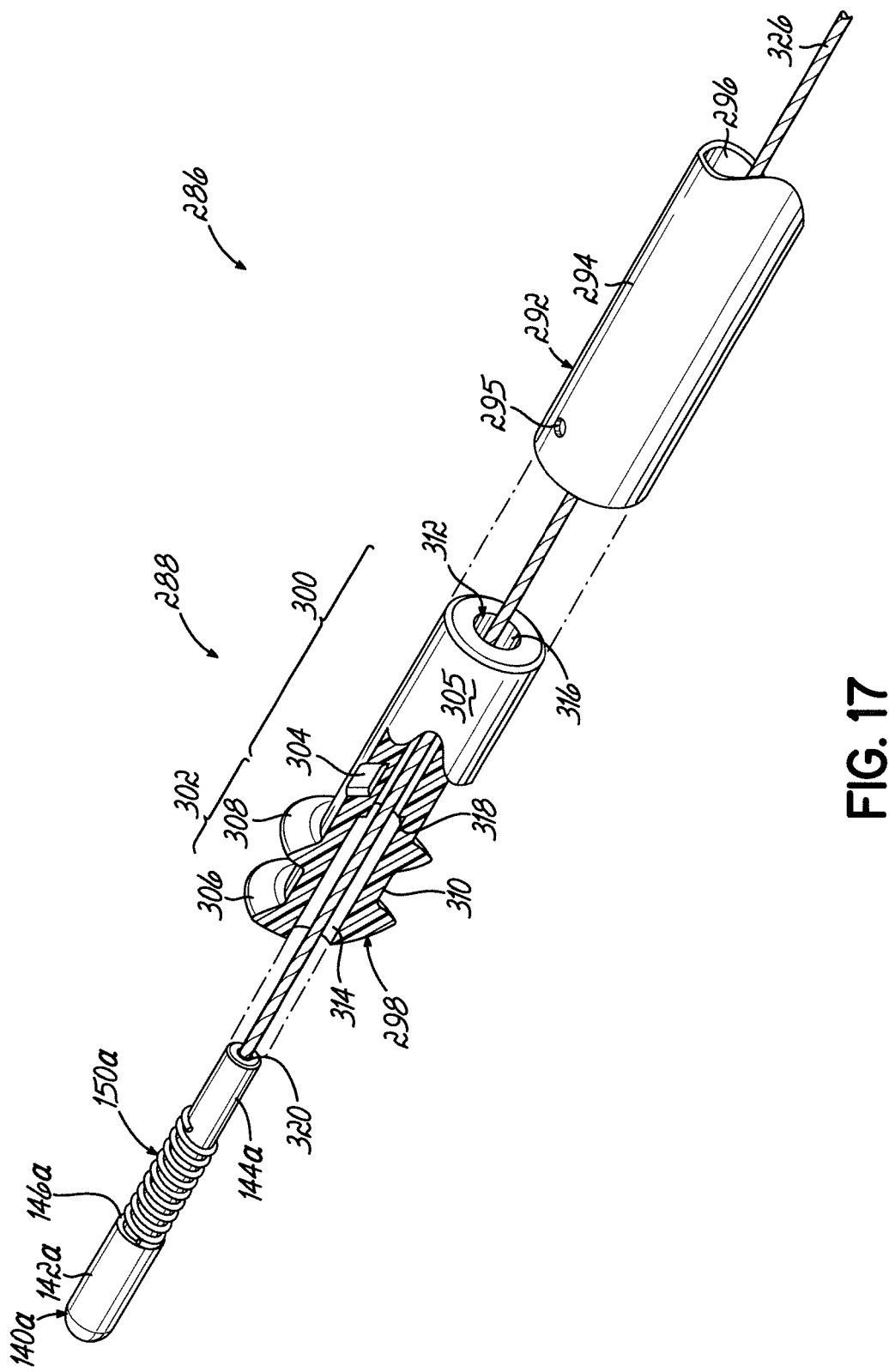
FIG. 17 is a partially disassembled view of a portion of another version of lockable crossbar assembly.

FIGS. 17, 18A and 18B illustrate a portion of an alternative lockable crossbar assembly 286 which may be used in any embodiment of container shown or described herein. For simplicity, like parts have like numbers. Each lockable crossbar assembly 286 has two locking assemblies 288 between which is a crossbar 292. FIGS. 17, 18A and 18B illustrate the components and operation of one of the locking assemblies 288 of one of the lockable crossbar assemblies 286. Although FIGS. 18-27B show different lockable crossbar assemblies lockable relative to a generally horizontally oriented track portion 34 of a generally L-shaped track 32, any of the lockable crossbar assemblies may be used in any of tracks or portions thereof shown or described herein.

As shown in FIG. 17, each lockable crossbar assembly 286 has a crossbar 292 having an outer wall 294 defining a hollow interior 296. As shown in FIGS. 18A and 18B, the outer wall 294 of the crossbar 292 has at least one opening 290 (only one opening 290 being shown) created by removal of a portion of the outer wall 294 of the crossbar 292. The opening (or openings) 290 allows access to the cord 326 extending through the hollow interior 296 of the crossbar 292. The opening (or openings) 290 may be any desired shape(s) and be at any desired location(s). The drawings are not intended to be limiting. At each end, crossbar 292 has a dunnage opening 295 which permits a fastener 330 to hold the dunnage in place and secure the crossbar 292 to one of the end members 298. The crossbar 292 is preferably made of metal, but may be made of other suitable material, such as plastic. In some applications, the dunnage openings 295 may be omitted and a portion of the crossbar 292 indented into a recess of each end member to secure the crossbar to the end members. In such applications, the dunnage may not be fixed to the crossbar 292.

As best shown in FIG. 17, each locking assembly 288 of lockable crossbar assembly 286 further comprises an end member 298 having two spaced heads 306, 308. Each end member 298 is a unitary member, preferably made of injection molded plastic, such as nylon, but may be made of any other material.

As shown in FIG. 17, each end member 298 has an inner portion 300 and an outer portion 302. The inner portion 300 has a recess 304 extending inwardly from an outer surface 305 of the inner portion 300. The outer portion 302 of end member 298 has a spaced outer and inner heads 306, 308, respectively, at the end of the end member 298. Outer head 306 is furthest from the inner portion 300 of the end member 298, and inner head 308 is spaced inwardly from outer head 306. The outer and inner heads 306, 308, respectively, are spaced from one another to define a groove 310 therebetween which receives and retains the upper and lower lips 44, 46, respectively, of a generally L-shaped track 32. As shown in FIGS. 18A and 18B, outer head 306 is located inside the interior 48 of generally horizontally oriented track portion 34 of each generally L-shaped track 32, and inner head 308 is located outside the interior 48 of generally horizontally oriented track portion 34 of each generally L-shaped track 32. Outer head 306 keeps the end member 298 engaged with the track, while inner head 308 keeps the dunnage material out of the interior 48 of the track, thereby ensuring that the end members 298 may move smoothly along the generally L-shaped tracks 32.

As shown in FIGS. 17, 18A and 18B, each end member 298 has an internal passage 312 extending through the interior of the end member 298. The internal passage 312 has an outer portion 314 of a first diameter and an inner portion 316 of a second diameter, the first diameter being larger than the second diameter. An annular shoulder 318 exists at the junction of the outer and inner portions 314, 316 of internal passage 312 of end member 298.

As best shown in FIG. 17, each locking assembly 288 of each lockable crossbar assembly 286 further comprises a locking pin 140a. Locking pin 140a is similar to locking pin 140 described above and shown in detail in FIG. 4, but with one difference. Locking pin 140a lacks an opening through the inner portion of the locking pin, but rather has a bore 320 extending inwardly and terminating at a cavity 322 for securing one end 324 of a cord 326. See FIGS. 18A and 18B. Locking pin 140a has an outer portion 142a and an inner portion 144a, the diameter of the outer portion 142a being larger than the diameter of the inner portion 144a, thereby creating an annular shoulder 146a. A spring 150a surrounds the inner portion 144a of locking pin 140a. One end of spring 150a abuts the annular shoulder 146a of locking pin 140a such that inward movement of the locking pin 140a by an operator manipulating cord 326 causes compression of the spring 150a.

As shown in FIGS. 17, 18A and 18B, upon assembly, each end 324 of cord 326 is secured inside cavity 322 after passing through bore 320 of a locking pin 140a (only one being shown). The cord 326 extends through a portion of the internal passage 312 of each end member 298 (only one being shown) and through the hollow interior 296 of crossbar 292.

As best shown in FIGS. 18A and 18B, upon assembly, the locking pin 140a and spring 150a extend into the internal passage 312 extending through the end member 298. The outer portion 142a of locking pin 140a and spring 150a fit inside the outer portion 314 of internal passage 312 of end member 298, as shown in FIG. 18A. The inner portion 144a of locking pin 140a fits inside the inner portion 316 of internal passage 312 of end member 298, as shown in FIG. 18A. The spring 150a is shown in a relaxed position in FIG. 18A extending between the annular shoulder 318 of internal passage 312 of end member 298 and annular shoulder 146a of locking pin 140a. In FIG. 18B, the spring 150a is shown in a compressed position between the annular shoulder 146a of the locking pin 140a and the annular shoulder 154 of internal passage 312 of end member 298. As the locking pin 140a moves inwardly towards the center of the lockable cross assembly 286 by a user pulling the cord 326 upwardly as shown by arrow 328 in FIG. 18B, thereby shorting the distance of the cord 326 between the two locking pins 140a of lockable crossbar assembly 286, the spring 150a is compressed between annular shoulder 146a of the locking pin 140a and annular shoulder 318 of internal passage 312 of end member 298. When an operator lets go of the cord 326, the spring 150a biases or forces the locking pin 140a outwardly (to the left as shown in FIGS. 18A and 18B) to an extended locked position. The shortening of the distance between ends of the cord 326 retracts the locking pins 140a of both locking assemblies 288 of each lockable crossbar assembly 286.

As shown in FIGS. 18A and 18B, a pocket 338 of fabric surrounding each lockable crossbar assembly 286 has at least one cut-out 340 (only one being shown) to allow access to the opening 290 (and cord 326 inside) of crossbar 292. Each cut-out 340 may be covered with a flap 342 to keep rain, snow, debris and other unwanted objects out of the hollow interior 296 of crossbar 292. Each flap 342 may be secured over the opening 290 of crossbar 292 with hook and loop fasteners or any other known closing means or mechanism. See FIG. 3. However, if desired, the flap(s) may be omitted. Flaps 342 may be used to cover any of the dunnage cut-outs and/or crossbar openings disclosed in any of the embodiments shown or described herein.

As best shown in FIGS. 18A and 18B, upon assembly, a fastener 330, such as a rivet, for example, joins end member 298, crossbar 292 and pocket 338 of dunnage 336 surrounding the crossbar 292. Fastener 330 has a generally planar upper portion 332 which resides outside the outer wall 294 of the crossbar 292 and outside the pocket 338 of the dunnage 336 upon assembly. Fastener 330 further comprises a neck 333 extending through the dunnage opening 295 in the crossbar 292. See FIG. 17. As shown in FIGS. 18A-18D, fastener 330 further comprises a lower portion 334 which travels in the recess 304 of end member 298, allowing some relative movement between the end member 298 and crossbar 292. Such allowance for relative movement prevents the lockable crossbar assembly 286 from becoming jammed in an undesirable position inside a container between tracks. In place of a fastener 330, a portion of the outer wall 294 of crossbar 292 may be deformed into the recess 304 of end member 298.

FIGS. 18C and 18D illustrate another version of lockable crossbar assembly 286a, which may be used in any of the containers shown or described herein. Lockable crossbar assembly 286a is identical to lockable crossbar assembly 286, but has one additional component, a flexible cover 344. As shown in FIGS. 18C and 18D, a flexible cover 344 covers each opening 290 of crossbar 292 to prevent access to the interior 296 of crossbar 292. The flexible cover 344 has a groove 345 around its perimeter inside which is an edge 348 of the opening 290 of crossbar 292. In order to shorten the distance between ends 324 of cord 326 and move locking pins 140a inwardly towards each other out of a locked position, an operator need simply push down on flexible cover 344 to move the cord 326 downwardly, as shown in FIG. 18D. Downward movement of flexible cover 344 in the direction of arrow 346 shortens the distance between the ends 324 of cord 326, thereby moving the locking pins 140a towards each other to enable movement of the lockable crossbar assembly 286a. Flexible covers 344 may be used to cover any crossbar opening in any version of lockable crossbar assembly having at least one opening shown or described herein.

In operation, shortening the distance between ends 324 of cord 326 by an operator causes inward movement of the ends 324 of cord 326, which causes inward movement of the locking pins 140a against the outward bias of springs 150a. The locking pins 140a move towards each other and move relative to the crossbar 292 and end members 298. As shown in FIGS. 18A and 18B, movement of the cord 326 by an operator causes the locking pins 140a to move from extended locked positions extending through openings 170 in side walls 42 of the generally horizontally oriented track portions 34 of the generally L-shaped tracks 32. Although one locking assembly 288 (left side) of the lockable crossbar assembly 286 is shown in FIGS. 18A and 18B, the right side is a mirror image. To unlock the lockable crossbar assembly 286 from a locked position shown in FIG. 18A to an unlocked position shown in FIG. 18B, an operator must shorten the length of the cord 326 extending between the locking pins 140a of the locking assemblies 288. Shortening this distance moves the locking pins 140a inwardly towards each other, compressing the spring 150a of each locking assembly 288 and moving each locking pin 140a of each locking assembly 288 out of opening 170 of the generally horizontally oriented track portion 34 of the generally L-shaped track 32. Once the locking pins 140a are in their unlocked position shown in FIG. 18B, an operator is free to move the lockable crossbar assembly 286 to its desired position, including another position in the generally L-shaped tracks 32, as shown in FIG. 1A. Such an operation may be used in any of the tracks shown or described herein and with any of the embodiments shown in FIGS. 17-24.

FIGS. 19A and 19B illustrate views similar to FIGS. 18A and 18B with the same lockable crossbar assembly 286, including the same locking assemblies 288. However, the generally horizontally oriented track portion 34a of the generally "L-shaped" track 32a is different than the generally horizontally oriented track portion 34 of the generally "L-shaped" track 32 described above and illustrated herein. The same may be true of any generally vertically oriented track portion 36 of the generally "L-shaped" track 32.

Rather than being generally planar, the side wall 42a of the generally horizontally oriented track portion 34a of the generally "L-shaped" track 32a has an indentation 350, which increases the distance between the track opening 170a and the inside surface of the side wall 16, thereby eliminating the need for a cavity in the side wall 16. More particularly, the indentation 350 comprises upper and lower slanted portions 352 joined by an inner portion 354 of side wall 42a, the opening 170a extending through the inner portion 354 of side wall 42a. See FIG. 19B. Such a configuration of the side wall 42a of the generally horizontally oriented track portion 34a of the generally "L-shaped" track 32a provides greater distance for the locking pin 140a to travel between engaged and disengaged positions shown in FIGS. 19A and 19B, respectively. Although shown only in FIGS. 19A and 19B, this configuration or shape of track may be used in any embodiment of container shown or described herein and with any lockable or unlockable crossbar assembly or combination thereof.

FIGS. 20A and 20B illustrate views similar to FIGS. 18A and 18B with different lockable crossbar assemblies 286b and different generally "L-shaped" tracks 32b. Each lockable crossbar assembly 286b comprises two locking assemblies 288b (only one being shown) between which is a crossbar 292. FIGS. 20A and 20B show the generally horizontally oriented track portion 34b of the generally "L-shaped" track 32b having at least one projection 356. Any number of projections 356 of any desired shape may be located at any desired locations along the generally horizontally oriented track portions 34b and along the generally vertically oriented track portions (not shown) of the generally "L-shaped" tracks 32b. As best shown in FIG. 20B, the locking pin 140b of each locking assembly 288b has a recess 358 adapted to receive and retain one of the projections 356 to lock the lockable crossbar assembly 286b in a desired location. Although the drawings show conical-shaped projections 356, the projections may be any desired shape or size; same with the recesses 358. The drawings are not intended to be limiting. Although shown only in FIGS. 20A and 20B, this configuration or shape of track and locking pin may be used in any embodiment of container shown or described herein and with any lockable crossbar assembly, track or combination thereof.

Figure 21:
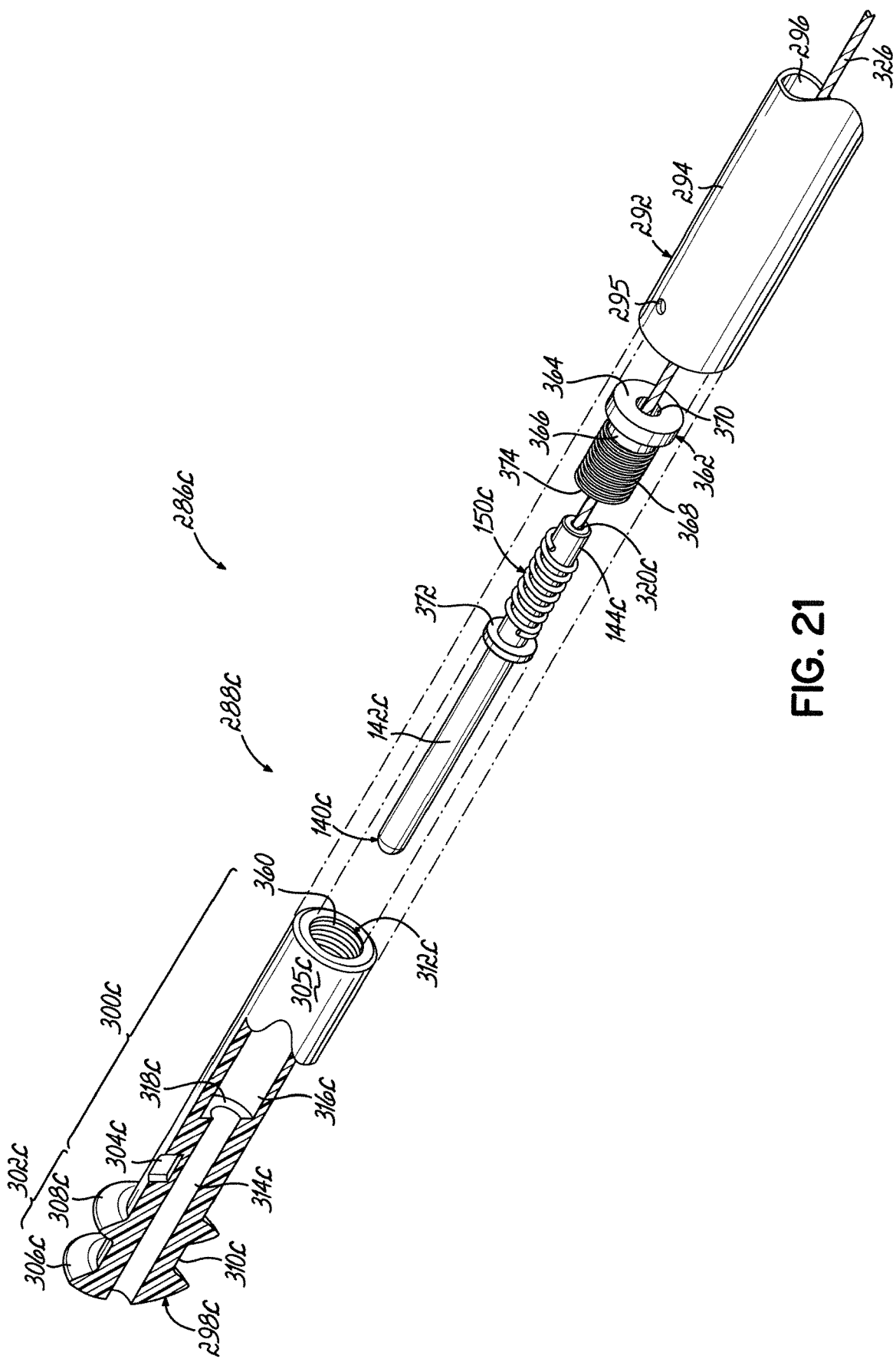
FIG. 21 is a partially disassembled view of a portion of another version of lockable crossbar assembly.

FIGS. 21, 21A and 21B illustrate a portion of an alternative lockable crossbar assembly 286c which may be used in any embodiment of container shown or described herein. For simplicity, like parts have like numbers. Each lockable crossbar assembly 286c has two locking assemblies 288c (only one being shown) between which is a crossbar 292. FIGS. 21, 21A and 21B illustrate the components and operation of one of the locking assemblies 288c of one of the lockable crossbar assemblies 286c. FIGS. 21A and 21B illustrate cross-sectional views of a portion of an assembled lockable crossbar assembly 286c, showing the same tracks as FIGS. 18A and 18B. However, lockable crossbar assembly 286c, like the other lockable crossbar assemblies shown and described herein, may be used in any track, or portion thereof, shown or described herein.

As best shown in FIG. 21, each locking assembly 288c of lockable crossbar assembly 286c comprises an end member 298c having spaced outer and inner heads 306c, 308c, respectively. Each end member 298c is a unitary member, preferably made of injection molded plastic, such as nylon, but may be made of any other material.

As shown in FIG. 21, each end member 298c preferably has an inner portion 300c and an outer portion 302c. The inner portion 300c has a recess 304c extending inwardly from an outer surface 305c of the inner portion 300c. The outer portion 302c of end member 298c has spaced outer and inner heads 306c, 308c, respectively, at the end of the end member 298c. Outer head 306c is furthest from the inner portion 300c of the end member 298c, and inner head 308c is spaced inwardly from outer head 306c. The outer and inner heads 306c, 308c, respectively, are spaced from one another to define a groove 310c therebetween which receives and retains the upper and lower lips 44, 46, respectively, of each generally L-shaped track 32. As shown in FIGS. 21A and 21B, outer head 306c is shown located inside the interior 48 of generally horizontally oriented track portion 34 of each generally L-shaped track 32, and inner head 308c is shown located outside the interior 48 of generally horizontally oriented track portion 34 of each generally L-shaped track 32. Outer head 306c keeps the end member 298c engaged with the track, while inner head 308c keeps the dunnage material out of the interior 48 of the track, thereby ensuring that the end members 298c may move smoothly along the generally L-shaped tracks 32.

As shown in FIGS. 21, 21A and 21B, each end member 298c has an internal passage 312c extending through the interior of the end member 298c. The internal passage 312c has an outer portion 314c of a first diameter and a partially threaded inner portion 316c of a second diameter, the second diameter being larger than the first diameter. An annular shoulder 318c exists at the junction of the outer and inner portions 314c, 316c of internal passage 312c of end member 298c. The inside surface of the inner portion 316c has threads 360 shown extending only partially along the length of the inner portion. However, the threads 360 may extend along the entire length of the inner portion 316c of internal passage 312c or any portion thereof. In other words, they may extend for any desired length of the inner portion 316c of internal passage 312c.

As shown in FIGS. 21, 21A and 21B, each locking assembly 288c of lockable crossbar assembly 286c further comprises a plug 362 having a flange 364 and a narrow portion 366. The narrow portion 366 has an end surface 374 and external threads 368 adapted to engage the internal threads 360 of the end member 298c. The flange 364 is sized to fit inside the hollow interior 296 of the crossbar 292, as shown in FIGS. 21A and 21B. A bore 370 extends the length of the plug 362 to allow the cord 326 to pass through the plug 362, as shown in FIGS. 21A and 21B. The plug 362 may be secured inside the hollow interior 296 of the crossbar 292 at a desired location via engagement of its external threads 368 with the internal threads 360 of the inner portion 316c of internal passage 312c of end member 298c.

As best shown in FIG. 21, each movable locking assembly 288c of each lockable crossbar assembly 286c further comprises a locking pin 140c. As best shown in FIGS. 21A and 21B, locking pin 140c has a bore 320c terminating in a cavity 322c for securing one end 324 of a cord 326. As best shown in FIG. 21, locking pin 140c has an outer portion 142c and an inner portion 144c, the diameter of the inner portion 144c being the same diameter as the outer portion 142c. The locking pin 140c further comprises a stop 372 between the inner and outer portions 144c, 142c, respectively. A spring 150c surrounds the inner portion 144c of locking pin 140c, one end of spring 150c abutting the stop 372 of locking pin 140c.

As shown in FIGS. 21, 21A and 21B, upon assembly, each end 324 of cord 326 is secured inside a cavity 322c after passing through bore 320c of locking pin 140c (only one being shown). As shown in FIGS. 21A and 21B, from one end 324 to the other, cord 326 extends through the bore 370 of each plug 362 (only one being shown) and through the hollow interior 296 of crossbar 292. The compression of spring 150a may be adjusted by rotation of plug 362 and shortening the distance between the end surface 374 of plug 362 and the stop 372 of locking pin 140c.

As best shown in FIGS. 21A and 21B, upon assembly, the locking pin 140c and surrounding spring 150c extend into the internal passage 312c extending through the end member 298c. The outer portion 142c of locking pin 140c fits inside the outer portion 314c of internal passage 312c of end member 298c, as shown in FIG. 21A. The inner portion 144c of locking pin 140c and spring 150c fit inside the inner portion 316c of internal passage 312c of end member 298c, as shown in FIG. 21A. The stop 372 of locking pin 140c abuts the annular shoulder 318c of internal passage 312c of end member 298c, as shown in FIG. 21A.

The spring 150c is shown in a relaxed position in FIG. 21A extending between the stop 372 of locking pin 140c and the end surface 374 of plug 362 of locking assembly 288c. In FIG. 21B, spring 150c is shown in a compressed position or condition between the stop 372 of locking pin 140c and the end surface 374 of plug 362 of the locking assembly 288c, the stop 372 of locking pin 140c having moved inwardly (to the left as shown in FIGS. 21A and 21B) by a shortening of the distance between ends 324 of cord 362. The spring 150c is compressed as the locking pin 140c moves inwardly towards the center of the lockable crossbar assembly 286c by a user, shortening the distance between ends 324 of the cord 326 such as, for example, pulling the cord 326c upwardly as shown by arrow 376 in FIG. 21B. By shortening of the distance between ends 324 of cord 362, the distance between the two locking pins 140c of lockable crossbar assembly 286c shortens the spring 150c being compressed between the stop 372 of locking pin 140c and the end surface 374 of plug 362 of the locking assembly 288c. When an operator lets go of the cord 326, the spring 150c biases or forces the locking pin 140c outwardly (to the left as shown in FIGS. 21A and 21B) to an extended locked position in which the locking pin 140c is inside an opening 170 of track portion 34.

As best shown in FIGS. 21A and 21B, upon assembly, a fastener 330, such as a rivet, for example, joins end member 298c, crossbar 292 and dunnage 336 surrounding the crossbar 292. Fastener 330 has a generally planar upper portion 332 which resides outside the pocket 338 of fabric surrounding lockable crossbar assembly 286c upon assembly and neck 333 extending through the dunnage opening 295 in the crossbar 292. See FIG. 21. Fastener 330 further comprises a lower portion 334 which travels in the recess 304c of end member 298c, allowing some movement between the end member 298c and crossbar 292. Such allowance for movement prevents the lockable crossbar assembly 286c from becoming jammed in an undesirable position inside the container. In place of a fastener 330, a portion of the outer wall 294 of the crossbar 292 may be deformed into the recess 304c of end member 298c. In such a configuration, the pocket 338 of dunnage 336 surrounding lockable crossbar assembly 286c would be free to move relative to the lockable crossbar assembly 286c.

Figure 22:
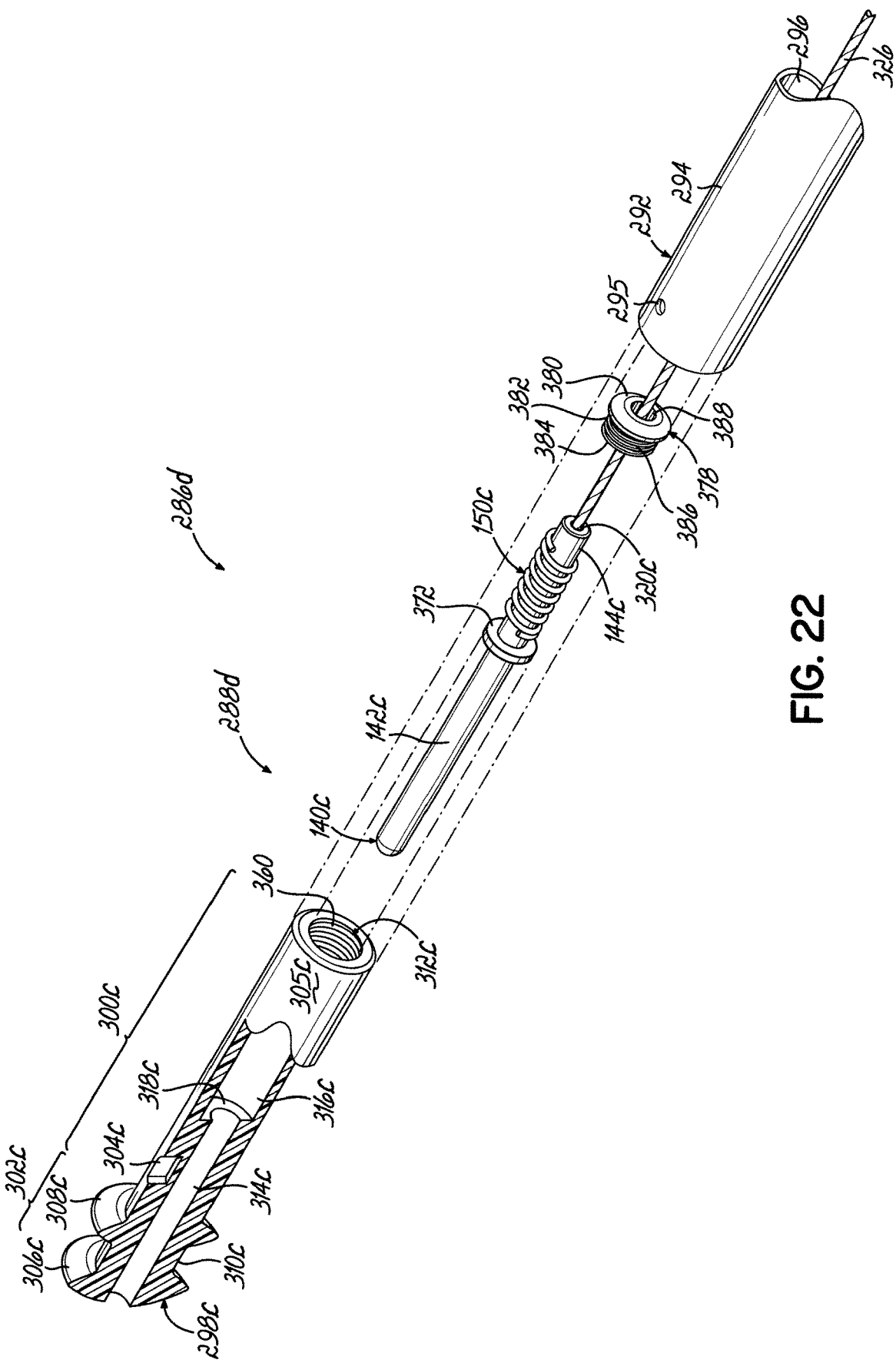
FIG. 22 is a partially disassembled view of a portion of another version of lockable crossbar assembly.

FIGS. 22, 22A and 22B illustrate a portion of an alternative lockable crossbar assembly 286d, which may be used in any embodiment of container shown or described herein. For simplicity, like parts have like numbers. Each lockable crossbar assembly 286d has two locking assemblies 288d (only one being shown) between which is a crossbar 292. FIGS. 22, 22A and 22B illustrate the components and operation of one of the locking assemblies 288d of one of the lockable crossbar assemblies 286d. Each locking assembly 288d is similar to locking assembly 288c shown in FIG. 21, having the same parts except for the plug. In place of plug 362 shown in FIG. 21, locking assembly 288d uses a shorter plug 378.

As best shown in FIG. 21, plug 378 has a flange 380 and a narrow portion 382. The narrow portion 382 has an end surface 384 and external threads 386 adapted to engage the internal threads 360 of the end member 298c. The flange 380 is sized to fit inside the hollow interior 296 of the crossbar 292. A bore 388 extends the length of the plug 378 to allow the cord 326 to pass through the plug 378, as shown in FIGS. 22A and 22B. The plug 378 may be secured inside the hollow interior 296 of the crossbar 292 at a desired location via engagement of its external threads 386 with the internal threads 360 of the inner portion 316c of internal passage 312c of end member 298c.

FIGS. 22A and 22B illustrate cross-sectional views of a portion of an assembled lockable crossbar assembly 286d, showing the same tracks as FIGS. 18A and 18B. However, lockable crossbar assembly 286d, like the other lockable crossbar assemblies shown and described herein, may be used in any track, or portion thereof, shown or described herein.

Figure 23:
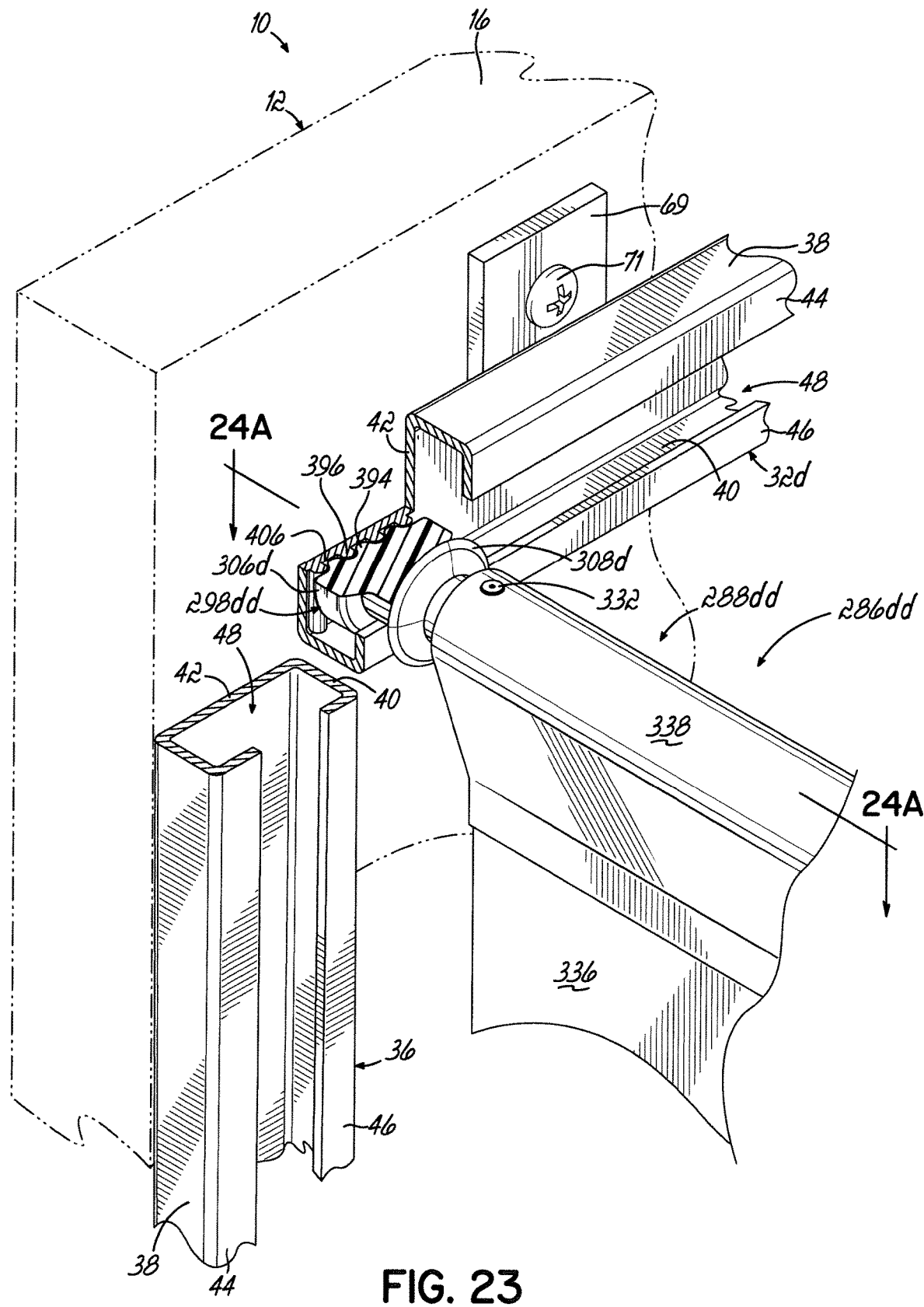
FIG. 23 is a perspective view of a portion of another version of lockable crossbar assembly locked in a desired position engaged with another version of track.

FIGS. 23, 24A and 24B illustrate a portion of an alternative lockable crossbar assembly 286dd, which may be used in any embodiment of container shown or described herein. For simplicity, like parts have like numbers. Each lockable crossbar assembly 286dd has two movable locking assemblies 288dd (only one being shown) between which is a crossbar 292. FIGS. 23, 24A and 24B illustrate the components and operation of one of the locking assemblies 288dd of one of the lockable crossbar assemblies 286dd.

As shown in FIGS. 24A and 24B, each lockable crossbar assembly 286dd has a crossbar 292 with at least one opening (not shown in FIG. 23, 24A or 24B). As best shown in FIG. 23, each locking assembly 288dd of lockable crossbar assembly 286dd further comprises an end member 298dd having spaced outer and inner heads 306d, 308d, respectively. Each end member 298dd is a unitary member preferably made of injection molded plastic, such as nylon, but may be made of any other material.

As best shown in FIG. 24B, each end member 298dd has an inner portion 300d and an outer portion 302d. The inner portion 300d comprises a stem 301 having a bore 390 extending into a cavity 392 inside which is one end 324 of cord 326. The inner portion 300d of end member 298dd further comprises a stop 404 which functions to compress a spring 150d in a manner described below.

The outer portion 302d of end member 298dd has spaced outer and inner heads 306d, 308d, respectively, at the end of the end member 298dd. Outer head 306d is furthest from the inner portion 300d of the end member 298dd, and inner head 308d is spaced inwardly from outer head 306d. The outer and inner heads 306d, 308d, respectively, are spaced from one another to define a groove 310d therebetween which receives and retains the upper and lower lips 44, 46, respectively, of each generally L-shaped track 32d. As shown in FIGS. 24A and 24B, outer head 306d is located inside the interior 48 of generally horizontally oriented track portion 34 of each generally L-shaped track 32d, and inner head 308d is located outside the interior 48 of each track 32d. Outer head 306d keeps the end member 298dd engaged with the track, while inner head 308d keeps the dunnage material out of the interior 48 of the track, thereby ensuring that the end members 298dd may move smoothly along the generally L-shaped tracks 32d. Outer head 306d of each end member 298dd has a set of teeth 394, which engage with a stationary set 395 of teeth 396 of track 32d.

As shown in FIGS. 24A and 24B, each locking assembly 288dd of lockable crossbar assembly 286dd has a cassette 398. Each cassette 398 is secured inside the hollow interior 296 of crossbar 292. Each cassette 398 has an outer wall 400 and an inner wall 402. A spring 150d is trapped between the stop 404 of the end member 298d and inner wall 402 of cassette 398. The outer wall 400 of cassette 398 has a bore 401 inside which end member 298dd travels. Inner wall 402 has a bore 405 through which the cord 326 travels.

In operation, shortening the distance between ends 324 of cord 326 by an operator causes inward movement of the ends 324 of cord 326, which causes inward movement of the end members 298dd against the outward bias of springs 150d. The end members 298dd move relative to the crossbar 292. As shown in FIGS. 24A and 24B, movement of the cord 326 by an operator causes the end members 298d to move from extended locked positions in which the teeth 394 of end member 298dd engage the recesses 406 between the teeth 396 of the tracks 32d. Although one movable locking assembly 288dd (left side) of the lockable crossbar assembly 286dd is shown in FIGS. 24A and 24B, the right side is a mirror image. To unlock the lockable crossbar assembly 286d from a locked position shown in FIG. 24A to an unlocked position shown in FIG. 24B, an operator must shorten the length of the cord 326 extending between the end members 298dd of the locking assemblies 288dd. Shortening this distances moves the end members 298dd inwardly towards each other, compressing the spring 150d of each movable locking assembly 288dd and moving each end member 298dd of each movable locking assembly 288dd inwardly out of engagement with the set 395 of teeth 396 of the track 32d. Once the end members 298dd are in their unlocked position shown in FIG. 24B, an operator is free to move the lockable crossbar assembly 286d to its desired position, including another position in the tracks 32d.

Figure 25:
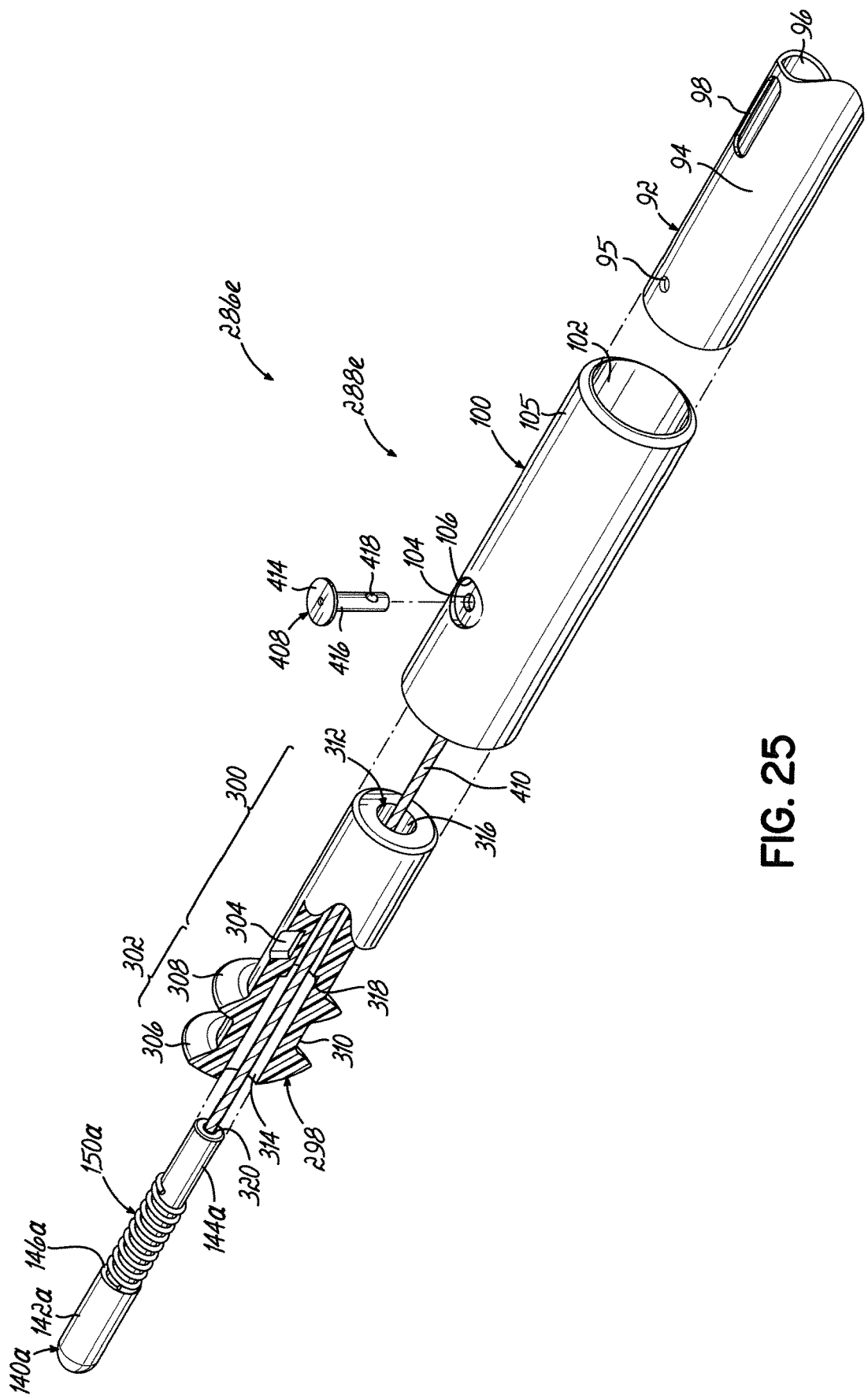
FIG. 25 is a partially disassembled view of a portion of another version of lockable crossbar assembly.

FIGS. 25, 26A and 26B illustrate a portion of an alternative lockable crossbar assembly 286e, which may be used in any embodiment of container shown or described herein. For simplicity, like parts have like numbers. Each lockable crossbar assembly 286e has two locking assemblies 288e (only one being shown) between which is a crossbar 92. Crossbar 92 is the same one described above and shown in detail in FIGS. 4, 5A and 5B. FIGS. 25, 26A and 26B illustrate the components and operation of one of the locking assemblies 288e of one of the lockable crossbar assemblies 286e.

Each locking assembly 288e is similar to locking assembly 288 shown in FIG. 17, having the same locking pin 140a, spring 150a and end member 298. Each locking assembly 288e further comprises a handle 100, an anchor 408 and a cord 410 having opposed ends 412. As best shown in FIGS. 24A and 24B, upon assembly, anchor 408 joins end member 298, handle 100 and crossbar 92. More particularly, anchor 408 has a generally planar upper portion 414 which resides in the recess 106 of handle 100 upon assembly. Anchor 408 has a lower portion 416 with a passage 418. As shown in FIGS. 24A and 24B, the lower portion 416 of the anchor 408 travels along the slot 98 of crossbar 92.

As shown in FIGS. 25, 26A and 26B, upon assembly, one end 412 of cord 410 is secured inside cavity 420 of locking pin 140a after passing through bore 320 of locking pin 140a (only one being shown). The other end of cord 410 extends through the passage 418 of the lower portion 416 of the anchor 408 and is secured to the lower portion 416 of the anchor 408. Along its length, cord 410 extends through the internal passage 312 of end member 298 (only one being shown) and through the hollow interior 96 of crossbar 92.

In operation, inward movement of the handles 100 and associated anchors 408 by an operator, shown by the arrow 422 of FIG. 26B towards each other, causes inward movement of the locking pins 140a against the outward bias of springs 150a. The locking pins 140a move relative to the crossbar 92 and end members 298. As shown in FIGS. 26A and 26B, inward movement of the handles 100 by an operator causes the locking pins 140a to move from extended locked positions extending through openings 170 in the side walls 42 of the generally horizontally oriented track portion 34 of the generally L-shaped tracks 32. Although one movable locking assembly 288e (left side) of the lockable crossbar assembly 286e is shown in FIGS. 26A and 26B, the right side is a mirror image. To unlock the lockable crossbar assembly 286e from a locked position shown in FIG. 26A to an unlocked position shown in FIG. 26B, an operator must move handles 100 of the locking assemblies 288e inwardly towards each other, compressing the spring 150a on each side of the lockable crossbar assembly 286e and moving two locking pins 140a of the lockable crossbar assembly 286e inwardly out of the openings 170 of the generally horizontally oriented track portions 34 of the generally L-shaped tracks 32. Once the locking pins 140a are in their unlocked position shown in FIG. 26B, an operator is free to move the lockable crossbar assembly 286e to its desired position, including another position in the generally vertically oriented track portions 36 of the generally L-shaped tracks 32, as shown in FIG. 1A.

FIGS. 27A and 27B illustrate a portion of an alternative lockable crossbar assembly 286f which may be used in any embodiment of container shown or described herein. For simplicity, like parts have like numbers. Each lockable crossbar assembly 286f has two locking assemblies 288f (only one being shown) between which is a crossbar 92. FIGS. 27A and 27B illustrate the components and operation of one of the locking assemblies 288f of one of the lockable crossbar assemblies 286f. Each locking assembly 288f is identical to lockable assembly 288e, but with the addition of a pulley 424 which may be secured to crossbar 92 in any known manner. The inclusion of the pulleys enables an operator to move the handles 100 away from each in the direction of arrow 426 of FIG. 27B to disengage locking pins 140a and enable the operator to move crossbar assembly 286f.

FIGS. 28A and 28B illustrate a portion of an alternative lockable crossbar assembly 286g, which may be used in any embodiment of container shown or described herein. For simplicity, like parts have like numbers. Each lockable crossbar assembly 286g has two movable locking assemblies 288g (only one being shown) between which is a crossbar 292. FIGS. 28A and 28B illustrate the components and operation of one of the locking assemblies 288g of one of the lockable crossbar assemblies 286g.

As shown in FIGS. 28A and 28B, each lockable crossbar assembly 286g has a crossbar 292 with at least one opening (not shown in FIG. 28A or 28B). Each locking assembly 288g of lockable crossbar assembly 286g further comprises an end member 298g having spaced outer and inner heads 306g, 308g, respectively. Each end member 298g is a unitary member preferably made of injection molded plastic, such as nylon, but may be made of any other material.

As best shown in FIGS. 28A and 28B, each end member 298g has an inner portion 300g and an outer portion 302g. The inner portion 300g comprises a stem 301g having a bore 390g extending into a cavity 392 inside which is one end 324 of cord 326. The inner portion 300g of end member 298g further comprises a stop 404g which functions to compress a spring 150g in a manner described below.

The outer portion 302g of end member 298g has spaced outer and inner heads 306g, 308g, respectively, at the end of the end member 298g. Outer head 306g is furthest from the inner portion 300g of the end member 298g, and inner head 308g is spaced inwardly from outer head 306g. The outer and inner heads 306*g*, 308*g*, respectively, are spaced from one another to define a groove 310*g* therebetween which receives and retains the upper and lower lips 44, 46, respectively, of each generally L-shaped track 32*g*. As shown in FIGS. 28A and 28B, outer head 306*g* is located inside the interior 48 of generally horizontally oriented track portion 34 of each generally L-shaped track 32*g*, and inner head 308*g* is located outside the interior 48 of each track 32*g*. Outer head 306*g* keeps the end member 298*g* engaged with the track, while inner head 308*g* keeps the dunnage material out of the interior 48 of the track, thereby ensuring that the end members 298*g* may move smoothly along the generally L-shaped tracks 32*g*. Outer head 306*g* of each end member 298*g* has a projection 428 which engages an opening 430 extending through track 32*g*.

As shown in FIGS. 28A and 28B, each locking assembly 288*g* of lockable crossbar assembly 286*g* has a cassette 398. Each cassette 398 is secured inside the hollow interior 296 of crossbar 292. Each cassette 398 has an outer wall 400 and an inner wall 402. A spring 150*g* is trapped between the stop 404 of the end member 298*g* and inner wall 402 of cassette 398. The outer wall 400 of cassette 398 has a bore 401 inside which end member 298*g* travels. Inner wall 402 has a bore 405 through which the cord 326 travels.

In operation, shortening the distance between ends 324 of cord 326 by an operator causes inward movement of the ends 324 of cord 326, which causes inward movement of the end members 298*g* against the outward bias of springs 150*g*. The end members 298*g* move relative to the crossbar 292. As shown in FIGS. 28A and 28B, movement of the cord 326 by an operator causes the end members 298*g* to move from extended locked positions in which the projections 428 of end members 298*g* engage the openings 430 of the tracks 32*g*. Although one movable locking assembly 288*g* (left side) of the lockable crossbar assembly 286*g* is shown in FIGS. 28A and 28B, the right side is a mirror image. To unlock the lockable crossbar assembly 286*g* from a locked position shown in FIG. 28A to an unlocked position shown in FIG. 28B, an operator must shorten the length of the cord 326 extending between the end members 298*g* of the locking assemblies 288*g*. Shortening this distances moves the end members 298*g* inwardly towards each other, compressing the spring 150*g* of each movable locking assembly 288*g* and moving each end member 298*g* of each movable locking assembly 288*g* inwardly out of engagement with the opening 430 of the track 32*g*. Once the end members 298*g* are in their unlocked position shown in FIG. 28B, an operator is free to move the lockable crossbar assembly 286*g* to its desired position, including another position in the tracks 32*g*.

Figure 29:
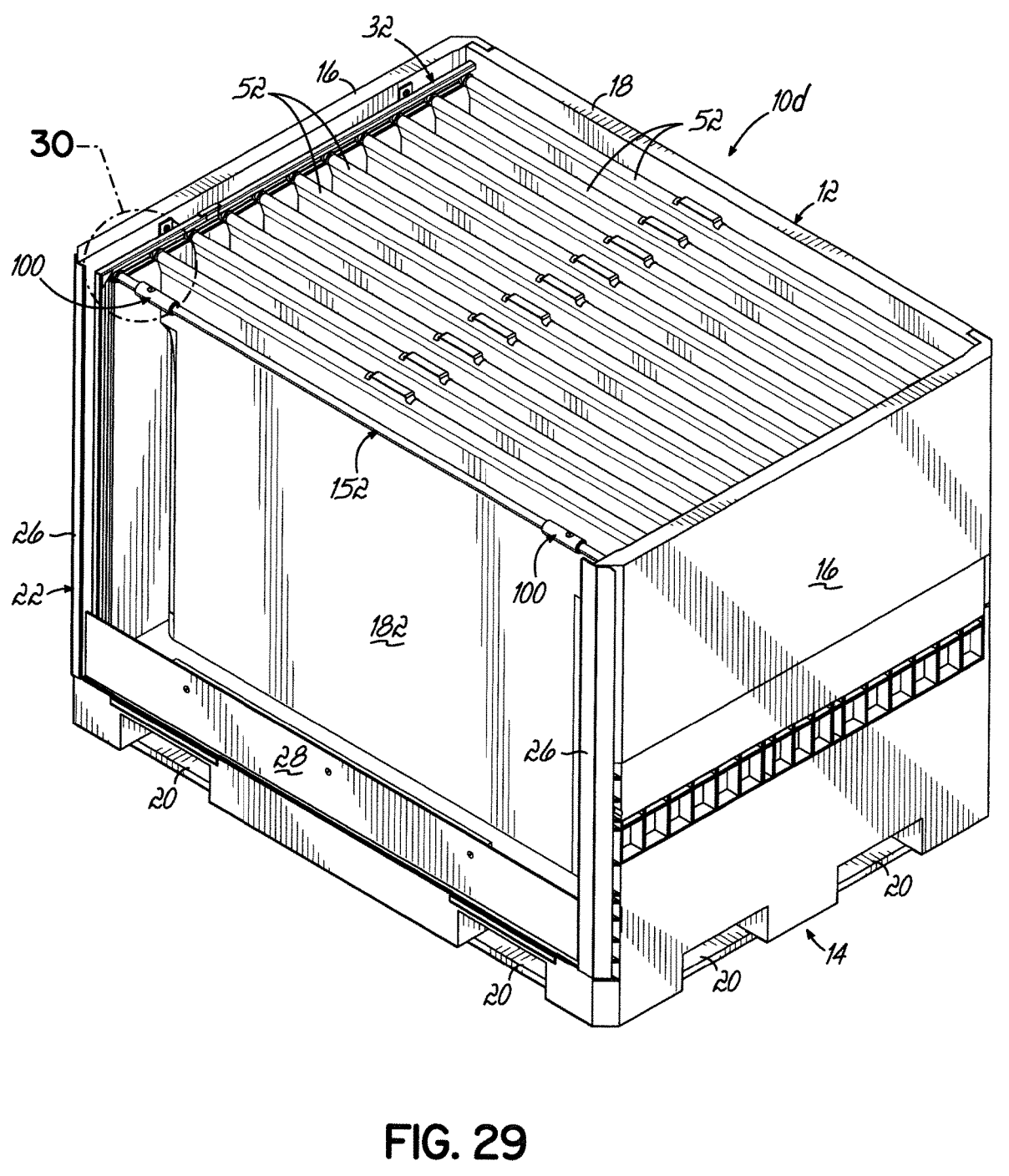
Figure 30:
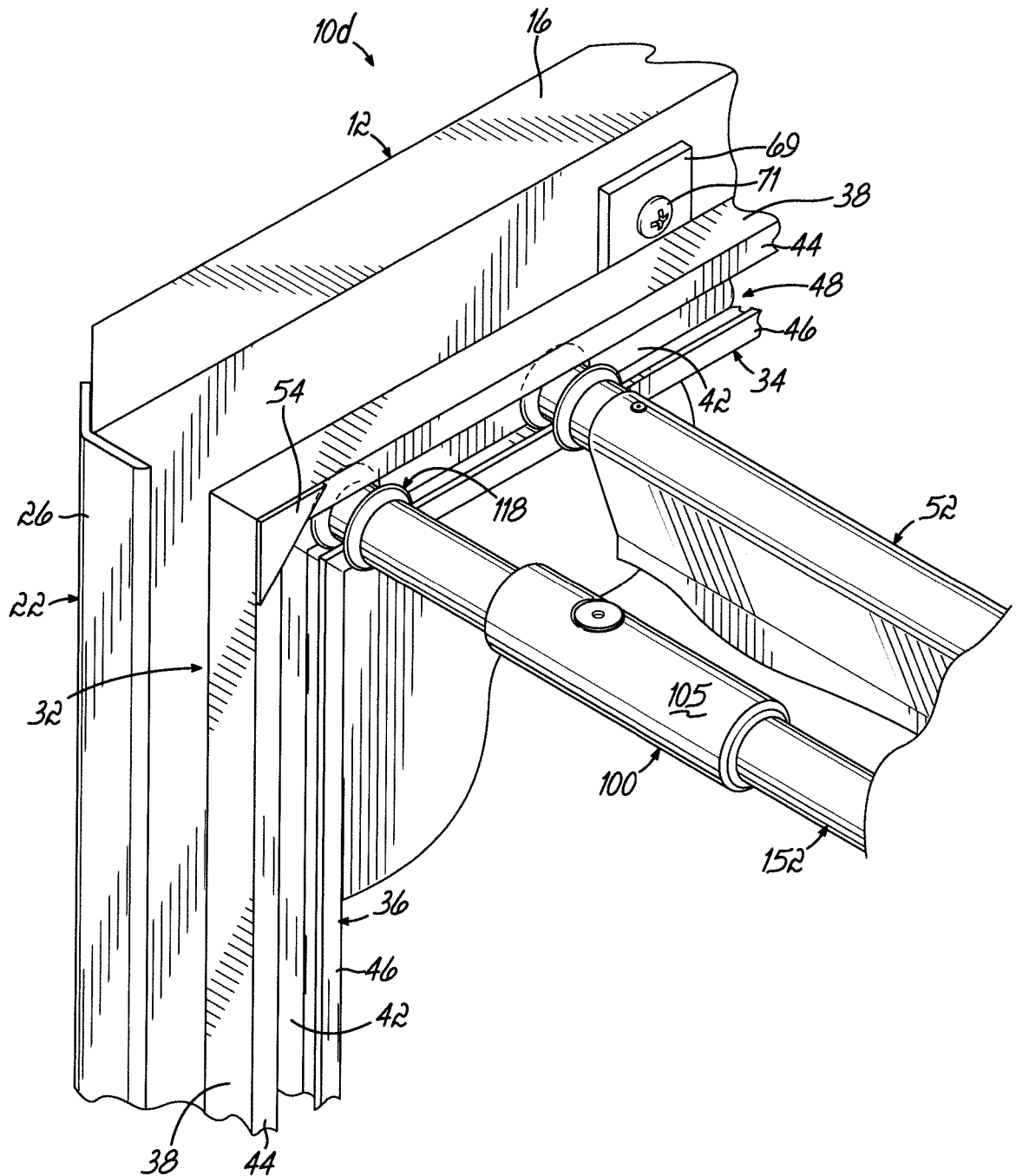
FIG. 30 is an enlarged view of the encircled area 30 of FIG. 29.

FIGS. 29 and 30 illustrate an alternative embodiment of reusable and returnable container 10*d*. Reusable and returnable container 10*d* is similar to reusable and returnable container 10, but has its front lockable crossbar assembly 152 acting as a stop and not supporting dunnage. For simplicity, like parts have like numbers. Referring to FIG. 29, reusable and returnable container 10*d* comprises a plurality of dunnage supports 52 and one lockable crossbar assembly 152, the lockable crossbar assembly 152 being in front of the dunnage supports 52 extending between corresponding tracks. The lockable crossbar assembly 152 does not support any dunnage. When in its locked position, the lockable crossbar assembly 152 functions as a stop, preventing the dunnage supports 52 behind it from entering the generally vertically oriented portions of the L-shaped tracks during shipping, for example. Any lockable crossbar assembly described herein may be used for the same purposes.

Figure 31:
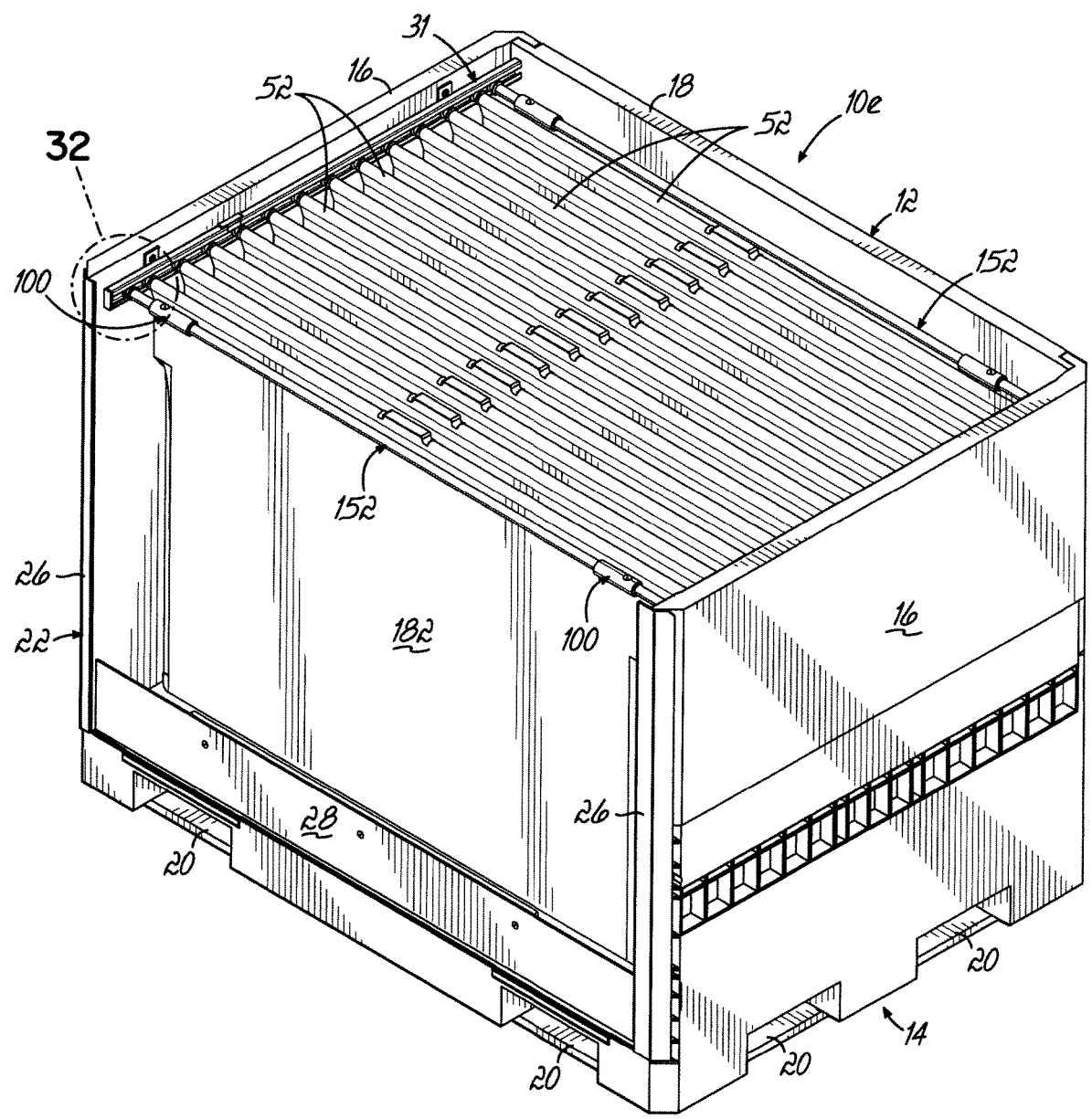
FIG. 31 is a perspective view of another embodiment of reusable and returnable container.
Figure 32:
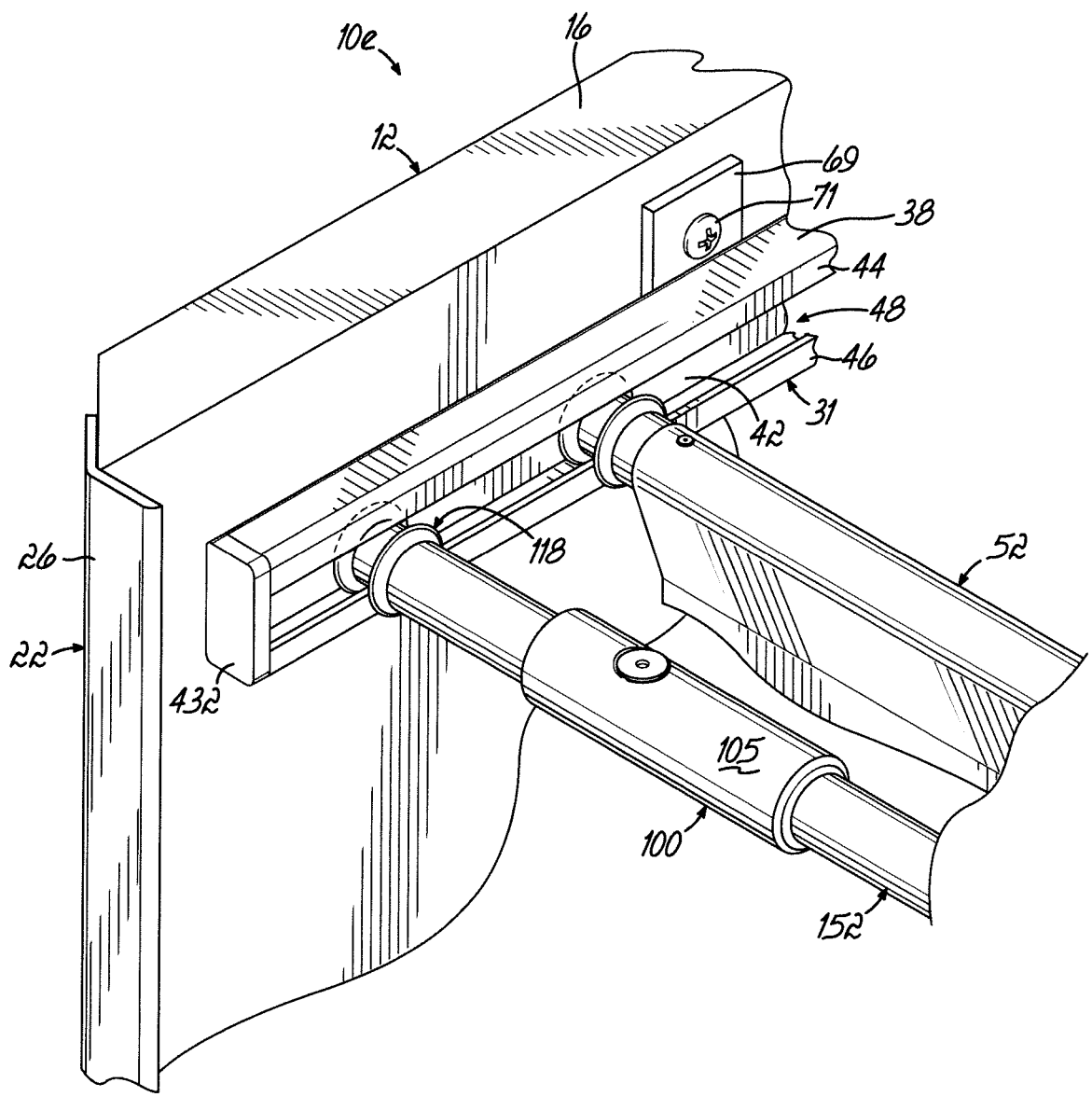
FIG. 32 is an enlarged view of the encircled area 32 of FIG. 31.

FIGS. 31 and 32 illustrate an alternative embodiment of reusable and returnable container 10*e*. Reusable and returnable container 10*e* is similar to reusable and returnable container 10, but has linear tracks 31 instead of non-linear tracks. Reusable and returnable container 10*e* further has front and rear lockable crossbar assemblies 152. Both lockable crossbar assemblies 152 act as stops for inhibiting movement of the dunnage supports 52 located between the lockable crossbar assemblies 152 supporting dunnage during shipping. The outer lockable crossbar assemblies 152 may not support dunnage. For simplicity, like parts have like numbers. Referring to FIG. 31, reusable and returnable container 10*e* comprises a plurality of dunnage supports 52 and two outer lockable crossbar assemblies 152, the lockable crossbar assembly 152 being at the front and rear of the set of dunnage supports 52 extending between corresponding linear tracks 31. Any lockable crossbar assembly described herein may be used for as the outermost crossbar assembly.

As best shown in FIG. 32, each track 31 of reusable and returnable container 10*e* is straight and has two end caps 432 (only one being shown). For simplicity, the cross-sectional configuration of each linear track 31 is identical to the cross-sectional configuration of each generally horizontally oriented track portion 34 of each generally L-shaped track 32 described above. Each side of reusable and returnable container 10*e* has a linear track 31 proximate an upper edge of the reusable and returnable container 10*e* and held in place with mounting brackets 69 welded or otherwise secured to the linear track 31. Each bracket 69 may be secured via at least one fastener 71 to one of the side walls 16 of reusable and returnable container 10. The linear track 31 is stationary and may be secured in any desired manner to each side of the reusable and returnable container 10. For example, the side wall 42 of the linear track 31 may be secured to an inside surface of one of the side walls 16 without brackets. The apparatus used to hold the tracks in place is not intended to be limiting and is not intended to be part of the present invention.

FIGS. 33A and 33B illustrate a portion of an alternative lockable crossbar assembly 286*h*, which may be used in any embodiment of container shown or described herein. For simplicity, like parts have like numbers. Each lockable crossbar assembly 286*h* has two locking assemblies 288*h* (only one being shown) between which is a crossbar 92*h*. Crossbar 92*h* has an outer wall 94*h* defining a hollow interior 96*h*. The outer wall 94*h* of the crossbar 92*h* has an inner groove 434 and an outer groove 436 at each end. See FIGS. 33A and 33B. The crossbar 92*h* is preferably made of metal, but may be made of other suitable material, such as plastic. FIGS. 33A and 33B illustrate the components and operation of one of the locking assemblies 288*h* of one of the lockable crossbar assemblies 286*h*.

Each locking assembly 288*h* (only one being shown) is similar to each locking assembly 288*e* shown in FIGS. 25, 26A and 26B, but has fewer parts, thereby reducing manufacturing costs and the potential for part damage/malfunction. Locking assembly 288*h* has the same handle 100, anchor 408 and cord 410 having opposed ends 412 as locking assembly 288*e*. However, each locking assembly 288*h* further comprises a generally T-shaped locking pin 438 and a spring 440. The generally T-shaped locking pin 438 has a first portion 444 extending in a direction parallel the longitudinal axis "A" of the crossbar 92*h* and a second portion 446 extending in a direction perpendicular to the first portion 444. The spring 440 is retained in a holding cavity 442 inside the hollow interior 96*h* of the crossbar 92*h* between grooves 434 and 436. As best shown in FIGS. 33A and 33B, upon assembly, anchor 408 joins generally T-shaped locking pin 438, handle 100 and crossbar 92*h*. More particularly, anchor 408 has a generally planar upper portion 414 which resides in the recess 106 of handle 100 upon assembly. Anchor 408 has a lower portion 416 with a passage 418. As shown in FIGS. 33A and 33B, the lower portion 416 of the anchor 408 travels along the slot 98 of crossbar 92*h*.

As shown in FIGS. 33A and 33B, upon assembly, one end 412 of cord 410 is secured inside cavity 448 of generally T-shaped locking pin 438 after passing through bore 450 of generally T-shaped locking pin 438 (only one being shown). The other end of cord 410 extends through the passage 418 of the lower portion 416 of the anchor 408 and is secured to the lower portion 416 of the anchor 408. Along its length, cord 410 extends through the spring 440 and through the hollow interior 96*h* of crossbar 92*h*.

In operation, inward movement of the handles 100 and associated anchors 408 by an operator, shown by the arrow 452 of FIG. 33B towards each other, causes inward movement of the generally T-shaped locking pins 438 against the outward bias of springs 440. The generally T-shaped locking pins 438 move relative to the crossbar 92*h*. As shown in FIGS. 33A and 33B, inward movement of the handles 100 by an operator causes the generally T-shaped locking pins 438 to move from extended locked positions extending through openings 170 in the side walls 42 of the generally horizontally oriented track portion 34 of the generally L-shaped tracks 32. Although one movable locking assembly 288*h* (left side) of the lockable crossbar assembly 286*h* is shown in FIGS. 33A and 33B, the right side is a mirror image. To unlock the lockable crossbar assembly 286*h* from a locked position shown in FIG. 33A to an unlocked position shown in FIG. 33B, an operator must move handles 100 of the locking assemblies 288*h* inwardly towards each other, compressing the spring 440 on each side of the lockable crossbar assembly 286*h* and moving two generally T-shaped locking pins 438 of the lockable crossbar assembly 286*h* inwardly out of the openings 170 of the generally horizontally oriented track portions 34 of the generally L-shaped tracks 32. Once the generally T-shaped locking pins 438 are in their unlocked position shown in FIG. 33B, an operator is free to move the lockable crossbar assembly 286*h* to its desired position, including another position in the generally vertically oriented track portions 36 of the generally L-shaped tracks 32.

Figure 34:
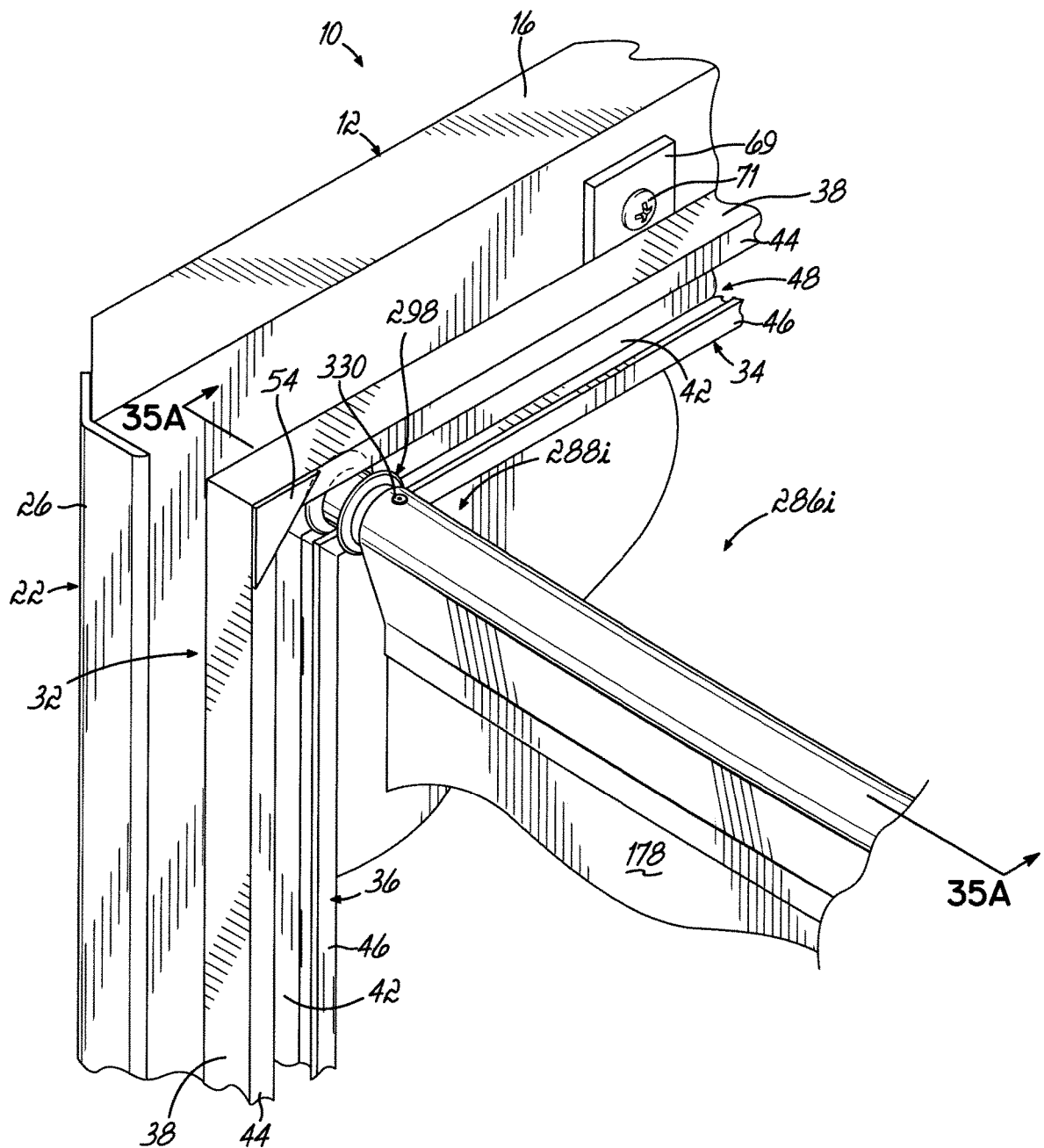
FIG. 34 is a perspective view of a portion of another embodiment of reusable and returnable container.

FIGS. 34, 35, 35A and 35B illustrate an alternative embodiment of lockable crossbar assembly 286*i* which may be used in any of the tracks shown or described herein in any of the containers shown or described herein. FIG. 34 shows a portion of one of the lockable crossbar assemblies 286*i* locked in a fixed position extending between upper generally horizontally oriented track portions 34 of generally L-shaped tracks 32 inside reusable and returnable container 10.

Figure 35:
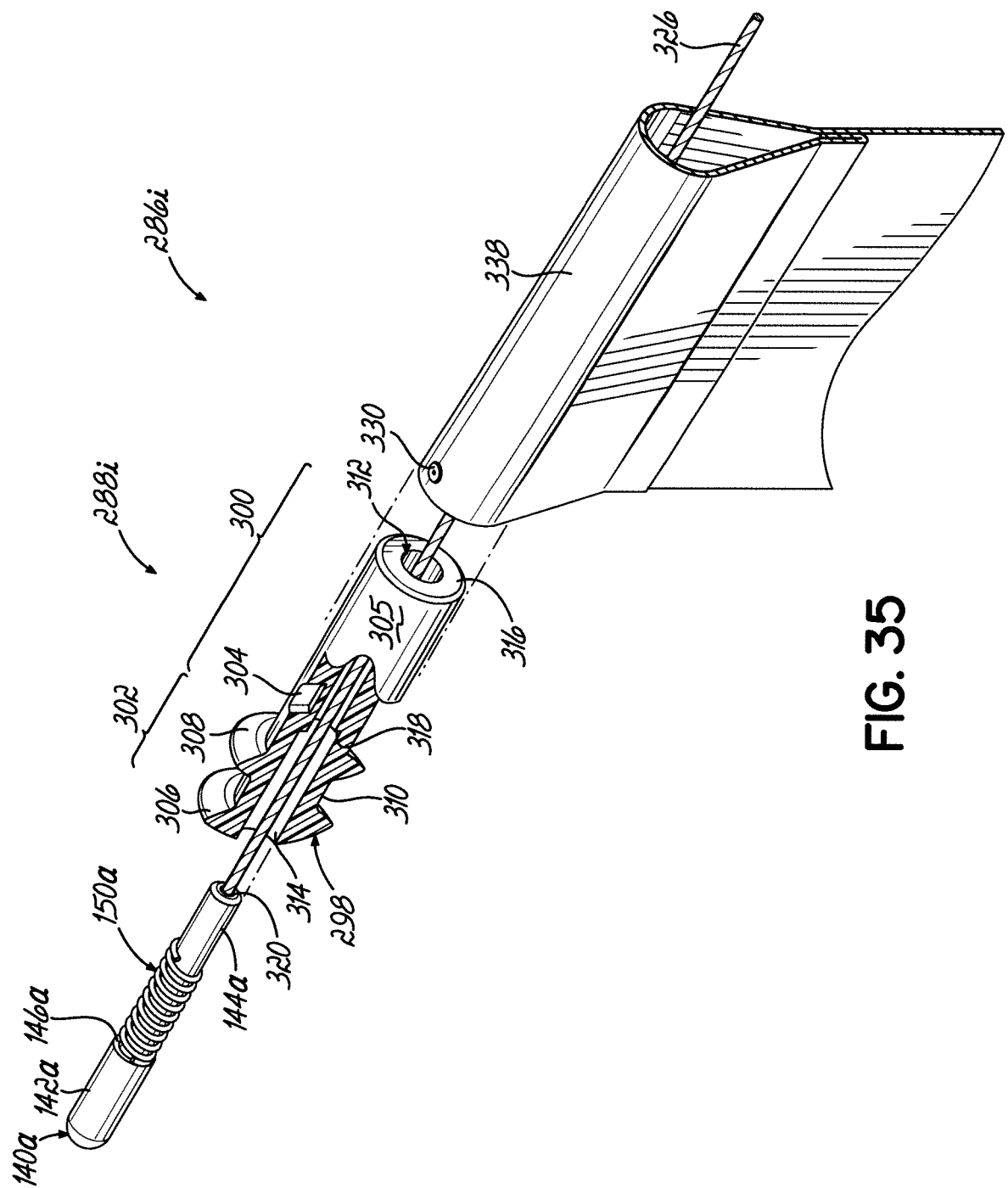
FIG. 35 is a partially disassembled view of a portion of another version of lockable crossbar assembly.

FIGS. 35, 35A and 35B illustrate a portion of an alternative lockable crossbar assembly 286*i*, which may be used in any of the tracks shown or described herein in any embodiment of container shown or described herein. For simplicity, like parts have like numbers. Each lockable crossbar assembly 286*i* has two locking assemblies 288*i* (only one being shown) between which is a cord 326, rather than a crossbar. Cord 326 is the same one described above and shown in detail in FIG. 17. FIGS. 35, 35A and 35B illustrate the components and operation of one of the locking assemblies 288*i* of one of the lockable crossbar assemblies 286*i*.

Each locking assembly 288*i* of lockable crossbar assembly 286*i* is similar to locking assembly 288 shown in FIG. 17, having the same locking pin 140*a*, spring 150*a* and end member 298. Each locking assembly 288*i* does not have a handle. As best shown in FIGS. 35A and 35B, the cord 326 passes through the pocket 338 of fabric.

In operation, an operator may shorten the distance between ends of the cord 326 in any known manner, thereby moving the locking pins 140*a* of locking assemblies 288*i* of lockable crossbar assembly 286*i* towards each other. Shortening the distance between ends of the cord 326 causes inward movement of the locking pins 140*a* against the outward bias of springs 150*a*. As shown in FIGS. 35A and 35B, shortening the distance between ends of the cord 326 by an operator causes the locking pins 140*a* to move from extended locked positions extending through openings 212 in the side walls 42 of the upper generally horizontally oriented track portions 34 of the generally L-shaped tracks 32. Although one locking assembly 288*i* (left side) of the lockable crossbar assembly 286*i* is shown in FIGS. 35A and 35B, the right side is a mirror image. To unlock the lockable crossbar assembly 286*i* from a locked position shown in FIG. 35A to an unlocked position shown in FIG. 35B, an operator must shorten the distance between ends of the cord 326, compressing the spring 150*a* on each side of the lockable crossbar assembly 286*i* and moving two locking pins 140*a* of the lockable crossbar assembly 286*i* inwardly out of the openings 212 of the generally horizontally oriented track portions 34 of the generally L-shaped tracks 32. Once the locking pins 140*a* are in their unlocked position shown in FIG. 35B, an operator is free to move the lockable crossbar assembly 286*i* to its desired position, including another position in the generally vertically oriented track portions 36 of the generally L-shaped tracks 32. Such an operation may be used in any of the tracks shown or described herein and with any of the embodiments of container shown herein.

Figure 36:
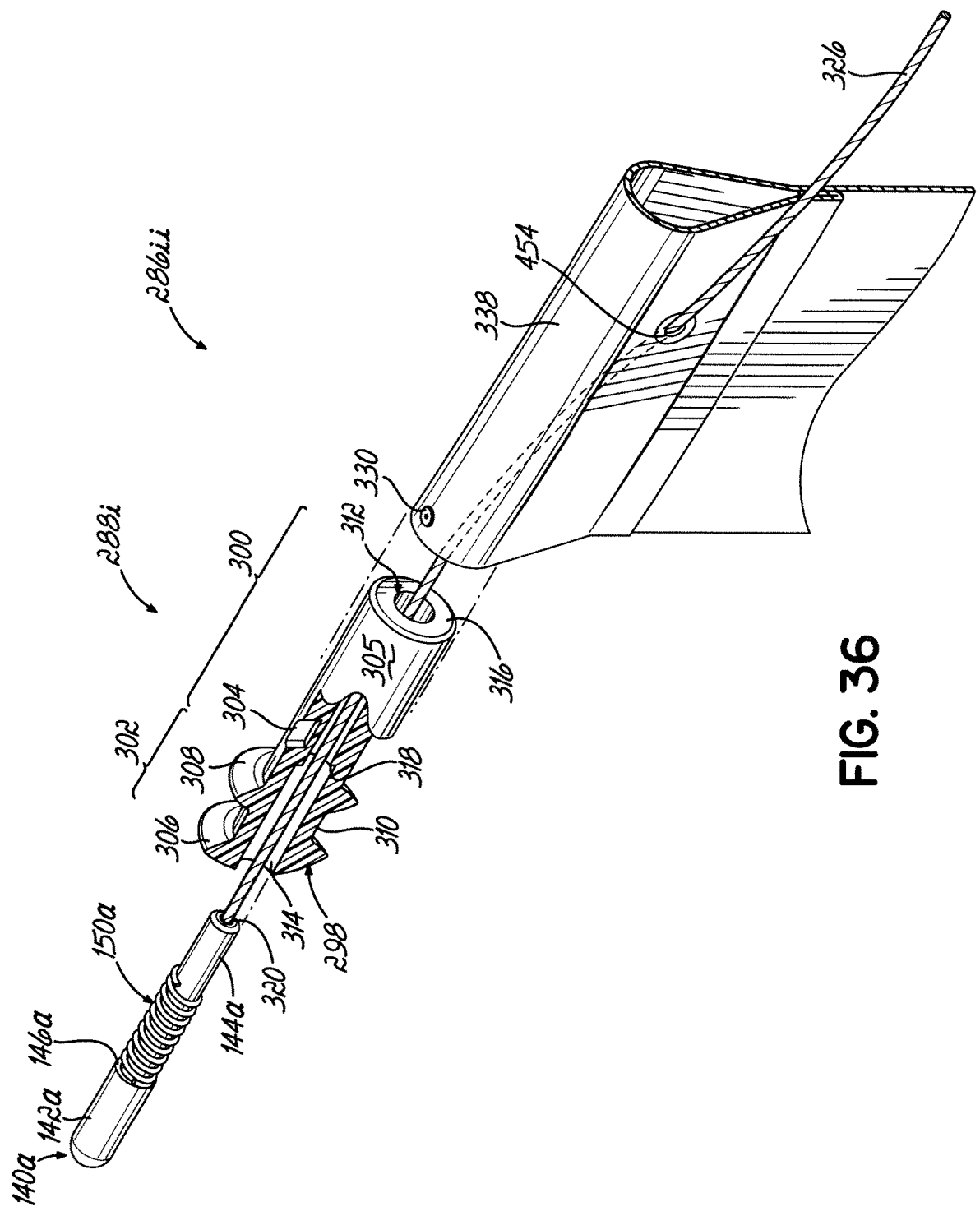
FIG. 36 is a partially disassembled view of a portion of another version of lockable crossbar assembly.

FIG. 36 illustrates a partially disassembled view of a portion of another version of lockable crossbar assembly 286*ii* which may be used in any of the tracks shown or described herein in any of the containers shown or described herein. Each lockable crossbar assembly 286*ii* has two locking assemblies 288*i* (only one being shown) identical to those described above and shown in FIGS. 35, 35A and 35B. In lockable crossbar assembly 286*ii*, the cord 326 does not stay inside the fabric pocket 338 of the dunnage. Instead it passes through an opening 454 through the dunnage on each side of the container so that an operator may easily shorten the distance between the ends of cord 326 by pulling on the exposed portion of the cord 326. This type of dunnage may be used in any of the lockable crossbar assemblies having a flexible cord.

For purposes of this document, the description of the positioning of various components is described with respect to the containers shown herein being in the positions illustrated. In addition, any of the features of the crossbar assemblies may be used in combination.

While various embodiments of the present invention have been illustrated and described in considerable detail, it is not the intention of the applicant to restrict or in any way limit the scope of the claims to such detail. Additional advantages and modifications will readily appear to those skilled in the art. The invention in its broader aspect is, therefore, not limited to the specific details, representative system, apparatus, and method, and illustrative example shown and described. Accordingly, departures may be made from such details without departing from the spirit or scope of the applicant's general inventive concept.

What is claimed is:

1. A reusable and returnable container for holding products therein during shipment, the reusable and returnable container comprising:
    a base and two opposed sides;
    at least one track supported by each of the sides;
    a plurality of movable dunnage supports engaged with the tracks;
    a lockable crossbar assembly moveable between a locked position and an unlocked position, a portion of each lockable crossbar assembly remaining inside the tracks regardless of whether the lockable crossbar assembly is in its locked or unlocked position; and
    dunnage supported by the lockable crossbar assembly and at least some of the dunnage supports.

2. The container of claim 1 wherein the lockable crossbar assembly comprises a crossbar, two handles and two locking pins, wherein the locking pins may be retracted by an operator moving the handles, thereby moving the lockable crossbar assembly from a locked position in which the locking pins are inside openings in the tracks to an unlocked position in which the lockable crossbar assembly may move along a path defined by the tracks a portion of each lockable crossbar assembly remaining inside the tracks regardless of the location of the lockable crossbar assembly to enable the lockable crossbar assembly to travel along the path defined by the tracks.

3. The container of claim 1 wherein each of the tracks has at least one generally horizontally oriented portion and at least one generally vertically oriented portion extending towards the base from each generally horizontally oriented portion.

4. The container of claim 3, wherein the dunnage supports extend between the generally horizontally oriented portions of the tracks when the lockable crossbar assembly is in its locked position.

5. The container of claim 4, wherein the lockable crossbar assembly includes two locking assemblies, each of the locking assemblies including a locking pin which may be selectively moved by an operator to engage and disengage an opening.

6. The container of claim 5, wherein each of the locking assemblies includes a spring surrounding a locking pin.

7. The container of claim 1, wherein at least one of the dunnage supports comprises multiple components.

8. The container of claim 1, wherein each of the lockable crossbar assemblies has a locking assembly at each end.

9. The container of claim 1, wherein at least some of the dunnage supports include end members movable along the tracks.

10. A container for holding products therein during shipment, the container comprising:
    a base and opposed sides;
    a track supported by each of said opposed sides;
    a plurality of dunnage supports extending between opposed tracks;
    at least one lockable crossbar assembly capable of being selectively unlocked and locked in a desired location by an operator, a portion of each lockable crossbar assembly engaging the tracks regardless of the location of the lockable crossbar assembly; and
    dunnage supported by at least some of the dunnage supports and the at least one lockable crossbar assembly.

11. The container of claim 10, wherein the dunnage comprises pouches.

12. The container of claim 10, wherein each of the lockable crossbar assemblies has at least one locking assembly.

13. The container of claim 12, wherein each locking assembly has a handle surrounding a middle member of the lockable crossbar assembly.

14. The container of claim 10, wherein each side of the container has a generally L-shaped track.

15. The container of claim 10, wherein each lockable crossbar assembly has locking pins which may engage openings.

16. The container of claim 10, wherein each lockable crossbar assembly has locking assemblies which may be selectively engaged by an operator to fix the location of the lockable crossbar assembly relative to the tracks.

17. A lockable crossbar assembly for use in a shipping container, the lockable crossbar assembly comprising:
    a crossbar;
    two handles, each handle having a hollow interior through which the crossbar passes;
    two end members, each member having a bore through the end member;
    two locking pins, each locking pin being spring loaded in an extended position and extending through the bore of one of the end members, wherein the locking pins may be retracted by an operator moving the handles, thereby moving the lockable crossbar assembly from a locked position in which the locking pins are inside openings in opposed tracks to an unlocked position in which the lockable crossbar assembly may move along a path defined by the opposed tracks secured to the container, a portion of each lockable crossbar assembly remaining inside the opposed tracks regardless of the location of the lockable crossbar assembly to enable the lockable crossbar assembly to travel along the path defined by the opposed tracks.

18. The lockable crossbar assembly of claim 17, wherein the crossbar is hollow.

19. The lockable crossbar assembly of claim 17, wherein each end member has spaced inner and outer heads with a groove between the inner and outer heads.

20. The lockable crossbar assembly of claim 19, wherein the outer head of each end member remains inside one of the opposed tracks regardless of the location of the lockable crossbar assembly to enable the lockable crossbar assembly to travel along the path defined by the opposed tracks.

* * * * *